US012776533B2

(12) United States Patent
Meng et al.

(10) Patent No.: US 12,776,533 B2
(45) Date of Patent: Oct. 27, 2026

(54) BATTERY MODULE AND TRANSPORTATION MEANS

(71) Applicant: HUAWEI DIGITAL POWER TECHNOLOGIES CO., LTD., Shenzhen (CN)

(72) Inventors: Hao Meng, Dongguan (CN); Kui Zhou, Dongguan (CN); Ruisheng Ma, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 593 days.

(21) Appl. No.: 18/226,995

(22) Filed: Jul. 27, 2023

(65) Prior Publication Data

US 2024/0162528 A1 May 16, 2024

Related U.S. Application Data

(63) Continuation of application No. PCT/CN2021/102492, filed on Jun. 25, 2021.

(30) Foreign Application Priority Data

Jan. 28, 2021 (WO) ................ PCT/CN2021/074157

(51) Int. Cl.
*H01M 10/6566* (2014.01)
*H01M 10/48* (2006.01)
(Continued)

(52) U.S. Cl.
CPC ..... *H01M 10/6566* (2015.04); *H01M 10/486* (2013.01); *H01M 10/613* (2015.04);
(Continued)

(58) Field of Classification Search
CPC ............. H01M 10/486; H01M 10/613; H01M 10/617; H01M 10/625; H01M 10/6556;
(Continued)

(56) References Cited

U.S. PATENT DOCUMENTS 9,634,363 B2 * 4/2017 Miyawaki ........... H01M 50/291
10,461,286 B2 * 10/2019 Lee .................. H01M 10/6557
(Continued)

FOREIGN PATENT DOCUMENTS

CN 210778180 U 6/2020
CN 210926220 U * 7/2020
(Continued)

*Primary Examiner* — Brian K Talbot
(74) *Attorney, Agent, or Firm* — WOMBLE BOND DICKINSON (US) LLP

(57) ABSTRACT

This application relates to a battery module, including a case, a first electrochemical cell layer, a second electrochemical cell layer, a middle separator, and an air supply unit. A main air duct, a first secondary air duct, and a second secondary air duct are disposed in the middle separator. The main air duct penetrates the middle separator. A first ventilation hole and a second ventilation hole are disposed on the case. In this application, by using the middle separator in the battery module, heat dissipation effect of air intake on three sides and air exhaust on one side may be implemented, and a cooling capability for the first electrochemical cell layer and the second electrochemical cell layer may be improved, thereby reducing a temperature difference of the battery module, and improving a service life of the battery module. This application further relates to a transportation means equipped with the battery module.

20 Claims, 32 Drawing Sheets

(51) Int. Cl.

| | |
|---|---|
| ***H01M 10/613*** | (2014.01) |
| ***H01M 10/617*** | (2014.01) |
| ***H01M 10/625*** | (2014.01) |
| ***H01M 10/6556*** | (2014.01) |
| ***H01M 10/6563*** | (2014.01) |
| ***H01M 50/249*** | (2021.01) |
| ***H01M 50/367*** | (2021.01) |
| ***H01M 50/593*** | (2021.01) |

(52) U.S. Cl.
CPC ....... *H01M 10/617* (2015.04); *H01M 10/625* (2015.04); *H01M 10/6556* (2015.04); *H01M 10/6563* (2015.04); *H01M 50/249* (2021.01); *H01M 50/367* (2021.01); *H01M 50/593* (2021.01); *H01M 2220/20* (2013.01)

(58) Field of Classification Search
CPC ......... H01M 10/6563; H01M 10/6566; H01M 50/249; H01M 50/367; H01M 50/593; H01M 2220/20
USPC .......................................................... 429/120
See application file for complete search history.

(56) References Cited

U.S. PATENT DOCUMENTS

| | | | | |
|---|---|---|---|---|
| 11,509,005 | B2 * | 11/2022 | Kasai .................. | H01M 50/463 |
| 2014/0120400 | A1 | 5/2014 | Yoshioka et al. | |
| 2014/0205876 | A1 | 7/2014 | Murata | |
| 2015/0010795 | A1 * | 1/2015 | Tanigaki ............. | H01M 10/647 429/82 |
| 2022/0311074 | A1 * | 9/2022 | Meng .................. | H01M 10/617 |

FOREIGN PATENT DOCUMENTS

| | | | | | |
|---|---|---|---|---|---|
| CN | 112086711 | A | * | 12/2020 | ........ H01M 10/6555 |
| CN | 212209613 | U | | 12/2020 | |
| CN | 212209703 | U | * | 12/2020 | |
| JP | 2020149765 | A | * | 9/2020 | .......... H01M 10/425 |

* cited by examiner

BATTERY MODULE AND TRANSPORTATION MEANS

CROSS-REFERENCE TO RELATED APPLICATIONS

This application is a continuation of International Application No. PCT/CN2021/102492, filed on Jun. 25, 2021, which claims priority to International Application No. PCT/CN2021/074157, filed on Jan. 28, 2021. The disclosures of the aforementioned applications are hereby incorporated by reference in their entireties.

TECHNICAL FIELD

This application relates to the field of battery technologies, and in particular, to a battery module and a transportation means equipped with the battery module.

BACKGROUND

Due to characteristics of flexibility, reliability, and high energy density in use of a battery module, the battery module has developed rapidly on both a power generation side and a power demand side, and an installed capacity has also increased significantly. Especially in the field of electric vehicles, there is a strong demand for chemical batteries represented by a lithium-ion battery. This brings rapid development of the battery module.

However, to control a volume of a product such as an electric vehicle and pursue a greater energy storage capacity, heat dissipation space of the battery module is inevitably compressed. Electrochemical cells inside the battery module are usually stacked. Thermal cascade effect inevitably exists, causing an excessively great temperature difference between the electrochemical cells. After the battery module works for a long time, a state of health (SOH) of a high-temperature electrochemical cell is obviously different from a state of health of a low-temperature electrochemical cell. The energy storage capacity of the battery module is restricted by an electrochemical cell with a lowest state of health. A decrease in an available capacity of the electrochemical cell causes a decrease in an overall energy storage capacity of the battery module. As a result, a battery life of a product such as an electric vehicle equipped with the battery module may decrease relatively quickly.

SUMMARY

In view of disadvantages of conventional technologies, an objective of the present disclosure is to provide a battery module capable of maintaining a temperature difference between electrochemical cells, and a transportation means equipped with the battery module. This application specifically includes the following technical solutions:

A battery module includes a case, a first electrochemical cell layer, a second electrochemical cell layer, a middle separator, and an air supply unit. The first electrochemical cell layer, the middle separator, and the second electrochemical cell layer are stacked and fastened in the case. The middle separator is located between the first electrochemical cell layer and the second electrochemical cell layer. The middle separator includes a first side edge and a second side edge. Both the first side edge and the second side edge extend along a first direction. A main air duct, a first secondary air duct, and a second secondary air duct are further disposed in the middle separator. The main air duct penetrates the middle separator along the first direction. The first secondary air duct is communicated with the main air duct. Another end of the first secondary air duct extends to the first side edge. The second secondary air duct is communicated with the main air duct. Another end of the second secondary air duct extends to the second side edge.

A first ventilation hole and a second ventilation hole are disposed on the case. The first ventilation hole and the second ventilation hole are respectively located on two sides of the middle separator and are arranged in the first direction. The air supply unit is connected to the case in a fastened manner, and is configured to exhaust air in the middle separator out of the case through the first ventilation hole.

In the battery module of this application, the first electrochemical cell layer and the second electrochemical cell layer are accommodated and fastened through the case. The middle separator is fastened between the first electrochemical cell layer and the second electrochemical cell layer. Through the main air duct, the first secondary air duct, and the second secondary air duct disposed in the middle separator, ventilation and heat dissipation may be separately performed on the first electrochemical cell layer and the second electrochemical cell layer. The first ventilation hole and the second ventilation hole are separately disposed on the case, and the first ventilation hole and the second ventilation hole are respectively arranged on the two sides of the middle separator along the first direction. Therefore, air can be taken from different directions through the main air duct, the first secondary air duct, and the second secondary air duct of the middle separator, and the air supply unit exhausts air in the middle separator out of the case through the first ventilation hole.

In this way, when air cooling is performed on the first electrochemical cell layer and the second electrochemical cell layer, air may be taken from three different directions through the middle separator in the battery module in this application. The air in the first secondary air duct and the second secondary air duct may supplement the air in the main air duct, to avoid an undesirable phenomenon that heat dissipation effect gradually decreases due to a gradual increase of an air temperature in a flowing process of air along a single path. In addition, when the cooling air flows through the first secondary air duct and the second secondary air duct, heat dissipation and cooling are further performed for regions corresponding to the first secondary air duct and the second secondary air duct. In this way, cooling effect is more uniformly implemented for the first electrochemical cell layer and the second electrochemical cell layer, and a phenomenon that an overall energy storage capacity of the battery module is reduced due to thermal cascade effect can be avoided, thereby prolonging a service life of the battery module.

In one embodiment, the case includes an air intake board, an air exhaust panel, a first side board, and a second side board. The air intake board and the air exhaust panel are respectively arranged on the two sides of the middle separator along the first direction. The first ventilation hole is located on the air exhaust panel. The first side board and the second side board are separately connected between the air intake board and the air exhaust panel. The first side board is located on a side that is of the first side edge and that is away from the main air duct. The second side board is located on a side that is of the second side edge and that is away from the main air duct.

In this embodiment, the case is formed by using the air intake board, the air exhaust panel, the first side board, and the second side board in an enclosed manner, and may accommodate the first electrochemical cell layer, the second electrochemical cell layer, and the middle separator. In addition, the first ventilation hole is disposed on the air exhaust panel. The air supply unit can supply air to the first ventilation hole. Therefore, after entering the case from the second ventilation hole, the cooling air flows through the middle separator at least in a direction of the main air duct, and then flows out of the case from the second ventilation hole. Correspondingly, the second ventilation hole is located on the air intake board, and air outside the air intake board may be supplemented into the case through the second ventilation hole.

In one embodiment, there are a plurality of main air ducts. The plurality of main air ducts are arranged in the middle separator along a second direction. The second direction is perpendicular to the first direction.

In this embodiment, the plurality of main air ducts are disposed and extend side by side, to increase a cooling area of the middle separator for the first electrochemical cell layer and the second electrochemical cell layer, thereby implementing better cooling effect.

In one embodiment, there are a plurality of first secondary air ducts. The plurality of first secondary air ducts are spaced along the first direction. There are also a plurality of second secondary air ducts. The plurality of second secondary air ducts are also spaced along the first direction.

In this embodiment, the plurality of first secondary air ducts and the plurality of second secondary air ducts are disposed, to increase an air intake volume of the two opposite sides of the middle separator. Therefore, more air at the two opposite sides of the middle separator can enter the main air duct, to supplement air in the main air duct and reduce a temperature of air for cooling in the main air duct.

In one embodiment, the first secondary air duct includes a first strong secondary air duct and a first weak secondary air duct. The first strong secondary air duct is located between the first weak secondary air duct and the air exhaust panel. A quantity of main air ducts communicated with the first strong secondary air duct is greater than or equal to a quantity of main air ducts communicated with the first weak secondary air duct.

The second secondary air duct includes a second strong secondary air duct and a second weak secondary air duct. The second strong secondary air duct is located between the second weak secondary air duct and the air exhaust panel. A quantity of main air ducts communicated with the second strong secondary air duct is greater than or equal to a quantity of main air ducts communicated with the second weak secondary air duct.

In this embodiment, the first strong secondary air duct and the first weak secondary air duct are disposed, and the quantity of the main air ducts communicated with the first strong secondary air duct is greater than or equal to the quantity of the main air ducts communicated with the first weak secondary air duct. Therefore, in an extension direction of the main air duct, more air is introduced in a direction of the first side edge at a location closer to the air exhaust panel. Because the air temperature in the main air duct gradually increases with the extension of the flow path, through the disposition in this embodiment, more low-temperature air can be introduced at a location with a higher air temperature in the main air duct, to supplement air for heat dissipation in the main air duct, thereby improving heat dissipation efficiency of the middle separator. Correspondingly, the second strong secondary air duct and the second weak secondary air duct are disposed in the second secondary air duct, to implement similar effect.

In one embodiment, a distance between first secondary air ducts located close to an air exhaust side edge is greater than a distance between first secondary air ducts located away from the air exhaust side edge; and a distance between second secondary air ducts located close to the air exhaust side edge is greater than a distance between second secondary air ducts located far away from the air exhaust side edge.

In this embodiment, the distance between the first secondary air ducts and the distance between the second secondary air ducts are set to enhance heat dissipation effect for an electrochemical cell unit in a middle part of the electrochemical cell layer, so that heat dissipation effect tends to be consistent for electrochemical cell units in the electrochemical cell layer.

In one embodiment, at least one main air duct is disposed between the first secondary air duct and the second secondary air duct.

In this embodiment, through the foregoing disposition, it can be ensured that at least one main air duct is neither communicated with the first secondary air duct, nor communicated with the second secondary air duct. In this way, the air flowing along a path of the main air duct may flow out of the middle separator through the at least one main air duct, and flow out of the case through an air exhaust window. Through such a disposition, the following defect can be avoided: An air flow in the main air duct is excessively small because a lateral air flow generated by using the first secondary air duct and/or the second secondary air duct hinders flow of the air in the main air duct.

In one embodiment, a first section is disposed on the first side edge. The first section is located on a side that is of the first side edge and that is close to the air exhaust panel. The first secondary air duct is located in the first section. A length h1 of the first section along the first direction and a length H1 of the first side edge meet a condition that h1 is less than or equal to ¾ H1. A second section is disposed on the second side edge. The second section is located on a side that is of the second side edge and that is close to the air exhaust panel. The second secondary air duct is located in the second section. A length h2 of the second section along the first direction and a length H2 of the second side edge meet a condition that h2 is less than or equal to ¾H2.

In this embodiment, the first section and the second section are separately disposed on a side farther from the air intake board, so that when the air in the main air duct initially enters the middle separator, the air is not affected by the air in the first secondary air duct and the air in the second secondary air duct. Because an initial temperature of the air in the main air duct is relatively low, and the flow path is relatively short, better heat dissipation effect can be implemented by using the first secondary air duct and the second secondary air duct without intervention.

In one embodiment, the main air duct includes an upper main air duct and a lower main air duct. An opening facing the first electrochemical cell layer is disposed on the upper main air duct. An opening facing the second electrochemical cell layer is disposed on the lower main air duct. At least one lower main air duct is disposed between two upper main air ducts.

In this embodiment, the upper main air duct and the lower main air duct are disposed, to implement better cooling effect for the first electrochemical cell layer by using the upper main air duct and better cooling effect for the second electrochemical cell layer by using the lower main air duct. However, at least one lower main air duct is disposed between the two upper main air ducts, so that the upper main air duct and the lower main air duct can be disposed in a cross manner, and cooling effect can be more uniformly implemented for the first electrochemical cell layer and the second electrochemical cell layer by using the main air duct.

In one embodiment, the first secondary air duct has a first air intake end and a first air exhaust end that are opposite to each other. The first air intake end is communicated with the first side edge. The first air exhaust end is communicated with the main air duct. A projection of the first air exhaust end on the first side edge is located between the first air intake end and the air exhaust panel.

The second secondary air duct has a second air intake end and a second air exhaust end that are opposite to each other. The second air intake end is communicated with the second side edge. The second air exhaust end is communicated with the main air duct. A projection of the second air exhaust end on the second side edge is located between the second air intake end and the air exhaust panel.

In this embodiment, the first air exhaust end of the first secondary air duct is closer to the air exhaust panel than the first air intake end, or the first air exhaust end and the first air intake end are aligned, so that a maximum turning angle of a flow path of air from the first secondary air duct to the main air duct is kept within 90 degrees, thereby facilitating flow of air in the first secondary air duct. Correspondingly, the second air exhaust end of the second secondary air duct is also closer to the air exhaust panel than the second air intake end, and similar effect can also be achieved.

In one embodiment, limiting boards are further disposed on the first side edge and the second side edge of the middle separator. The limiting boards extend in opposite directions perpendicular to a plane of the middle separator, to limit a relative location between each electrochemical cell layer and the middle separator.

In this embodiment, the limiting board may protrude from a location of a side wall of each electrochemical cell layer, and is configured to limit displacement of each electrochemical cell layer relative to the middle separator.

In one embodiment, limiting sub-boards are further disposed on the middle separator. The limiting sub-boards are spaced along both the first side edge and the second side edge. The limiting sub-board is configured to limit a relative location between the electrochemical cell unit in each electrochemical cell layer and the middle separator.

In this embodiment, the limiting sub-boards may be spaced along a length direction of the first side edge and a length direction of the second side edge, and are configured to limit displacement of each electrochemical cell unit relative to the middle separator.

In one embodiment, a plurality of notches are disposed on the limiting board. The plurality of notches are configured to form the first air intake end of the first secondary air duct and the second air intake end of the second secondary air duct.

In one embodiment, the middle separator includes a base board and air guide strips. The air guide strips protrude from the base board, and are configured to form the main air duct together with the base board in an enclosed manner.

In one embodiment, the air guide strips are located on the two opposite sides of the middle separator, and separately protrude from the base board. The air guide strip on one side and the base board form the upper main air duct in the enclosed manner. The air guide strip on the other side and the base board form the lower main air duct in the enclosed manner.

In this embodiment, in a manner in which the air guide strips cooperate with the base board, relative locations of the upper main air duct and the lower main air duct may be adjusted. In some implementations, the upper main air duct and the lower main air duct may be alternatively symmetrically disposed relative to the base board.

In one embodiment, the first secondary air duct includes a first upper secondary air duct and a first lower secondary air duct. The first secondary air duct and the first secondary air duct are respectively arranged on an upper side and a lower side of the base board. The second secondary air duct includes a second upper secondary air duct and a second lower secondary air duct. The second upper secondary air duct and the second lower secondary air duct are respectively arranged on the upper side and the lower side of the base board.

In one embodiment, the electrochemical cell units in the electrochemical cell layer are arranged in a single column.

In one embodiment, the electrochemical cell units in the electrochemical cell layer are arranged in two columns, and two electrochemical cell units side by side are disposed opposite to each other.

In this embodiment, a positive electrode and a negative electrode of each electrochemical cell unit are located on a same side. A positive electrode and a negative electrode of each of the two electrochemical cell units that are arranged opposite to each other may be exposed at a surface of a side that is of the electrochemical cell unit and that is away from the other electrochemical cell unit.

In one embodiment, the middle separator includes a first support strip, a second support strip, and two third support strips. The first support strip is located on the first side edge. The second support strip is located on the second side edge. The two third support strips are located between the first side edge and the second side edge.

In this embodiment, the first support strip, the second support strip, and the third support strips are jointly configured to be attached to and support the electrochemical cell layers located on the upper side and the lower side of the middle separator. The third support strip close to the first side edge cooperates with the first support strip to support the electrochemical cell units on one side. The third support strip close to the second side edge cooperates with the second support strip to support the electrochemical cell units on the other side.

In one embodiment, there are three limiting boards in the middle separator. Two of the limiting boards are respectively located on the first side edge and the second side edge. The third limiting board is located at a middle part between the two limiting boards.

In this embodiment, corresponding to a structure in which the electrochemical cell layer includes two rows of electrochemical cell units, added limiting boards may be configured to limit a relative location between the two rows of electrochemical cell units.

In one embodiment, a plurality of limiting sub-boards are further spaced at the limiting board located in the middle of the middle separator. The limiting sub-boards are disposed in pairs. Limiting sub-boards in each pair are respectively located on two opposite sides of the limiting board.

In this embodiment, the limiting sub-boards located in the middle of the middle separator cooperate with limiting sub-boards located on the first side edge and the second side edge, and are configured to separately limit a relative location between two electrochemical cell units that are arranged side by side.

In one embodiment, a busbar is configured to connect the electrochemical cell units on a same side in series. The busbar includes a short busbar and a long busbar. The short busbar and the long busbar are respectively located at a head end and a tail end of a series circuit.

In one embodiment, the short busbar includes a first power connection pin, and the long busbar includes a second power connection pin. The first power connection pin and the second power connection pin are respectively bent relative to the short busbar and the long busbar, and are both located on one side of each electrochemical cell layer.

In this embodiment, the first power connection pin and the second power connection pin are disposed. This helps implement a series connection between the electrochemical cell units on the two sides, and implement an electrical connection between an electrochemical cell module and an external circuit.

In one embodiment, a third ventilation hole is further disposed on each of the first side board and the second side board.

In this embodiment, the third ventilation hole is disposed on each of the first side board and the second side board, so that air can be taken from the outside of the case close to each of the first secondary air duct and the second secondary air duct through each of the first secondary air duct and the second secondary air duct of the middle separator, thereby shortening a flow path for external cooling air to enter the middle separator and improving heat dissipation effect of the middle separator.

In one embodiment, the second ventilation hole is disposed at a location corresponding to the middle separator. The third ventilation hole is disposed at a location corresponding to each of the first secondary air duct and the second secondary air duct.

In this embodiment, the second ventilation hole is disposed at the location corresponding to the middle separator, so that air outside the case can enter the main air duct through the second ventilation hole. The third ventilation hole is disposed at the location corresponding to each of the first secondary air duct and the second secondary air duct, to facilitate air outside the case to enter the first secondary air duct and the second secondary air duct through the third ventilation holes.

In one embodiment, the case further includes an air exhaust board. The air exhaust board is located between the middle separator and the air exhaust panel. A main air exhaust hole is further disposed on the air exhaust board.

In this embodiment, the air exhaust board may enclose relatively sealed space with the air intake board, the first side board, and the second side board, so that heat dissipation is mainly implemented through the main air exhaust hole for the first electrochemical cell layer and the second electrochemical cell layer that are located in the relatively sealed space, thereby improving the heat dissipation effect of the middle separator.

In one embodiment, the main air exhaust hole is disposed at a location corresponding to the middle separator.

In this embodiment, the main air exhaust hole is disposed at the location corresponding to the middle separator, to facilitate cooling air in the case to flow out from the main air exhaust hole.

In one embodiment, the air supply unit is disposed in the case, and is located between the air exhaust board and the air exhaust panel.

In this embodiment, the air supply unit is disposed between the air exhaust board and the air exhaust panel, so that the air supply unit can also be accommodated in the case, and the case provides reliable protection for the air supply unit.

In one embodiment, the case further includes a top assembly and a bottom assembly. The top assembly is located on a side that is of the first electrochemical cell layer and that is away from the middle separator. The bottom assembly is located on a side that is of the second electrochemical cell layer and that is away from the middle separator. Both the top assembly and the bottom assembly are connected between the air intake board and the air exhaust board.

In this embodiment, the top assembly and the bottom assembly are disposed along a stacking direction of the first electrochemical cell layer and the second electrochemical cell layer, to reliably protect the first electrochemical cell layer and the second electrochemical cell layer in a direction perpendicular to the middle separator. In addition, sealing performance of the case is improved.

In one embodiment, a top air flow channel is disposed in the top assembly, and a bottom air flow channel is disposed in the bottom assembly. Both the top air flow channel and the bottom air flow channel extend along the first direction. Secondary ventilation holes corresponding to the top air flow channel and the bottom air flow channel are further disposed on the air intake board. Secondary air exhaust holes corresponding to the top air flow channel and the bottom air flow channel are further disposed on the air exhaust board.

In this embodiment, heat dissipation is implemented for the first electrochemical cell layer and the second electrochemical cell layer respectively through the top air flow channel and the bottom air flow channel, so that cooling air flows through two opposite planes of the first electrochemical cell layer and the second electrochemical cell layer, thereby improving heat dissipation effect for the battery module in this application.

In one embodiment, an electrochemical cell assembly includes an upper separator and a lower separator. The upper separator is located between the electrochemical cell layer and the top assembly, to form a gap for ventilation and heat dissipation between the top assembly and the electrochemical cell layer. The lower separator is located between the electrochemical cell layer and the bottom assembly, to form a gap for ventilation and heat dissipation between the bottom assembly and the electrochemical cell layer.

In one embodiment, a sum of areas of the secondary ventilation holes is less than a sum of areas of the second ventilation holes; and/or a sum of areas of the secondary air exhaust holes is less than a sum of areas of the main air exhaust holes.

In this embodiment, the secondary ventilation holes are configured to implement cooling air flow in the top air flow channel and the bottom air flow channel. When the sum of the areas of the secondary ventilation holes is less than the sum of the areas of the second ventilation holes, or the sum of the areas of the secondary air exhaust holes is less than the sum of the areas of the main air exhaust holes, cooling air flow of a main channel in the middle separator is greater than both the air flow of the top air flow channel and air flow of the bottom air flow channel. Because the middle separator dissipates heat for both the first electrochemical cell layer and the second electrochemical cell layer, the air flow in the middle separator is set to be greater than the air flow of the top air flow channel and the air flow of the bottom air flow channel. It may be ensured that a temperature difference between the two opposite planes of the first electrochemical cell layer and the second electrochemical cell layer is smaller. In other words, it may be ensured that heat dissipation effect for the two opposite planes of the first electrochemical cell layer and the second electrochemical cell layer tend to be consistent.

In one embodiment, the battery module further includes a first insulation cover and a second insulation cover. The first insulation cover is located between the middle separator and the first side board. A first through hole corresponding to the first secondary air duct is further disposed on the first insulation cover.

The second insulation cover is located between the middle separator and the second side board. A second through hole corresponding to the second secondary air duct is further disposed on the second insulation cover.

In this embodiment, the first insulation cover and the second insulation cover work together to implement insulation between the busbar and each of the first electrochemical cell layer and the second electrochemical cell layer. The first through hole and the second through hole are respectively formed on the first insulation cover and the second insulation cover, so that air outside the third ventilation holes can enter the first secondary air duct and the second secondary air duct respectively through the first through hole and the second through hole.

In one embodiment, the first insulation cover includes a first outer surface facing the first side board. A first air guide groove is disposed on the first outer surface. One end of the first air guide groove is communicated with the first through hole. The other end of the first air guide groove is communicated with the air exhaust board.

The second insulation cover includes a second outer surface facing the second side board. A second air guide groove is disposed on the second outer surface. One end of the second air guide groove is communicated with the second through hole. The other end of the second air guide groove is communicated with the air exhaust board.

Air guide holes respectively corresponding to the first air guide groove and the second air guide groove are further disposed on the air exhaust board.

In this embodiment, the first air guide groove is formed on the first outer surface of the first insulation cover, so that part of air entering the case from the outside of the first side board can also flow along the first air guide groove, thereby implementing cooling heat dissipation for the busbar. Correspondingly, part of air entering the case from the outside of the second side board can also flow in the second air guide groove, thereby implementing cooling heat dissipation for the busbar.

In one embodiment, the battery module further includes a cavity and a control panel. The control panel is accommodated in the cavity. An air inlet and an air outlet are further disposed on the cavity. The air inlet is communicated with the main air duct, or the first air guide groove, or the second air guide groove. The air outlet is communicated with the air exhaust window of the air exhaust panel.

In this embodiment, the control panel is configured to control work of the first electrochemical cell layer and the second electrochemical cell layer, and is accommodated in the cavity and protected by the cavity. When the cavity is communicated with the main air duct, or the first air guide groove, or the second air guide groove, cooling air may further flow through the cavity, to implement heat dissipation for the control panel.

In one embodiment, the control panel is used as a battery management system, and/or an optimizer, and/or a direct-current conversion apparatus of the battery module.

In one embodiment, there are a plurality of control panels.

In one embodiment, there are two control panels. The two control panels are respectively arranged on two sides of the air supply unit.

In one embodiment, the air supply unit includes a first fan and at least two second fans. In the stacking direction of the first electrochemical cell layer and the second electrochemical cell layer, the first fan is located between the two second fans. When the air supply unit works, air exhaust power of the first fan is greater than air exhaust power of the second fans.

In this embodiment, functions of the air supply unit are implemented through an arrangement manner in which the first fan is located between the two second fans, so that a heat dissipation requirement of the battery module in this application can be met. The air exhaust power of the first fan is set to be higher. It may be ensured that air exhaust power at the location of the middle separator is higher than air exhaust power of the top air flow channel and air exhaust power of the bottom air flow channel. In this way, the following effect can also be achieved: The temperature difference between the two opposite planes of the first electrochemical cell layer and the second electrochemical cell layer is smaller, and it is ensured that the heat dissipation effect tends to be consistent for the two opposite planes of the first electrochemical cell layer and the second electrochemical cell layer.

In one embodiment, the air supply unit includes a third fan and a fourth fan. The third fan and the fourth fan are arranged side by side along the stacking direction of the first electrochemical cell layer and the second electrochemical cell layer. A first temperature sensor and a second temperature sensor are further disposed on the battery module. The first temperature sensor is configured to monitor a temperature of the first electrochemical cell layer. The second temperature sensor is configured to monitor a temperature of the second electrochemical cell layer. The control panel further receives temperature data obtained by the first temperature sensor and the second temperature sensor through monitoring, to separately control rotational speeds of the third fan and the fourth fan.

In this embodiment, a temperature difference may be formed between the first electrochemical cell layer and the second electrochemical cell layer. The control panel may monitor the temperature difference in real time through monitoring performed by the first temperature sensor and the second temperature sensor. Then, the control panel adjusts the rotational speeds of the third fan and the fourth fan, so that the control panel can adjust real-time heat dissipation power of the first electrochemical cell layer and the second electrochemical cell layer, thereby reducing the temperature difference between the first electrochemical cell layer and the second electrochemical cell layer and making the temperatures of the first electrochemical cell layer and the second electrochemical cell layer tend to be consistent.

This application further relates to a transportation means equipped with the foregoing battery module. It may be understood that because heat dissipation effect is more uniformly implemented for the battery module, a temperature difference between electrochemical cells in the battery module is controlled, so that an overall energy storage capacity of the battery module is better maintained. Therefore, a service life of the transportation means in this application is further prolonged.

In one embodiment, the transportation means is an electric vehicle or a hybrid vehicle.

In this embodiment, the battery module may provide the electric vehicle or the hybrid vehicle with electric energy needed for travel. Therefore, under a condition that carbon emission of the transportation means is reduced, an endurance mileage of the electric vehicle or the hybrid vehicle is better maintained, and a service life of the electric vehicle or the hybrid vehicle is prolonged.

In one embodiment, the transportation means further includes a vehicle frame, a power apparatus, a transmission apparatus, and a plurality of wheels. The battery module is accommodated in the vehicle frame, and electrically connected to the power apparatus. The power apparatus is in a transmission connection with each wheel through the transmission apparatus, converts electric energy stored in the battery module into rotation power, and transfers the rotation power to each wheel end through the transmission apparatus.

In this embodiment, the battery module provides the power apparatus with electric energy needed for working. The power apparatus converts the electric energy into the rotation power to output, and transfers the rotation power to each wheel end through the transmission apparatus, to drive the transportation means to travel on a road.

DESCRIPTION OF EMBODIMENTS

The following describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

Figure 1:
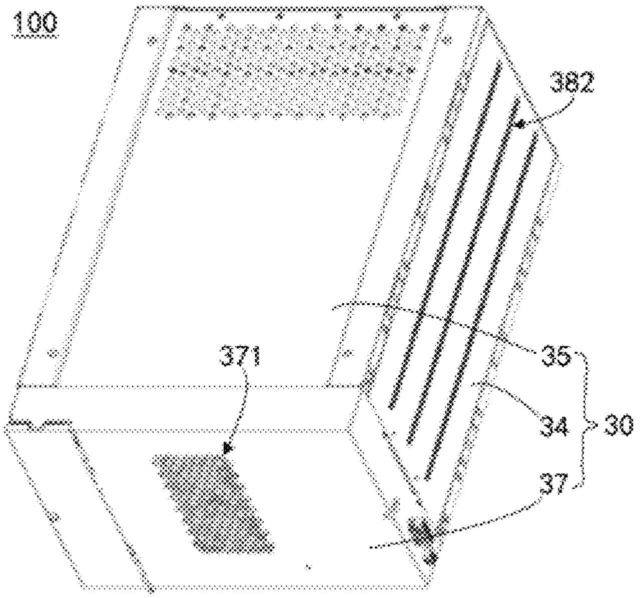
FIG. 1 is a schematic diagram of a structure of a battery module according to an embodiment of this application.

Refer to a battery module 100 shown in FIG. 1 in this application. The battery module 100 includes a case 30. All other assemblies of the battery module 100 are accommodated inside the case 30. The case 30 is of an approximately sealed structure, and may protect the assemblies accommodated inside the case 30. A through-hole structure is further disposed on each external surface of the case 30 to implement communication between the inside of the case 30 and the outside. The battery module 100 generates a large amount of heat during working. After a temperature of air in the case 30 rises, there may be heat exchange with outside air to dissipate heat of the battery module 100.

In a schematic diagram of FIG. 1, the case 30 includes an air exhaust panel 37, a second side board 34, and a top assembly 35. An air exhaust window 371 is disposed on the air exhaust panel 37. The air exhaust window 371 includes a plurality of through hole structures. In some embodiments, side ventilation holes 382 are disposed on the second side board 34. The side ventilation holes 382 may be understood as the foregoing through hole structures. It may be understood that, in this embodiment, the plurality of through hole structures in the air exhaust window 371 are understood as first ventilation holes; and the side ventilation holes 382 may be understood as third ventilation holes.

Figure 2:
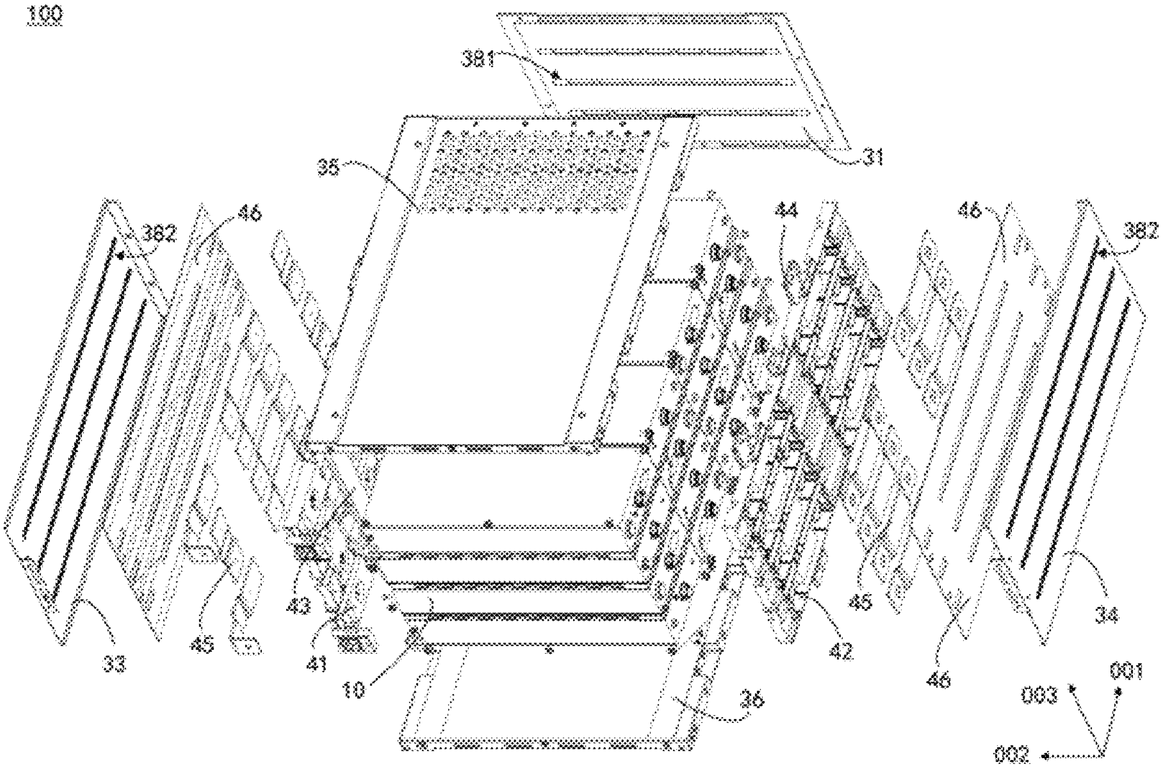
FIG. 2 is a schematic exploded view of the battery module according to FIG. 1.

Refer to a schematic exploded view of the battery module 100 according to this application shown in FIG. 2. The case 30 further includes an air intake board 31, a first side board 33, and a bottom assembly 36. An electrochemical cell assembly 10 is accommodated inside the case 30. The air intake board 31 and the air exhaust panel 37 are disposed opposite to each other along a first direction 001, and are respectively arranged on two sides of the electrochemical cell assembly 10. The second side board 34 and the first side board 33 are disposed opposite to each other along a second direction 002, and are respectively arranged on the two sides of the electrochemical cell assembly 10. The second direction 002 is perpendicular to the first direction 001. The bottom assembly 36 and the top assembly 35 are disposed opposite to each other along a third direction 003, and are also respectively arranged on the two sides of the electrochemical cell assembly 10. The third direction 003 is perpendicular to both the first direction 001 and the second direction 002. To be specific, the case 30 is enclosed by the air intake board 31, the air exhaust panel 37, the first side board 33, the second side board 34, the top assembly 35, and the bottom assembly 36 to form sealed internal space for accommodating the electrochemical cell assembly 10.

Through-hole structures are disposed on each of the air intake board 31, the air exhaust panel 37, the first side board 33, and the second side board 34: a plurality of main ventilation holes 381 disposed on the air intake board 31, the air exhaust window 371 on the air exhaust panel 37, and the side ventilation holes 382 disposed on each of the first side board 33 and the second side board in some embodiments. The main ventilation holes 381 are understood as second ventilation holes. An air supply unit 50 (with reference to FIG. 24) may be further disposed at the air exhaust panel 37. The air supply unit 50 is disposed corresponding to the air exhaust window 371, and is configured to provide power for air in the case 30 to flow out of the case 30 through the air exhaust window 371. Air outside the case 30 is allowed to be supplemented into the case 30 through the main ventilation holes 381 and the side ventilation holes 382. A temperature of air outside the case 30 is relatively low. Therefore, air inside the case 30 can exchange heat with the outside through the foregoing through-hole structures, thereby achieving an objective of heat dissipation for the electrochemical cell assembly 10.

In the schematic diagram of FIG. 2, the battery module 100 further includes a first insulation cover 41, a second insulation cover 42, at least one first support frame 43, and at least one second support frame 44. The first support frame 43 is located between the first side board 33 and the electrochemical cell assembly 10. The first support frame 43 is connected to both the top assembly 35 and the bottom assembly 36 in a fastened manner, and is configured to support the top assembly 35 and the bottom assembly 36. In some embodiments, the first support frame 43 and the second support frame 44 may be further configured to tighten the electrochemical cell assembly 10. The first side board 33 is further connected to the first support frame 43 in a fastened manner. The first side board 33 implements fastened connections relative to the top assembly 35 and the bottom assembly 36 through the first support frame 43. It may be understood that, in some other embodiments, the first side board 33 may be alternatively directly connected to the top assembly 35 and the bottom assembly 36 in a fastened manner. The first insulation cover 41 is located between the first support frame 43 and the first side board 33. A plurality of busbars 45 are further disposed between the first insulation cover 41 and the first side board 33. Each busbar 45 is in contact with and connected to the electrochemical cell assembly 10, to implement an electrical connection between electrochemical cell layers in the electrochemical cell assembly 10 on a side close to the first side board 33. In some embodiments, an insulation separator 46 is further disposed between each busbar 45 and the first side board 33, to prevent a current on the busbar 45 from being conducted to the first side board 33.

The second support frame 44 is located between the second side board 34 and the electrochemical cell assembly 10. The second support frame 44 is separately connected to the top assembly 35 and the bottom assembly 36 in a fastened manner, and is configured to support the top assembly 35 and the bottom assembly 36. In addition, the second support frame 44 may be configured to tighten the electrochemical cell assembly 10. The second side board 34 is connected to the second support frame 44 in a fastened manner, to implement fastened connections relative to the top assembly 35 and the bottom assembly 36. It may be understood that, in some other embodiments, the second side board 34 may be alternatively directly connected to the top assembly 35 and the bottom assembly 36 in a fastened manner. The second insulation cover 42 is located between the second support frame 44 and the second side board 34. A plurality of busbars 45 are disposed between the second insulation cover 42 and the second side board 34. Each busbar 45 is in contact with and connected to the electrochemical cell assembly 10, to implement an electrical connection between the electrochemical cell layers in the electrochemical cell assembly 10 on a side close to the second side board 34. The first insulation cover 41 and the second insulation cover 42 jointly work to implement a function of insulation between the electrochemical cell assembly 10 and each busbar 45. It may be understood that, in some embodiments, an insulation separator 46 may be further disposed between each busbar 45 and the second side board 34, to prevent a current on the busbars 45 from being conducted to the second side board 34.

Figure 3:
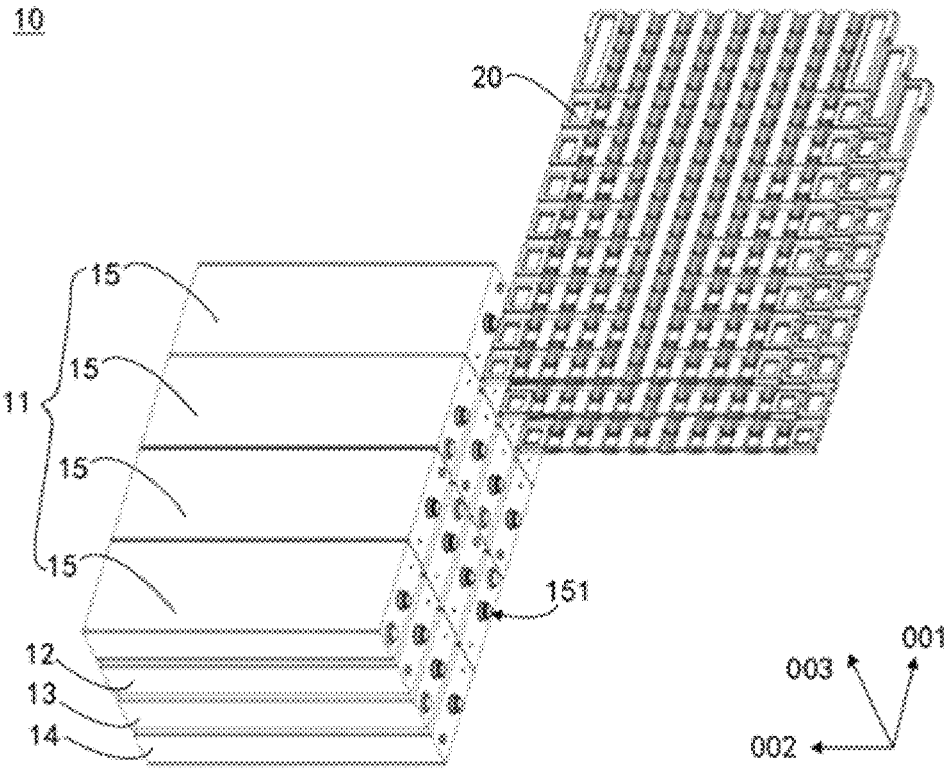
FIG. 3 is a schematic exploded view of an electrochemical cell assembly in the battery module according to FIG. 2.

Refer to a schematic exploded view of the electrochemical cell assembly 10 shown in FIG. 3. The electrochemical cell assembly 10 includes at least two electrochemical cell layers and a middle separator 20. The at least two electrochemical cell layers include a first electrochemical cell layer 11 and a second electrochemical cell layer 12. The first electrochemical cell layer 11 and the second electrochemical cell layer 12 are disposed in a stacking manner. The middle separator 20 is sandwiched between the first electrochemical cell layer 11 and the second electrochemical cell layer 12. To be specific, the first electrochemical cell layer 11, the middle separator 20, and the second electrochemical cell layer 12 are successively stacked and fastened inside the case 30.

In the schematic diagram of FIG. 3, there are four electrochemical cell layers. In other words, the electrochemical cell assembly 10 further includes a third electrochemical cell layer 13 and a fourth electrochemical cell layer 14. The four electrochemical cell layers are also fastened in the case 30 in a successively stacking form. In addition, the middle separator 20 is sandwiched between any two adjacent electrochemical cell layers. To be specific, the middle separators 20 are respectively sandwiched between the second electrochemical cell layer 12 and the third electrochemical cell layer 13 and between the third electrochemical cell layer 13 and the fourth electrochemical cell layer 14. Therefore, there are three middle separators 20 in the electrochemical cell assembly 10 shown in FIG. 3. Working principles of the middle separators 20 in the battery module 100 in this application are similar. Therefore, except for special scenarios, the following description is based on the middle separator 20 located between the first electrochemical cell layer 11 and the second electrochemical cell layer 12.

It can be learned from FIG. 3 that each electrochemical cell layer includes a plurality of electrochemical cell units 15 disposed side by side. The first electrochemical cell layer 11 is used as an example. There are four electrochemical cell units 15 disposed side by side along the first direction 001. Length directions of the four electrochemical cell units 15 are all set along the second direction 002. Both a positive electrode 151 and a negative electrode (not shown in the figure) of each electrochemical cell unit 15 are disposed opposite to each other along the length direction of the electrochemical cell unit 15. To be specific, the positive electrode 151 and the negative electrode of each electrochemical cell unit 15 are respectively arranged at two opposite ends of the electrochemical cell unit 15 along the second direction 002. In this way, the positive electrode 151 of each electrochemical cell unit 15 in the electrochemical cell assembly 10 may be connected, in a fastened manner, to the busbar 45 located on a same side (a first insulation cover 41 side) of the electrochemical cell unit 15. The negative electrode of each electrochemical cell unit 15 may be connected, in a fastened manner, to the busbar 45 located on a same side (a second insulation cover 42 side) of the electrochemical cell unit 15. It may be understood that, in some other embodiments, the positive electrode 151 of each electrochemical cell unit 15 may be alternatively connected to the busbar 45 on a second insulation cover 42 side in a fastened manner, and correspondingly, the negative electrode of each electrochemical cell unit 15 is connected to the busbar 45 on a first insulation cover 41 side in a fastened manner. This is not limited in this application.

In some other embodiments, the positive electrodes 151 of several electrochemical cell units 15 and the negative electrodes of several electrochemical cell units 15 may be alternatively disposed on a same side of the electrochemical cell assembly 10. For example, the positive electrode 151 of each electrochemical cell unit 15 in the first electrochemical cell layer 11 is connected to the busbar 45 on the first insulation cover 41 side in a fastened manner, and the negative electrode of each electrochemical cell unit 15 in the second electrochemical cell layer 12 is connected to the busbar 45 on the first insulation cover 41 side in a fastened manner. The foregoing embodiments are all implementations that may be used by the battery module 100 in this application.

Overall dimensions of the middle separator 20 are approximately the same as overall dimensions of the first electrochemical cell layer 11. To be specific, when the middle separator 20 is sandwiched between the first electrochemical cell layer 11 and the second electrochemical cell layer 12, the middle separator 20 may roughly cover a surface that is of the first electrochemical cell layer 11 and that is in contact with the middle separator 20, and also roughly cover a surface that is of the second electrochemical cell layer 12 and that is in contact with the middle separator 20. In the first electrochemical cell layer 11, the plurality of electrochemical cell units 15 are arranged along the first direction 001, and a length of the overall first electrochemical cell layer 11 along the first direction 001 is greater than a length of the electrochemical cell unit 15. Therefore, a length direction of the middle separator 20 is also set along the first direction 001, namely, the arrangement direction of the plurality of electrochemical cell units 15.

Figure 4:
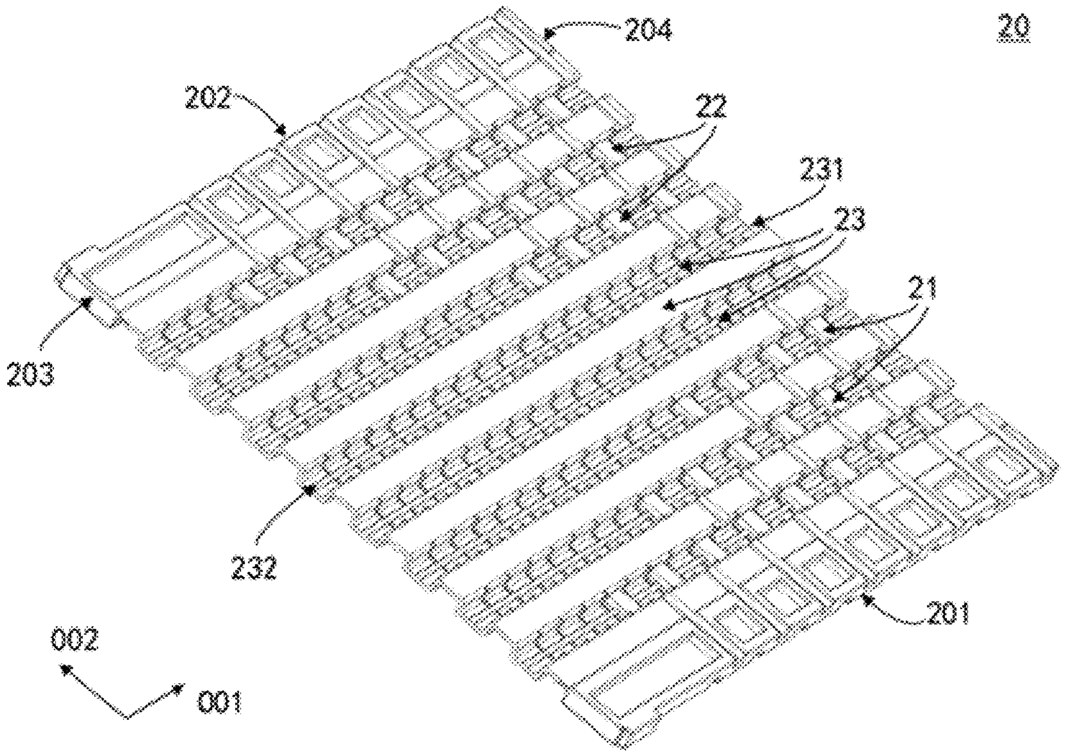
FIG. 4 is a schematic diagram of a structure of a middle separator in the electrochemical cell assembly according to FIG. 3.
Figure 5:
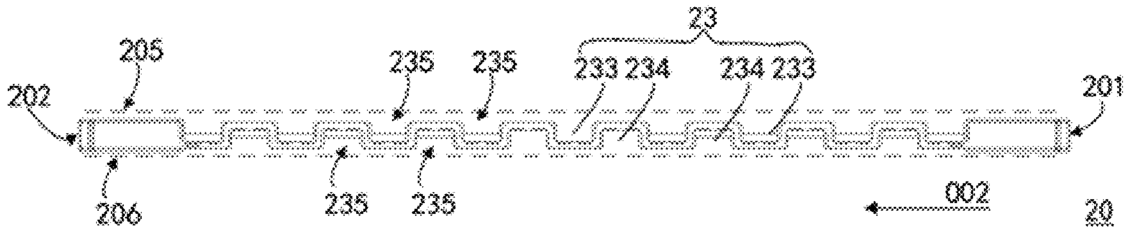
FIG. 5 is a schematic diagram of a structure in a side view direction of a middle separator in the electrochemical cell assembly according to FIG. 3.

Refer to a schematic diagram of a structure of the middle separator 20 shown in FIG. 4 and FIG. 5. The middle separator 20 is of an approximately board-like structure, and has a first plane 205 and a second plane 206 that are opposite to each other. The first plane 205 may be disposed in a manner of facing the first electrochemical cell layer 11, and the corresponding second plane 206 is disposed in a manner of being away from the first electrochemical cell layer 11. In other words, the second plane 206 is disposed in a manner of facing the second electrochemical cell layer 12. In some embodiments, the first plane 205 may be attached to the first electrochemical cell layer 11, and the second plane 206 may be attached to the second electrochemical cell layer 12.

The middle separator 20 further includes a first side edge 201, a second side edge 202, an air intake side edge 203, and an air exhaust side edge 204. Both the first side edge 201 and the second side edge 202 extend along the first direction 001. Both the air intake side edge 203 and the air exhaust side edge 204 extend along the second direction 002. To be specific, the first side edge 201 and the second side edge 202 are disposed opposite to each other along the second direction 002. In addition, the air intake side edge 203 and the air exhaust side edge 204 are disposed opposite to each other along the first direction 001.

A main air duct 23, a first secondary air duct 21, and a second secondary air duct 22 are further disposed in the middle separator 20. The main air duct 23 penetrates the middle separator 20 along the first direction 001. To be specific, the main air duct 23 includes a main air intake end 231 and a main air exhaust end 232 that are opposite to each other. The main air intake end 231 and the main air exhaust end 232 are disposed opposite to each other along the first direction 001. The main air intake end 231 is communicated with the air intake side edge 203. The main air exhaust end 232 is communicated with the air exhaust side edge 204.

In this way, an air flow channel may be formed in the main air duct 23. After entering the main air duct 23 from the main air intake end 231, cooling air may flow along the main air duct 23 and flow out of the middle separator 20 from the main air exhaust end 232. In a working process of the battery module 100 in this application, the electrochemical cell assembly 10 generates heat, thereby increasing a temperature of the middle separator 20. The flow of the outside cooling air in the main air duct 23 may take away high-temperature air at the middle separator 20, thereby reducing the overall temperature of the middle separator 20. It may be understood that the middle separator 20 with a reduced temperature may implement heat dissipation for the first electrochemical cell layer 11 and the second electrochemical cell layer 12 respectively through the first plane 205 and the second plane 206.

In the embodiments shown in FIG. 4 and FIG. 5, there are a plurality of main air ducts 23. The plurality of main air ducts 23 are arranged in the middle separator 20 along the second direction 002. In this way, a structure that the plurality of main air ducts 23 extend side by side along the first direction 001 is formed in the middle separator 20. The main air ducts 23 arranged side by side increase a flow area of cooling air, so that more high-temperature air can be taken away from the middle separator 20. In other words, an area of cooling performed by the middle separator 20 on the first electrochemical cell layer 11 and the second electrochemical cell layer 12 is increased, and better heat dissipation effect can be implemented.

In a schematic diagram of FIG. 5, the main air duct 23 further includes an upper main air duct 233 and a lower main air duct 234. An opening 235 is disposed on the upper main air duct 233. The opening 235 is disposed in a manner of facing the first plane 205. In other words, the opening 235 facing the first electrochemical cell layer 11 is disposed on the upper main air duct 233. The opening 235 is also disposed on the lower main air duct 234. The opening 235 of the lower main air duct 234 is disposed in a manner of facing the second plane 206. In other words, the opening 235 facing the second electrochemical cell layer 12 is disposed on the lower main air duct 234. In the schematic diagram shown in the figure, the opening 235 also penetrates the middle separator 20 along the first direction 001. In some other embodiments, the opening 235 may be alternatively a structure formed discontinuously along the first direction 001, thereby improving overall structural stability of the middle separator 20. Alternatively, in some embodiments, a reinforcing rib may be further disposed inside the main air duct 23, so that a structure with variable cross sections is formed for the opening 235.

The opening 235 is disposed, so that cooling air in the main air duct 23 can directly act on outer surfaces of the first electrochemical cell layer 11 and the second electrochemical cell layer 12. To be specific, cooling air flowing in the upper main air duct 233 may act on the outer surface of the first electrochemical cell layer 11, and cooling air flowing in the lower main air duct 234 may also act on the outer surface of the second electrochemical cell layer 12. Cooling air may directly take away high-temperature air on the outer surfaces of the first electrochemical cell layer 11 and the second electrochemical cell layer 12 from the middle separator 20, so that the middle separator 20 has better cooling effect on the first electrochemical cell layer 11 and the second electrochemical cell layer 12 after the opening 235 is disposed.

In the schematic diagram of FIG. 5, the upper main air duct 233 and the lower main air duct 234 are further spaced along the second direction. In this way, within a range of the first plane 205, the upper main air ducts 233 are more evenly distributed; and within a range of the second plane 206, the lower main air ducts 234 are also relatively evenly distributed. Therefore, cooling effect of the main air duct 23 is more uniformly implemented for the first electrochemical cell layer 11 and the second electrochemical cell layer 12. In addition, in the schematic diagram of FIG. 5, the lower main air duct 234 is disposed between two adjacent upper main air ducts 233, and the upper main air duct 233 is also disposed between two adjacent lower main air ducts 234. It may be understood that, in some other embodiments, two or more lower main air ducts 234 may be alternatively disposed between two adjacent upper main air ducts 233, and two or more upper main air ducts 233 may be alternatively disposed between two adjacent lower main air ducts 234. Through the foregoing implementations, similar effect of more uniform heat dissipation can be achieved.

Figure 6:
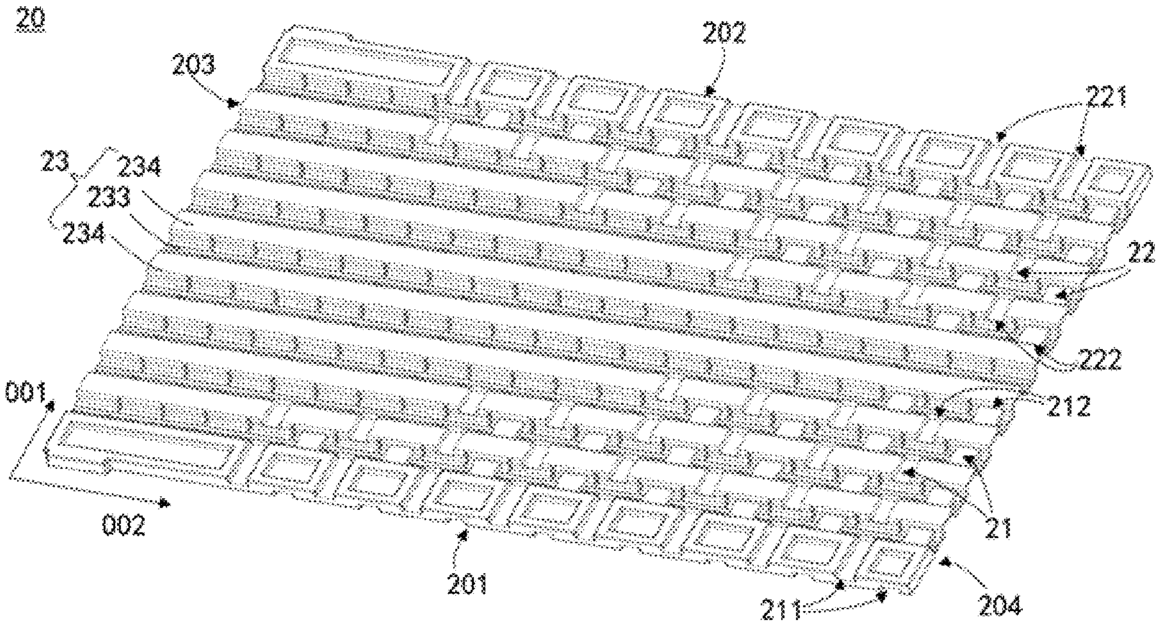
FIG. 6 is a schematic diagram of a structure in another observation direction of a middle separator in the electrochemical cell assembly according to FIG. 3.

Refer to a schematic diagram of a structure in another observation direction of the middle separator 20 shown in FIG. 6. The first secondary air duct 21 and the second secondary air duct 22 are respectively arranged on two opposite sides of the main air duct 23 along the second direction 002. The first secondary air duct 21 includes a first air intake end 211 and a first air exhaust end 212 that are opposite to each other. The first air intake end 211 is communicated with the first side edge 201. The first air exhaust end 212 is communicated with the main air duct 23. In this case, the first secondary air duct 21 may lead air outside the first side edge 201 into the main air duct 23. The second secondary air duct 22 includes a second air intake end 221 and a second air exhaust end 222 that are opposite to each other. The second air intake end 221 is communicated with the second side edge 202. Similarly, the second air exhaust end 222 is communicated with the main air duct 23. In this way, the second secondary air duct 22 may also lead air outside the second side edge 202 into the main air duct 23.

Figure 7:
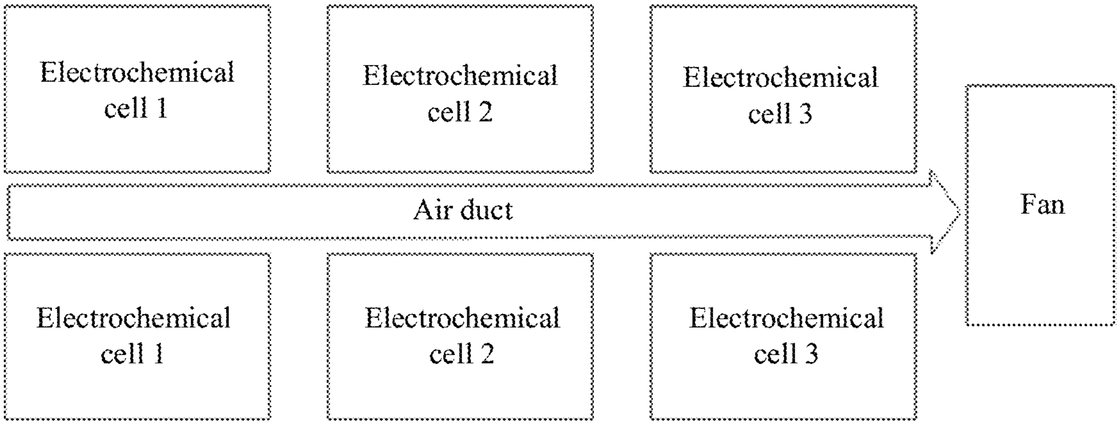
FIG. 7 is a schematic diagram of a heat dissipation solution of a battery module in the conventional technologies.

Refer to a heat dissipation mode shown in FIG. 7 of a battery module in the conventional technologies. The battery module in FIG. 7 is also of a structure in which two electrochemical cell layers are stacked. Three electrochemical cells are disposed side by side in each electrochemical cell layer. An air duct is disposed between the two electrochemical cell layers for heat dissipation. Cooling air enters the air duct from a side close to an electrochemical cell 1 and flows out from a side close to an electrochemical cell 3. In the heat dissipation mode in FIG. 7, when cooling air flows from the electrochemical cell 1 to the electrochemical cell 3, a temperature of cooling air gradually increases with extension of a flow path. Therefore, heat dissipation effect obtained at the electrochemical cell 1 is better than heat dissipation effect obtained at the electrochemical cell 3. It may be understood that, when more electrochemical cells are disposed side by side in each electrochemical cell layer, heat dissipation effect for the electrochemical cell located near an air intake side of the air duct is better than heat dissipation effect for the electrochemical cell located near an air exhaust side edge of the air duct. Therefore, in a working process of the battery module in the conventional technologies, temperatures of a plurality of electrochemical cells disposed side by side may actually differ.

Figure 8:
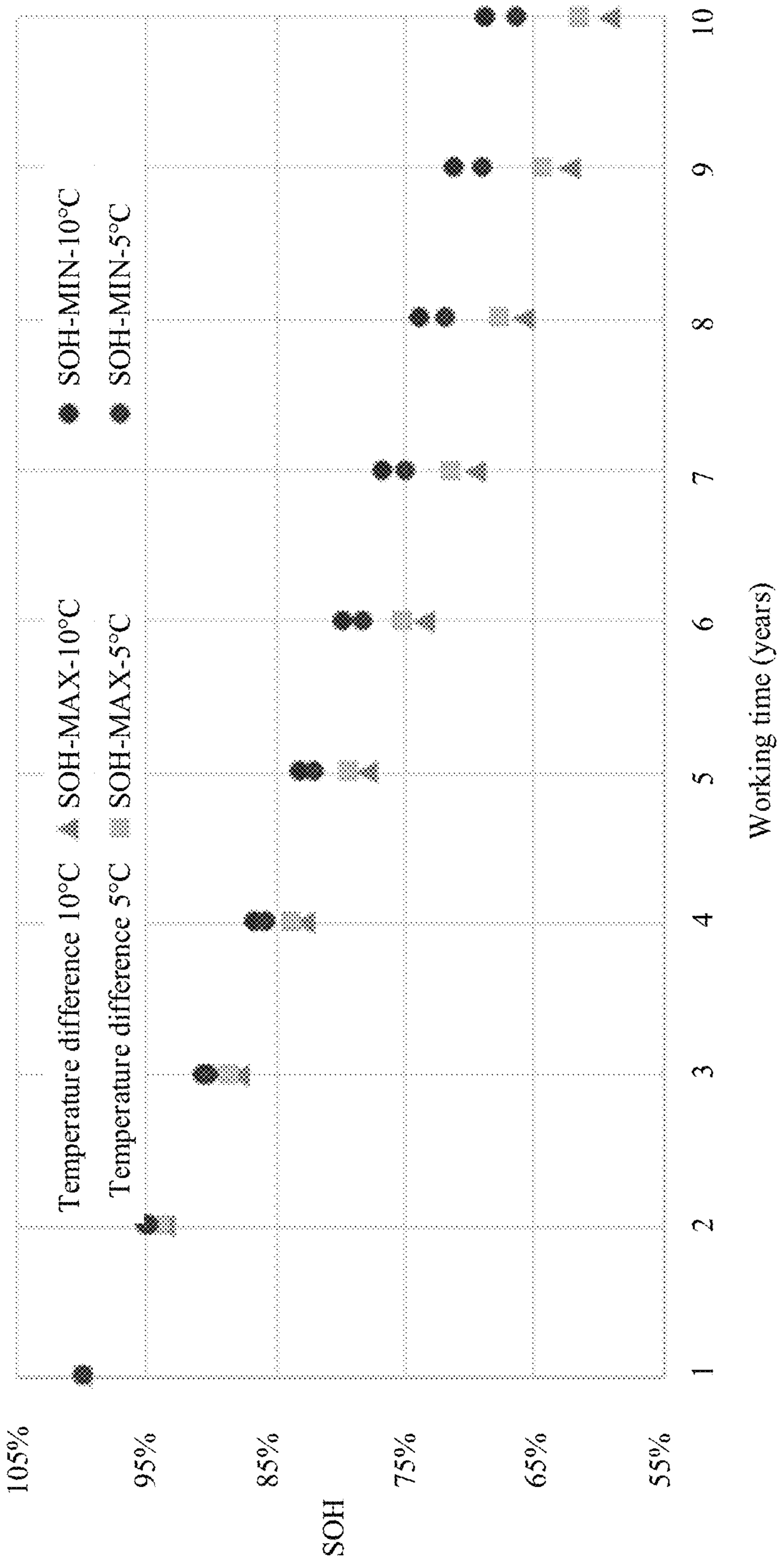
FIG. 8 is a diagram of test data in simulation of working of a battery module under different conditions.

The foregoing phenomenon is referred to as thermal cascade effect. FIG. 8 shows a test data result of the thermal cascade effect. Based on same energy density and same temperature control configuration, two battery modules whose internal temperature differences are respectively 10° C. and 5° C. are compared, and a state of health SOH of each battery module after 10 years of working is simulated. An SOH of an electrochemical cell in the battery module whose internal temperature difference is 10° C. is 2% lower than that of an electrochemical cell in the battery module whose internal temperature difference is 5° C. Synchronously, overall energy yields of the two battery modules in a 10-year working period are compared. The energy yield of the battery module whose internal temperature difference is 10° C. is about 1% less in a life cycle. In addition, temperature control measures are both based on air-cooled air conditioners. In this case, if it is required that the two battery modules reach a same utilization rate in the life cycle, when the battery module whose internal temperature difference is controlled to 5° C. is compared with the battery whose internal temperature difference is controlled to 10° C., a return air temperature of the battery module whose internal temperature difference is controlled to 5° C. may be increased by about 5° C., and an overall coefficient of performance (COP) of the battery module whose internal temperature difference is controlled to 5° C. can be increased by about 17%. In addition, the battery module whose temperature difference is controlled to 5° C. has a lower requirement on a capability of the air conditioner, and initial investment for the air conditioner may be reduced by 10%.

Figure 9:
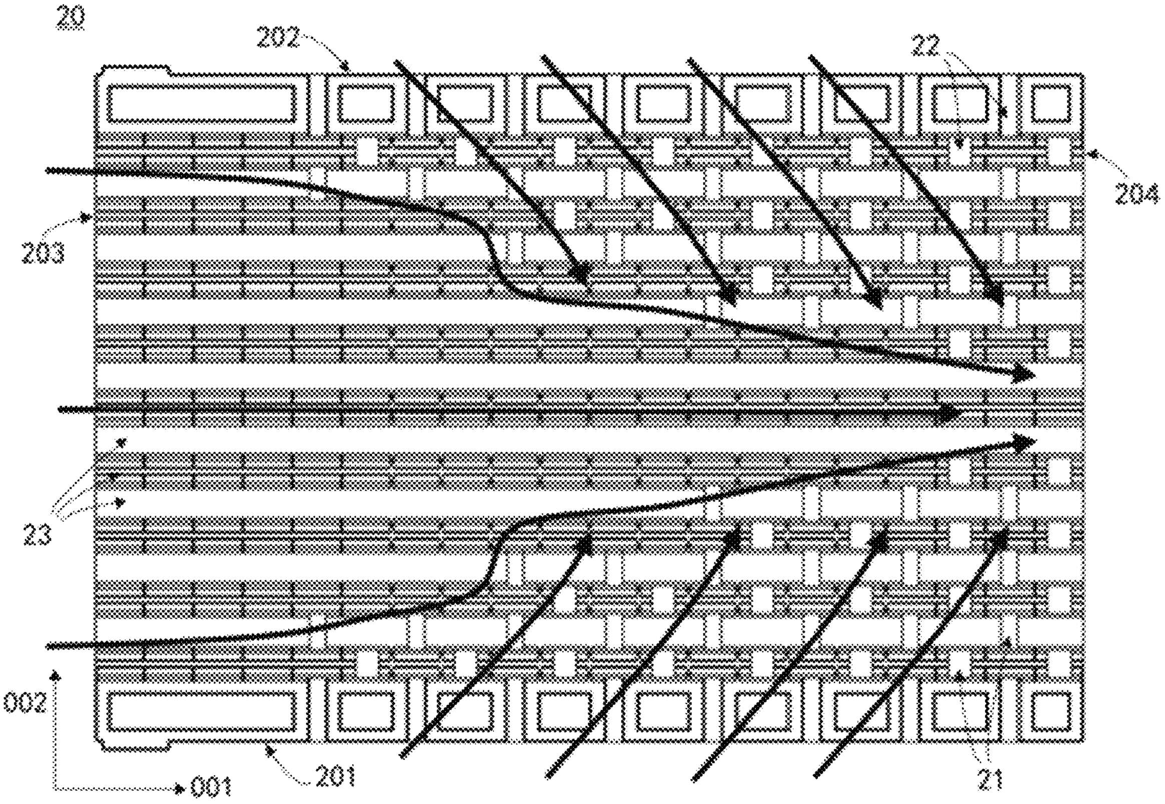
FIG. 9 is a schematic diagram of an air flow path in a middle separator in the electrochemical cell assembly according to FIG. 3.

Therefore, refer to a schematic diagram shown in FIG. 9 of a flow path of cooling air in the middle separator 20 in this application. After the first secondary air duct 21 and the second secondary air duct 22 are disposed, cooling air may further flow into the main air duct 23 from the first secondary air duct 21 and the second secondary air duct 22, and finally flow out of the air exhaust side edge 204 of the middle separator 20. Cooling air in the first secondary air duct 21 and cooling air in the second secondary air duct 22 may implement cooling and heat dissipation effect respectively for the first electrochemical cell layer 11 and the second electrochemical cell layer 12 in corresponding region on flow paths of cooling air. In addition, the length direction of the middle separator 20 is set along the first direction 001, so that the first secondary air duct 21 and the second secondary air duct 22 extend along a width direction of the middle separator 20 (namely, the second direction 002). In this case, extension paths of the first secondary air duct 21 and the second secondary air duct 22 are shorter than an extension path of the main air duct 23. Temperatures of air flowing into the main air duct 23 from the first secondary air duct 21 and the second secondary air duct 22 are lower than a temperature of air flowing all along the main air duct 23. Cooling air with the lower temperatures may effectively supplement cooling air whose temperature increases due to the thermal cascade effect in the main air duct 23, to decrease the overall air temperature in the main air duct 23.

In this way, in this application, the first secondary air duct 21 and the second secondary air duct 22 are disposed, so that the middle separator 20 can be used to make the temperature of air flowing in the main air duct 23 to be kept within a relatively low range. In the conventional technologies, there is a greater temperature difference between the electrochemical cell 1 and the electrochemical cell 3 due to better cooling effect for the electrochemical cell 1 close to an air duct inlet. In comparison with this phenomenon, in this application, a temperature of the electrochemical cell 15 on a side close to the air exhaust side edge 204 in the battery module 100 can be closer to a temperature of the electrochemical cell 15 on a side close to the air intake side edge 203. In other words, cooling effect for the electrochemical cell units 15 in the battery module 100 in this application tends to be more consistent, and a temperature difference between the electrochemical cell units 15 in the working process is correspondingly smaller. In this way, according to the battery module 100 in this application, a temperature difference between different electrochemical cell units 15 is further reduced. Overall temperature consistency is maintained for the electrochemical cell assembly 10, so that a service life of the battery module 100 in this application is prolonged.

Figure 10:
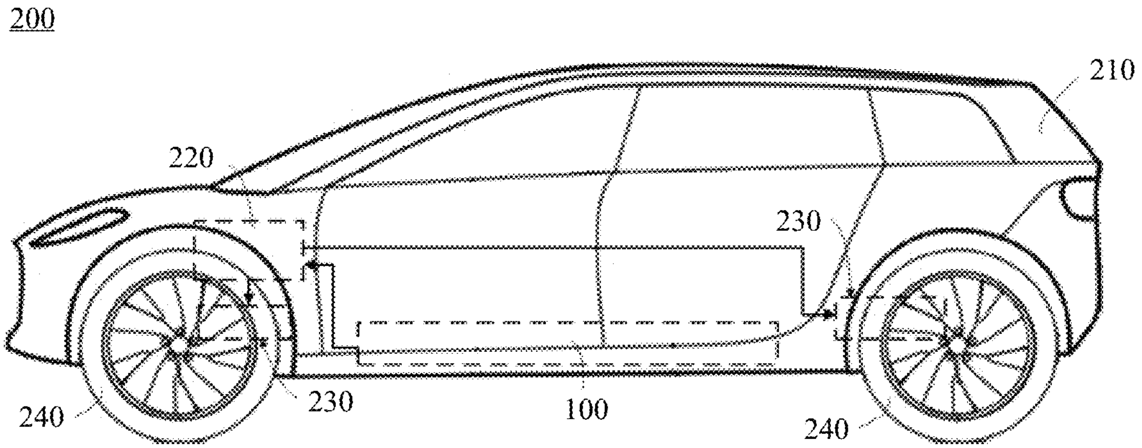
FIG. 10 is a schematic diagram of a structure of a transportation means according to this application.

It may be understood that the battery module 100 in this application may be used in a transportation means 200 in this application. As shown in FIG. 10, the transportation means 200 in this application may be an electric vehicle, a hybrid vehicle, or the like. The transportation means 200 includes a vehicle frame 210, a power apparatus 220, a transmission apparatus 230, and a plurality of wheels 240. The battery module 100 may be accommodated in the vehicle frame 210, and provide electric energy needed for the power apparatus 220 to work. The power apparatus 220 converts the electric energy into rotation power to output, and transfers the rotation power to each wheel 240 through the transmission apparatus 230, to drive the wheels 240 to rotate, so that the transportation means 200 travels on a road. In other words, the battery module 100 in this application may provide electric energy needed in a traveling process for the transportation means 200 in this application. The battery module 100 in this application effectively controls the temperature difference between the electrochemical cell units 15, thereby ensuring consistency of health of the electrochemical cell layers in the electrochemical cell assembly 10 and avoiding a phenomenon of a life short slab. In this way, an endurance mileage of the transportation means 200 in this application is further reliably maintained, and the transportation means has a longer service life.

In a schematic diagram of FIG. 10, the battery module 100 is disposed at a middle lower part of the vehicle frame 210. The power apparatus 220 is disposed at a front end of the vehicle frame 210. The battery module 100 is electrically connected to the power apparatus 220 through a conducting wire. It may be understood that, in some other embodiments, the battery module 100 may be alternatively disposed at a front end or a rear end of the vehicle frame 210, and is electrically connected to the power apparatus 220 through the conducting wire. Specific locations of the battery module 100 and the power apparatus 220 may be randomly disposed based on an arrangement of internal assemblies of the transportation means 200.

It should be pointed out that, corresponding to an embodiment in which no side ventilation hole 382 is disposed on the first side board 33 and the second side board 34, cooling air in the case 30 mainly enters from the main ventilation hole 381 on the air intake board 31. In this case, air entering the case 30 may also enter the middle separator 20 separately through the main air duct 23, the first secondary air duct 21, and the second secondary air duct 22, to implement a heat dissipation function of the middle separator 20 for each electrochemical cell layer.

In the foregoing figure, there are a plurality of first secondary air ducts 21, and the plurality of first secondary air ducts 21 are spaced along the first direction 001; and there are also a plurality of second secondary air ducts 22, and the plurality of second secondary air ducts 22 are also spaced along the first direction 001. It may be understood that the plurality of first secondary air ducts 21 and the plurality of second air ducts 22 are disposed, to increase an air intake volume of the two opposite sides of the middle separator 20. Therefore, more cooling air outside the first side edge 201 and the second side edge 202 can enter the main air duct 23, to further decrease the temperature of air in the main air duct 23 and effectively supplement cooling air flowing in the main air duct 23.

Figure 11:
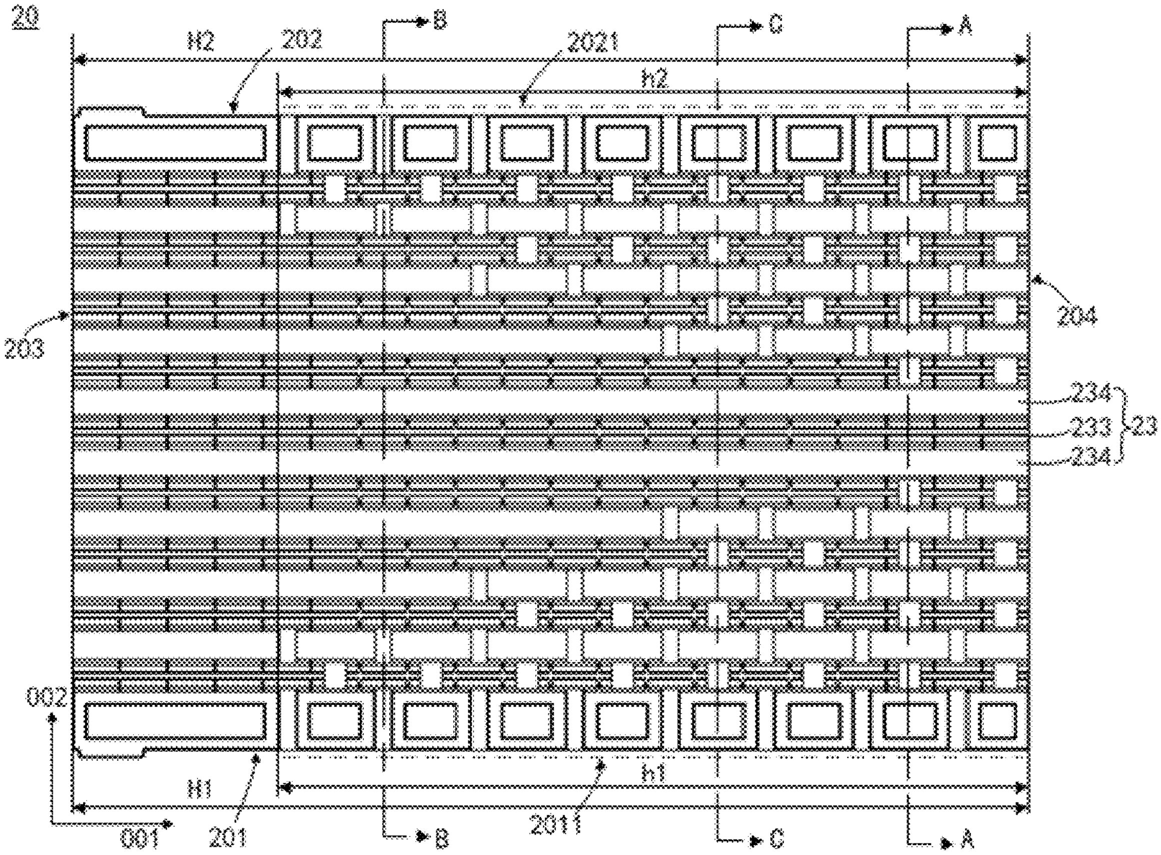
FIG. 11 is a schematic diagram of a structure of another embodiment of a middle separator in the electrochemical cell assembly according to FIG. 3.
Figure 12:
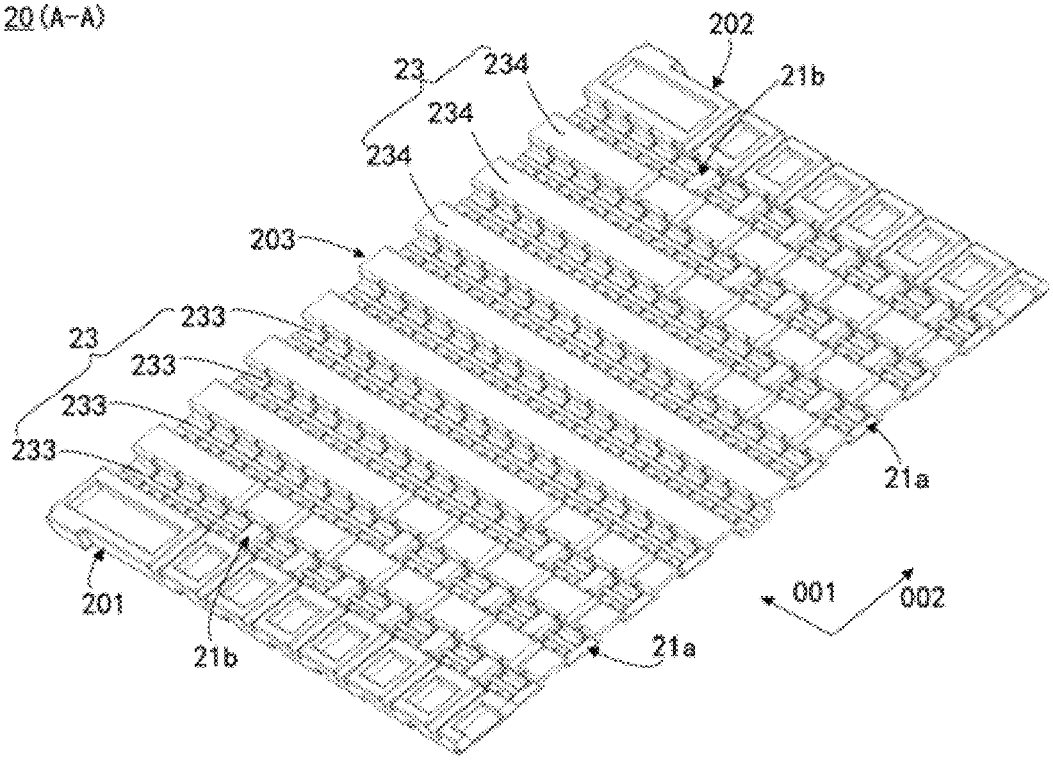
FIG. 12 is a schematic diagram of a structure of the middle separator according to FIG. 11 after being cut along A-A.
Figure 13:
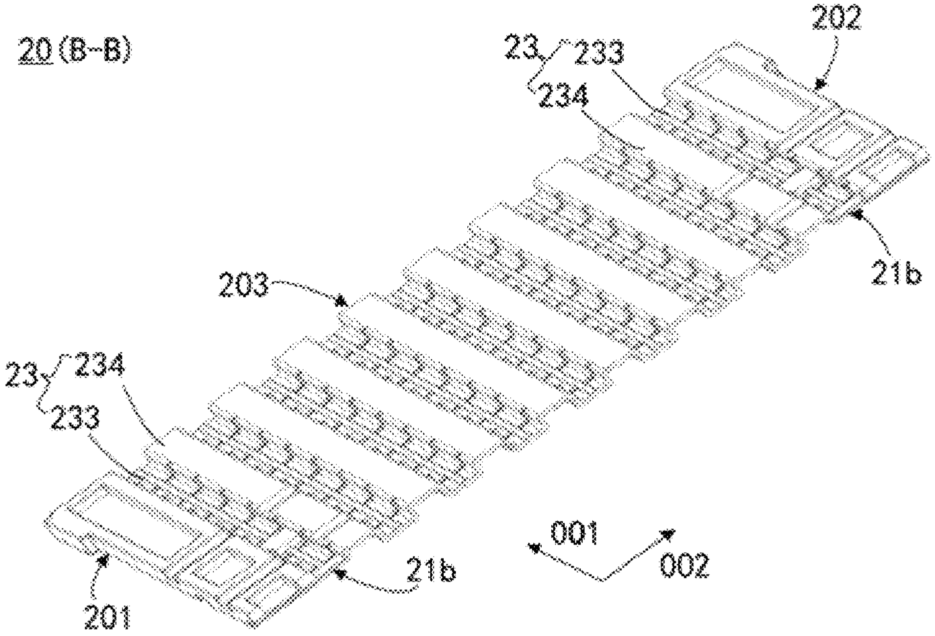
FIG. 13 is a schematic diagram of a structure of the middle separator according to FIG. 11 after being cut along B-B.
Figure 14:
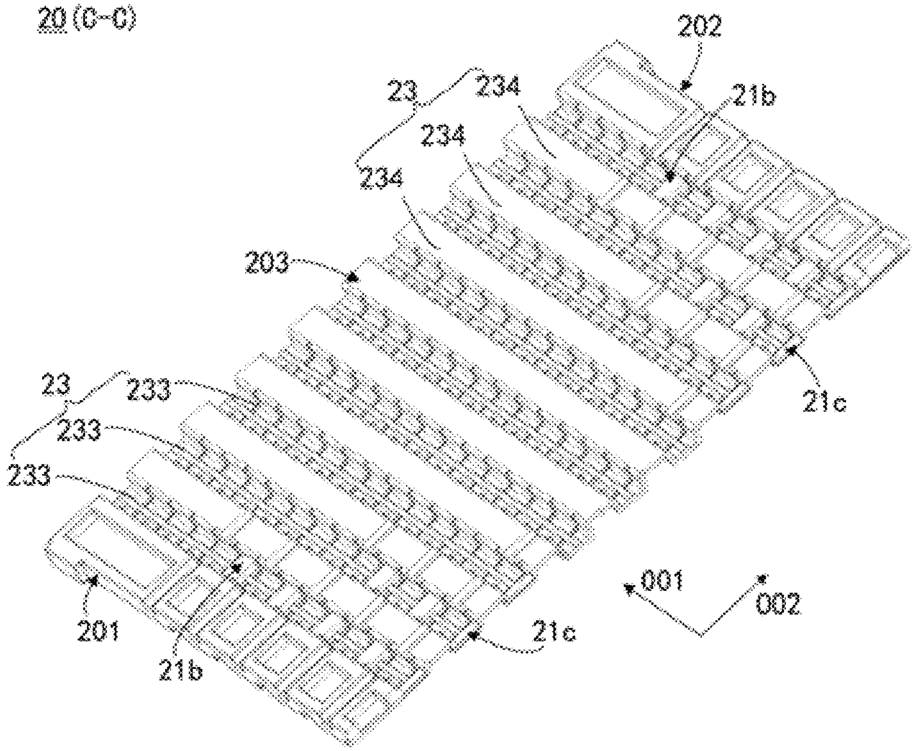
FIG. 14 is a schematic diagram of a structure of the middle separator according to FIG. 11 after being cut along C-C.

Refer to a schematic diagram of the middle separator 20 shown in FIG. 11, and schematic diagrams of structures shown in FIG. 12, FIG. 13 and FIG. 14 corresponding to different locations of cross sections of the middle separator 20 in FIG. 11. In an embodiment in which the middle separator 20 includes a plurality of main air ducts 23, a plurality of first secondary air ducts 21, and a plurality of second secondary air ducts 22, the first secondary air duct 21 is further divided into a first strong secondary air duct 21*a* and a first weak secondary air duct 21*b*. Along the extension path of the main air duct 23 (namely, the first direction 001), the first strong secondary air duct 21*a* is located between the first weak secondary air duct 21*b* and the air exhaust side edge 204. In other words, the first strong secondary air duct 21*a* is closer to the air exhaust side edge 204 than the first weak secondary air duct 21*b*. Further, a quantity of main air ducts 23 communicated with the first strong secondary air duct 21*a* is further greater than or equal to (greater than in the embodiment in FIG. 11) a quantity of main air ducts 23 communicated with the first weak secondary air duct 21*b*.

With reference to FIG. 12, it can be learned that the first strong secondary air duct 21*a* is communicated with four upper main air ducts 233 and three lower main air ducts 234, namely, seven main air ducts 23 in total. However, in FIG. 13, the first weak secondary air duct 21*b* is communicated with only one upper main air duct 233 and one lower main air duct 234, namely, two main air ducts 23 in total. It may be understood that, for the first secondary air duct 21, a greater quantity of main air ducts 23 communicated with the first secondary air duct 21 indicates more cooling air flowing from the first secondary air duct 21 into the main air duct 23. In other words, a longer extension distance of the first secondary air duct 21 indicates better air supplementing effect of the first secondary air duct 21 for the main air duct 23.

For cooling air flowing along the path of the main air duct 23, the temperature of cooling air gradually increases as the flow path extends. To be specific, in the main air duct 23, the temperature of cooling air closer to the air exhaust side edge 204 is higher, and the temperature of cooling air closer to the air intake side edge 203 is lower. Therefore, in the middle separator 20 in this application, the side close to the air exhaust side edge 204 has a lower requirement for cooling air than the side close to the air intake side edge 203. A greater quantity of main air ducts 23 communicated with the first strong secondary air duct 21*a* close to the air exhaust side edge 204 indicates more cooling air flowing into the main air duct 23 through the first strong secondary air duct 21*a*, so that a higher requirement of the region for cooling air is met. More cooling air flows into the first strong secondary air duct 21*a*, to effectively supplement inherent cooling air in the main air duct 23 and reduce the overall temperature of cooling air on the side close to the air exhaust side edge 204. The first weak secondary air duct 21*b* is closer to the air intake side edge 203, and a temperature increase of cooling air inherent in the main air duct 23 is relatively small. Therefore, the first weak secondary air duct 21*b* has a lower requirement for cooling air. The first weak secondary air duct 21*b* only needs to be communicated with a relatively small quantity of main air ducts 23 to meet a heat dissipation requirement.

It should be pointed out that, in the middle separator 20 in this application, when there are a plurality of first secondary air ducts 21, strong and weak secondary air ducts are defined only in a relative relationship. To be specific, for any two first secondary air ducts 21, when one first secondary air duct 21 is closer to the air exhaust side edge 204 than the other first secondary air duct 21, the first secondary air duct 21 closer to the air exhaust side edge 204 may be considered as a strong secondary air duct, and the other first secondary air duct 21 is considered as a weak secondary air duct.

For example, a first secondary air duct 21*c* shown in FIG. 14 is closer to the air exhaust side edge 204 than the first weak secondary air duct 21*b* shown in FIG. 13. Therefore, the first secondary air duct 21*c* shown in FIG. 14 may be considered as a strong secondary air duct. The first secondary air duct 21*c* is communicated with three upper main air ducts 233 and three lower main air ducts 234, namely, six main air ducts 23 in total. The quantity is greater than a quantity (2) of the main air ducts 23 communicated with the first weak secondary air duct 21*b* shown in FIG. 13. Compared with the first strong secondary air duct 21*a* shown in FIG. 12, the first secondary air duct 21*c* shown in FIG. 14 is located on a side away from the air exhaust side edge 204. In this case, the first secondary air duct 21*c* shown in FIG.

14 is considered as a weak secondary air duct, and the quantity (6) of the main air ducts 23 communicated with the first secondary air duct 21*c* is less than a quantity (7) of the main air ducts 23 communicated with the first strong secondary air duct 21*a* shown in FIG. 12.

Correspondingly, the second secondary air duct 22 may also include a second strong secondary air duct 22*a* and a second weak secondary air duct 22*b*. The second strong secondary air duct 22*a* is also located between the second weak secondary air duct 22*b* and the air exhaust side edge 204. In addition, a quantity of main air ducts 23 communicated with the second strong secondary air duct 22*a* is greater than or equal to a quantity of main air ducts 23 communicated with the second weak secondary air duct 22*b*. In addition, strong and weak secondary air ducts in the second secondary air duct 22 are also in a relative relationship. The second secondary air duct 22*c* shown in FIG. 14 may be a strong secondary air duct corresponding to the second weak secondary air duct 22*b* shown in FIG. 13, or may be a weak secondary air duct corresponding to the second strong secondary air duct 22*a* shown in FIG. 12. The second secondary air duct 22 has similar effect as the first secondary air duct 21 for distinguishing a strong secondary air duct and a weak secondary air duct.

Still with reference to FIG. 11, a first section 2011 is disposed on the first side edge 201. The first section 2011 is located on a side that is of the first side edge 201 and that is close to the air exhaust side edge 204. The plurality of first secondary air ducts 21 are all located in the first section 2011. A length h1 of the first section 2011 along the first direction 001 and a length H1 of the first side edge 201 meet a condition that h1 is less than or equal to ¾H1. A second section 2021 is disposed on the second side edge 202. The second section 2021 is located on a side that is of the second side edge 202 and that is close to the air exhaust side edge 204. The plurality of second secondary air ducts 22 are all located in the second section 2021. In an embodiment, a length h2 of the second section 2021 along the first direction 001 and a length H2 of the second side edge meet a condition that h2 is less than or equal to ¾H2.

Similar to a principle of disposing the strong and weak secondary air ducts, when cooling air enters the middle separator 20 from the air intake side edge 203, an initial temperature of cooling air is relatively low, and a requirement for cooling air introduced from the first side edge 201 and the second side edge 202 is correspondingly low. Therefore, the first secondary air duct 21 and the second secondary air duct 22 do not need to be disposed on the side close to the air intake side edge 203, and a heat dissipation requirement for the region can be met. However, after cooling air in the main air duct 23 flows for a section of the path, the temperature of cooling air gradually increases. In this case, the first secondary air duct 21 and the second secondary air duct 22 are introduced to supplement the inherent cooling air in the main air duct 23, to ensure that the overall temperature of cooling air in the main air duct 23 tends to be consistent. Therefore, the first section 2011 and the second section 2021 are respectively disposed at locations that are relatively away from the air intake side edge 203. The plurality of first secondary air ducts 21 and the plurality of second secondary air ducts 22 are respectively disposed in the first section 2011 and the second section 2021. This helps maintain temperature consistency of cooling air in the main air duct 23. Therefore, it is ensured that heat dissipation effect tends to be consistent for the electrochemical cell units 15 in the first electrochemical cell layer 11 and the second electrochemical cell layer 12, and a temperature difference between the electrochemical cell units 15 is correspondingly reduced.

In one embodiment, at least one main air duct 23 is disposed between the first secondary air duct 21 and the second secondary air duct 22. As shown in FIG. 11, on a side closest to the air exhaust side edge 204, two lower main air ducts 234 and one upper main air duct 233, namely, three main air ducts 23 in total are still disposed between the first secondary air duct 21 communicated with a largest quantity of main air ducts 23 and the second secondary air duct 22 communicated with a largest quantity of main air ducts 23. The three main air ducts 23 that are not communicated with the first secondary air duct 21 or the second secondary air duct 22 may be used to ensure that cooling air flows along the first direction 001. To be specific, cooling air that enters the main air duct 23 from the air intake side edge 203 may flow out of the middle separator 20 along the first direction 001 on a path formed by the three main air ducts 23. The first secondary air duct 21 and the second secondary air duct 22 roughly extend along the second direction 002, and the second direction 002 is perpendicular to the first direction 001. In this case, a flow direction of cooling air flowing into the middle separator 20 from the first secondary air duct 21 and the second secondary air duct 22 is roughly perpendicular to a flow direction of the inherent cooling air in the main air duct 23, thereby cutting off the air flowing in the main air duct 23 and partially hindering the inherent cooling air in the main air duct 23 from flowing along the first direction 001.

However, if there is no main air duct 23 disposed between the first secondary air duct 21 and the second secondary air duct 22, the first secondary air duct 21 is directly communicated with the second secondary air duct 22. In this case, an air flow path penetrating the middle separator 20 is formed along the second direction 002. Due to this part of flow path, a flow cut-off phenomenon occurs for the inherent cooling air flowing in all the main air ducts 23. As a result, the inherent cooling air in the main air ducts 23 cannot smoothly flow out of the middle separator 20 from the air exhaust side edge 204. This may lead to a phenomenon that the cooling air flowing into the main air ducts 23 is reduced, and heat dissipation effect is reduced for the electrochemical cell unit 15 on the side close to the air intake side edge 203. However, at least one main air duct 23 is still disposed between the first secondary air duct 21 communicated with the largest quantity of main air ducts 23 and the second secondary air duct 22 communicated with the largest quantity of main air ducts 23. Therefore, by using the at least one main air duct 23, it may be ensured that the inherent cooling air in at least some of the main air ducts 23 can smoothly flow out of the middle separator 20 from the air exhaust side edge 204. Correspondingly, the cooling air flowing into the main air ducts 23 from the air intake side edge 203 increases, thereby ensuring cooling effect for the electrochemical cell unit 15 in the region.

Figure 15:
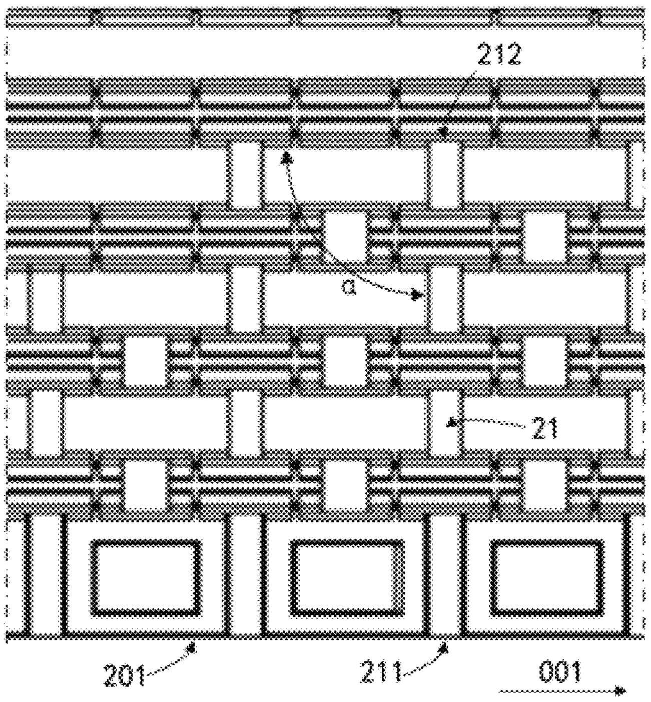
FIG. 15 is a partially enlarged schematic diagram of the middle separator according to FIG. 11 on a first side edge.

Refer to a partial schematic diagram shown in FIG. 15 of the middle separator 20 close to the first secondary air duct 21. For the first air intake end 211 and the first air exhaust end 212 of the first secondary air duct 21 that are opposite to each other, along an extension direction of the first side edge 201 (namely, the first direction 001), a projection of the first air exhaust end 212 on the first side edge 201 needs to be located between the first air intake end 211 and the air exhaust side edge 204. For details, refer to FIG. 15. An included angle α is formed by the first secondary air duct 21 and the main air duct 23. The included angle α may be understood as a turning angle at which the cooling air in the first secondary air duct 21 continues to flow along the main air duct 23 after entering the main air duct 23. The projection of the first air exhaust end 212 on the first side edge 201 needs to be set between the first air intake end 211 and the air exhaust side edge 204. It may be ensured that the turning angle of the cooling air entering the main air duct 23 from the first secondary air duct 21 is less than or equal to 90 degrees, so that the cooling air can continue to flow along the main air duct 23 more smoothly.

Correspondingly, for the second air intake end 221 and the second air exhaust end 222 of the second secondary air duct, the following needs to be met: A projection of the second air exhaust end 222 on the second side edge 202 is located between the second air intake end 221 and the air exhaust side edge 204. The cooling air that enters the main air duct 23 from the second secondary air duct 21 can also continue to flow along the main air duct 23 more smoothly.

Figure 16:
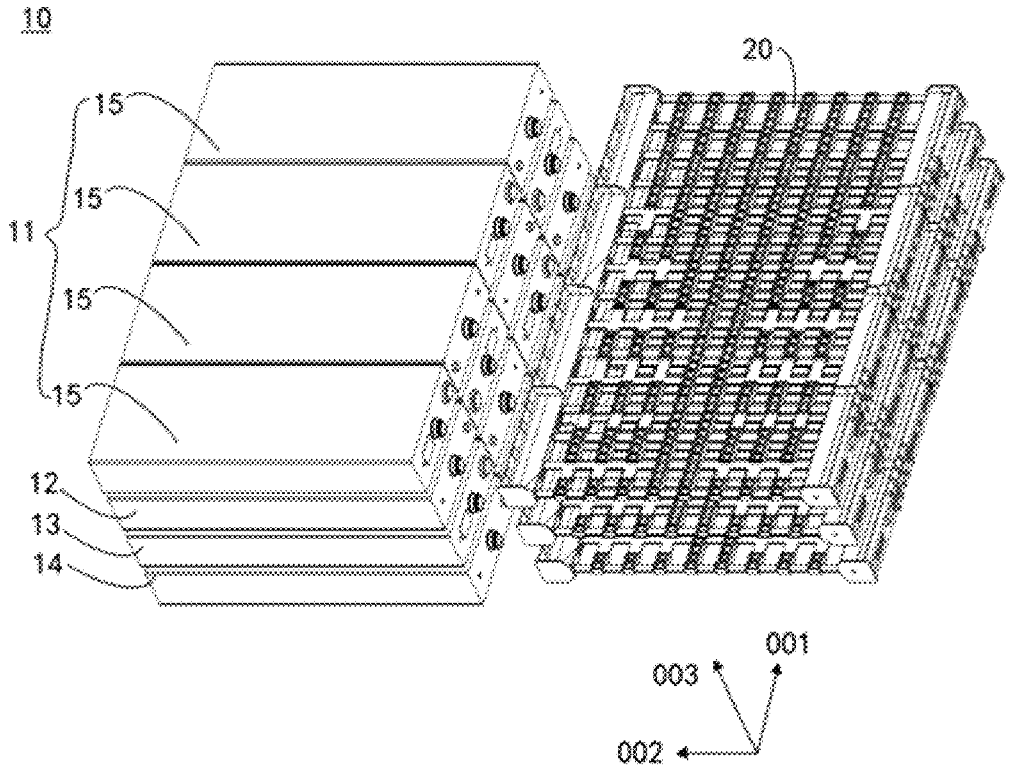
FIG. 16 is a schematic exploded view of another embodiment of an electrochemical cell assembly in the battery module according to FIG. 2.

FIG. 16 shows a structure of another electrochemical cell assembly 10. In this embodiment, the electrochemical cell assembly 10 also includes four electrochemical cell layers: a first electrochemical cell layer 11, a second electrochemical cell layer 12, a third electrochemical cell layer 13, and a fourth electrochemical cell layer 14. A middle separator 20 is further disposed between two adjacent electrochemical cell layers. In other words, three middle separators 20 are further included in FIG. 16. Refer to a structure of the middle separator 20 in this embodiment shown in FIG. 17 and FIG. 18. In this embodiment, the middle separator 20 also includes a first side edge 201, a second side edge 202, an air intake side edge 203, and an air exhaust side edge 204. In addition, structures of limiting boards 207 are further disposed at locations of the first side edge 201 and the second side edge 202 of the middle separator 20.

The limiting boards 207 respectively extend in directions of a first plane 205 and a second plane 206, and form limiting structures at the first side edge 201 and the second side edge 202 of the middle separator 20. It may be understood that, because the first side edge 201 and the second side edge 202 are arranged along the second direction 002, when each electrochemical cell layer is attached to and fastened to the middle separator 20, the limiting boards 207 may protrude from a side wall of each electrochemical cell layer, and is configured to limit displacement of each electrochemical cell layer relative to the middle separator 20 in the second direction 002.

Figure 19:
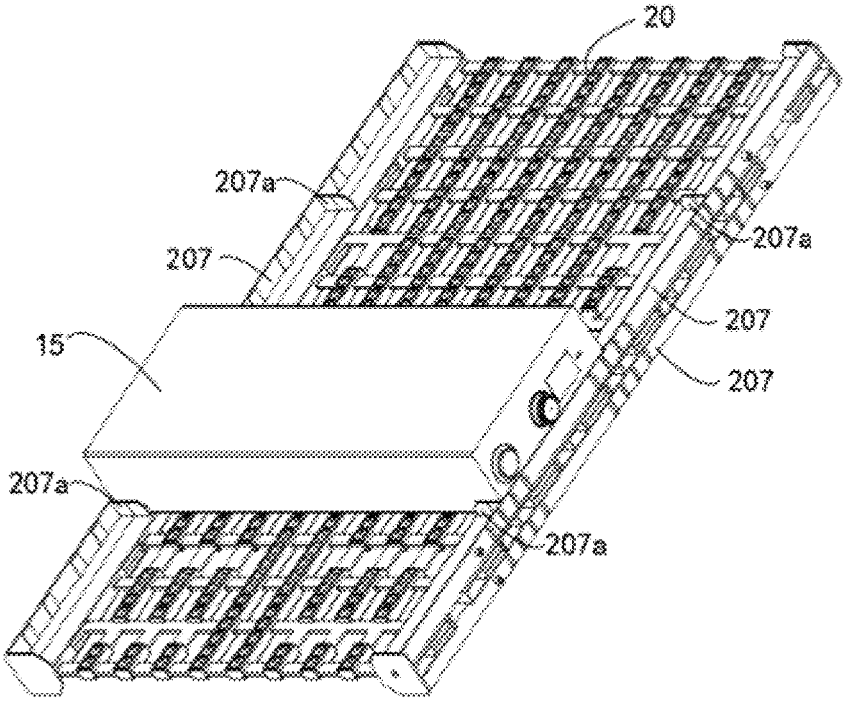
FIG. 19 is a schematic diagram of cooperation between a middle separator in the electrochemical cell assembly according to FIG. 16 and a single electrochemical cell unit.

Further, a plurality of limiting sub-boards 207*a* are further disposed at the locations of the first side edge 201 and the second side edge 202 of the middle separator 20. The limiting sub-boards 207*a* are spaced along an arrangement direction of the electrochemical cells 15 in the electrochemical cell layer (namely, the first direction 001), and extend from the limiting boards 207 towards a center of the middle separator 20. A distance between two adjacent limiting sub-boards 207*a* matches overall dimensions of a single electrochemical cell unit 15, so that the single electrochemical cell unit 15 can be inserted into a gap between the two adjacent limiting sub-boards 207*a* (as shown in FIG. 19).

To be specific, in this embodiment, the middle separator 20 may limit the electrochemical cell layers to which the middle separator 20 is attached and fastened through cooperation of the limiting boards 207 and the limiting sub-boards 207*a*, and may maintain a relative distance between the electrochemical cell units 15 in the electrochemical cell layers. In this way, in a process of moving with the transportation means 200, for each electrochemical cell unit 15, a fixed relative location can be maintained, and a fixed location relative to the middle separator 20 can be maintained, so that heat dissipation effect for each electrochemical cell unit 15 is ensured.

Figure 20:
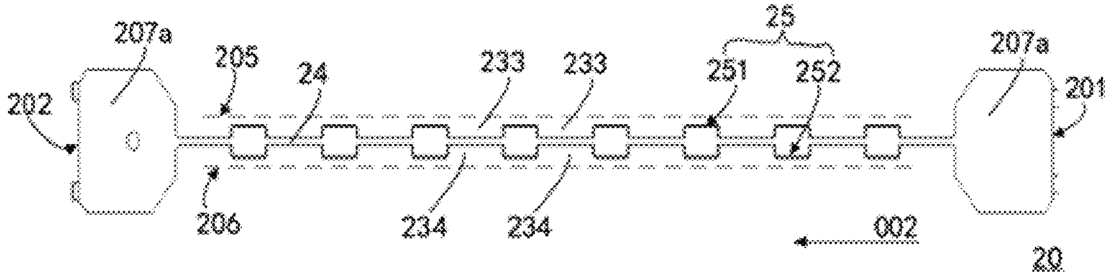
FIG. 20 is a schematic diagram of a structure in a front view direction of the middle separator in the electrochemical cell assembly according to FIG. 17.

Further with reference to FIG. 20, the middle separator 20 in this embodiment also includes upper main air ducts 233 and lower main air ducts 234. However, different from the middle separator 20 shown in FIG. 5, the middle separator 20 in this application is further provided with a base board 24 and air guide strips 25 protruding from the base board 24 between the upper main air ducts 233 and the lower main air ducts 234. The base board 24 is configured to form a main body structure of the board-shaped middle separator 20. The air guide strip 25 includes an upper air guide strip 251 and a lower air guide strip 252. The upper air guide strip 251 extends from the base board 24 along the third direction 003. In addition, a plurality of upper air guide strips 251 are spaced along the second direction 002. Outer surfaces that are of the plurality of upper air guide strips 251 and that are away from the base board 24 form a first plane 205 of the middle separator 20. The upper air guide strip 251 is further in a long strip shape along the first direction 001 on the middle separator 20. One upper main air duct 233 is formed between two adjacent upper air guide strips 251.

The lower air guide strip 252 extends from the base board 24 along the third direction 003. An extension direction of the lower air guide strip 252 is opposite to an extension direction of the upper air guide strip 251. There are also a plurality of lower air guide strips 252. The plurality of lower air guide strips 252 are spaced and disposed along the second direction 002. Surfaces that are of the plurality of lower air guide strips 252 and that are away from the base board 24 form a second plane 206 of the middle separator 20. The lower air guide strip 252 is further in a long strip shape along the first direction 001 on the middle separator 20. One lower main air duct 233 may be formed between two adjacent lower air guide strips 252.

In a schematic diagram of FIG. 20, a quantity of the upper air guide strips 251 and a quantity of the lower air guide strips 252 are the same. One lower air guide strip 252 is correspondingly disposed at a location of each upper air guide strip 251. In this way, in this embodiment, a plurality of upper main air ducts 233 disposed side by side and a plurality of lower main air ducts 234 disposed side by side are formed. One part of cooling air that enters from the main air intake end 231 may flow along the plurality of upper main air ducts 233, and is configured to perform cooling and heat dissipation on the first electrochemical cell layer 11 located at the first plane 205 of the middle separator 20. The other part of the cooling air that enters from the main air intake end 231 may flow along the plurality of lower main air ducts 234, and is configured to perform cooling and heat dissipation on the second electrochemical cell layer 12 located at the second plane 206 of the middle separator 20. When locations of the upper main air duct 233 are in a one-to-one correspondence with locations of the lower main air duct 234, heat dissipation effect tends to be consistent for the first electrochemical cell layer 11 and the second electrochemical cell layer 12 that are respectively arranged on two sides of the middle separator 20.

Figure 17:
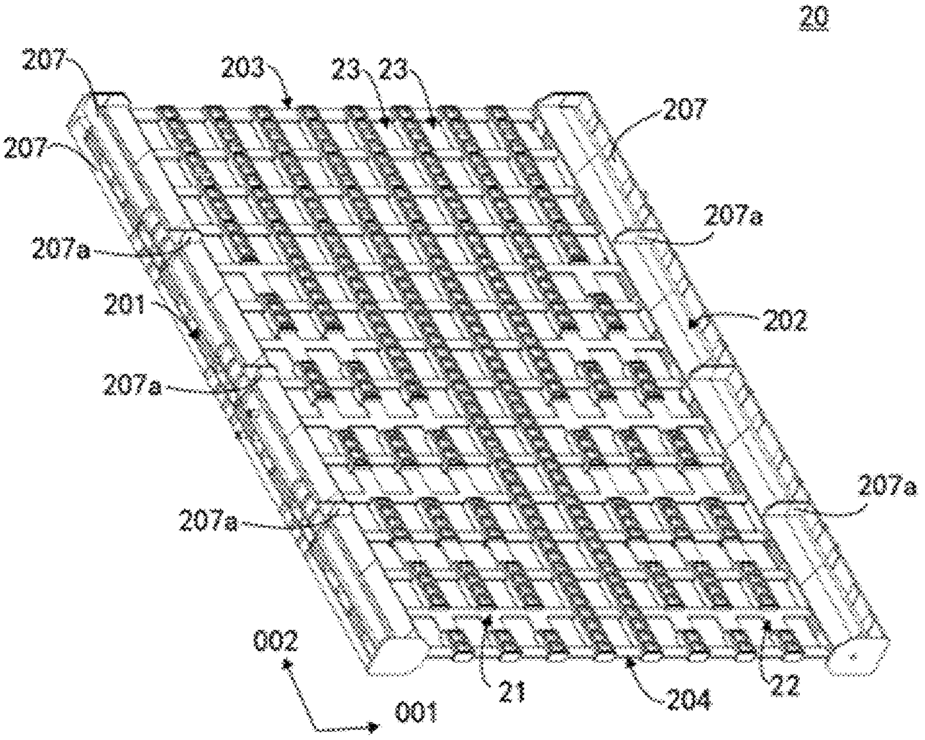
FIG. 17 is a schematic exploded view of another embodiment of a middle separator in the electrochemical cell assembly according to FIG. 16.
Figure 18:
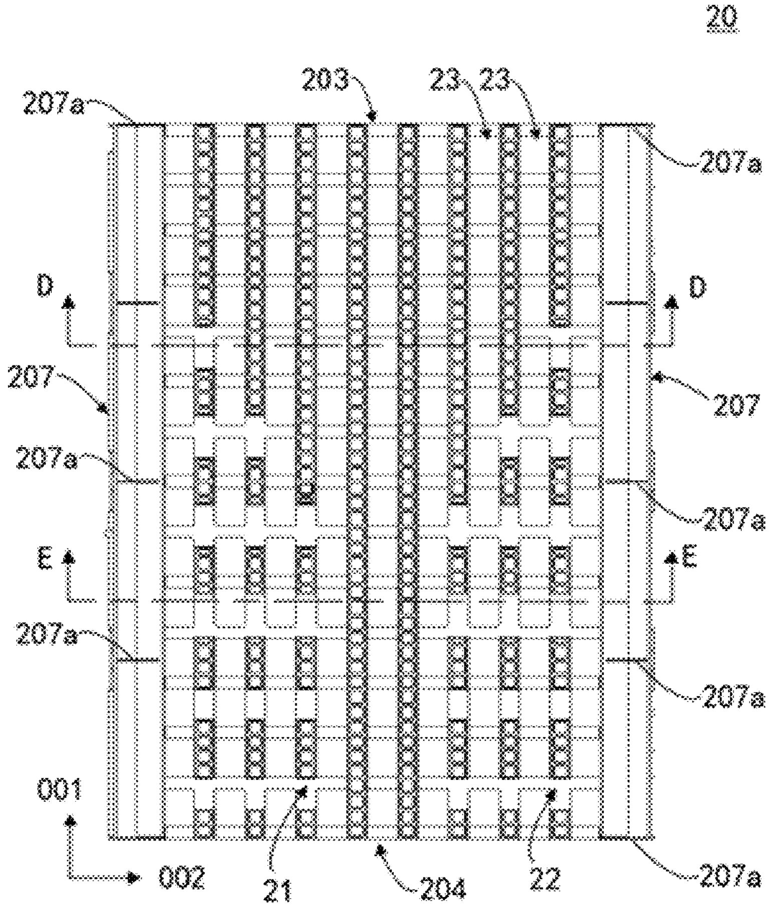
FIG. 18 is a schematic diagram of a structure in another observation direction of the middle separator in the electrochemical cell assembly according to FIG. 17.
Figure 21:
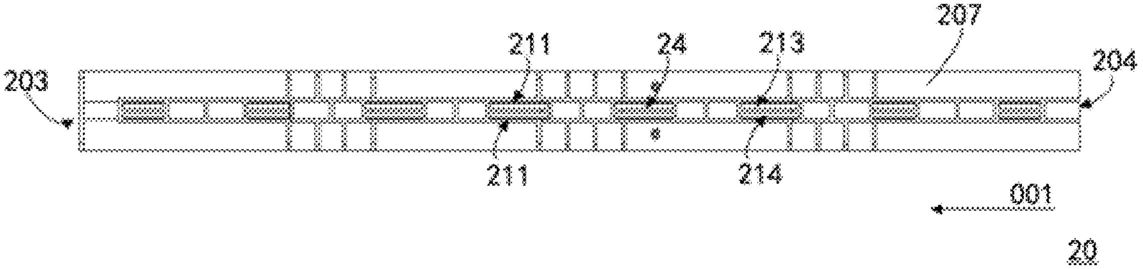
FIG. 21 is a schematic diagram of a structure in a side view direction of the middle separator in the electrochemical cell assembly according to FIG. 17.

Refer back to the schematic diagrams in FIG. 17 and FIG. 18. In the middle separator 20 in this embodiment, a first secondary air duct 21 and a second secondary air duct 22 are further disposed. With reference to FIG. 21, at the first side edge 201, a plurality of notches are disposed at a location of the limiting board 207. The plurality of notches are constructed as the first air intake end 211 of the first secondary air duct 21. Further, a plurality of notches are further formed on upper and lower sides of the base board 24. The base board 24 may divide the first secondary air duct 21 into a first upper secondary air duct 213 and a first lower secondary air duct 214 (with reference to FIG. 22 and FIG. 23). In this case, the notches located on the upper side of the base board 24 may be communicated with the first upper secondary air duct 213. The cooling air enters the first upper secondary air duct 213 after passing through the notches, and then flows into the upper main air duct 233 from the first air exhaust end 212. The notches located on the lower side of the base board 24 are communicated with the first lower secondary air duct 214. The cooling air enters the first lower secondary air duct 214 after passing through the notches, and then flows into the lower main air duct 234 from the first air exhaust end 212. It may be understood that, at the second side edge 202, a plurality of notches are also disposed at a location of the limiting board 207, and are configured to form the second air intake end 221 of the second secondary air duct 22. In addition, the second secondary air duct 22 may also be divided into an upper secondary air duct and a lower secondary air duct by the middle separator 20.

Figure 22:
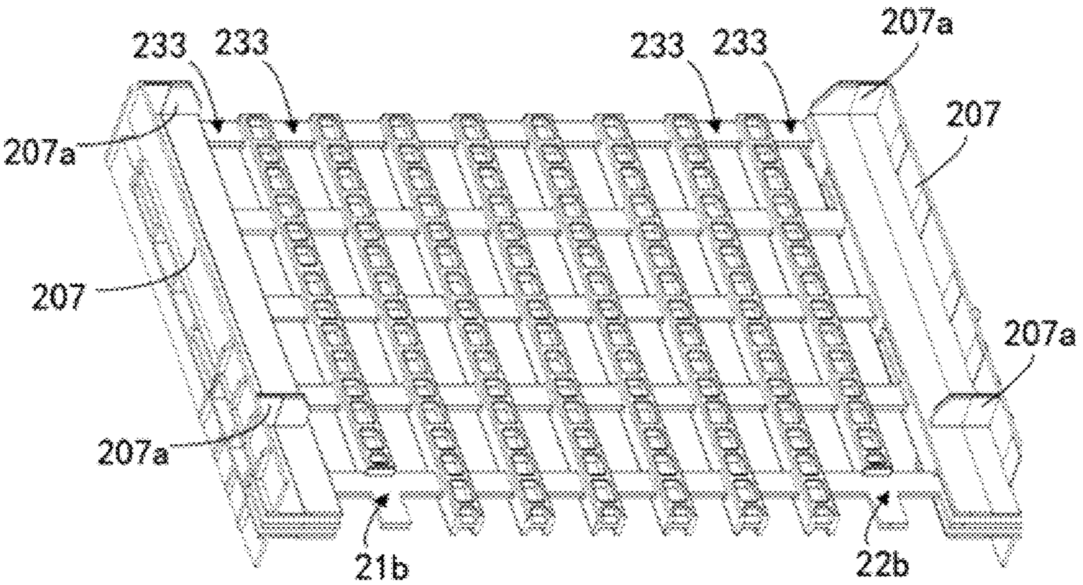
FIG. 22 is a schematic diagram of a structure of the middle separator according to FIG. 17 after being cut along D-D.
Figure 23:
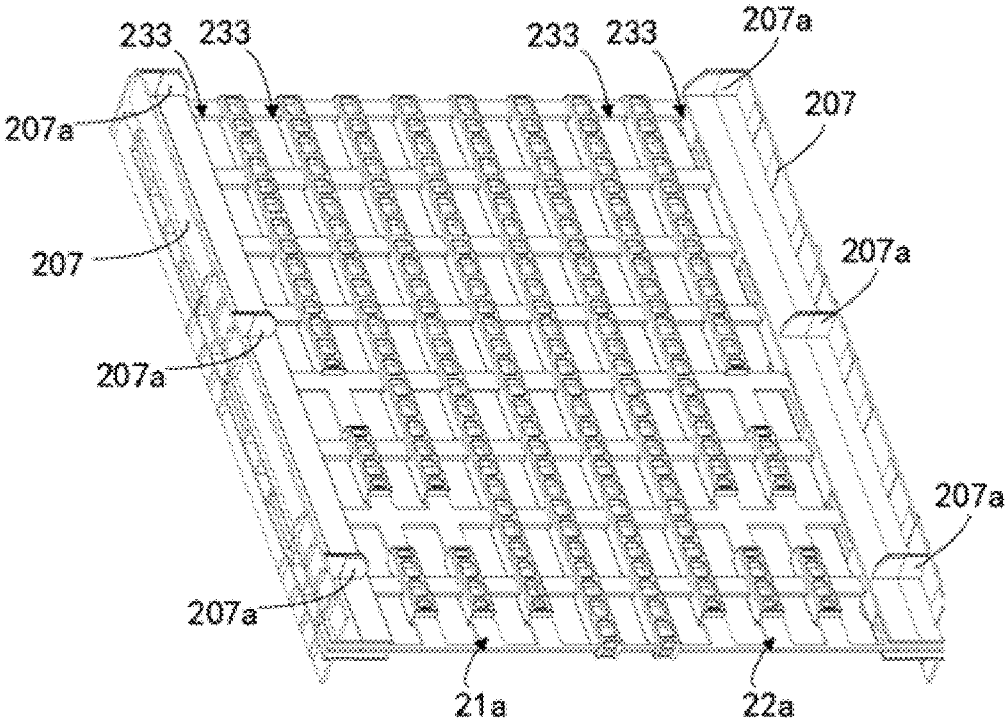
FIG. 23 is a schematic diagram of a structure of the middle separator according to FIG. 17 after being cut along E-E.

In an embodiment, for the middle separator 20 that uses the base board 24, the first secondary air duct 21 and the second secondary air duct 22 may be alternatively disposed in a manner of the foregoing strong and weak air ducts. To be specific, the first secondary air duct 21 and the second secondary air duct 22 shown in FIG. 22 are at locations farther away from the air exhaust side edge 204 compared with the first secondary air duct 21 and the second secondary air duct 22 shown in FIG. 23. In this way, compared with the first secondary air duct 21 shown in FIG. 23, the first secondary air duct 21 shown in FIG. 22 is formed as a structure of a first weak secondary air duct *21b*. In this case, a quantity of upper main air ducts 233 communicated with the first weak secondary air duct *21b* and a quantity of lower main air ducts 234 communicated with the first weak secondary air duct *21b* are both two. The first secondary air duct 21 in FIG. 23 is represented as a first strong secondary air duct *21a*. A quantity of upper main air ducts 233 communicated with the first strong secondary air duct *21a* and a quantity of lower main air ducts 234 communicated with the first strong secondary air duct *21a* are both four.

Correspondingly, compared with the second secondary air duct 22 shown in FIG. 23, the second secondary air duct 22 shown in FIG. 22 is also formed as a structure of a second weak secondary air duct *22b*. A quantity of upper main air ducts 233 communicated with the second weak secondary air duct *22b* and a quantity of lower main air ducts 234 communicated with the second weak secondary air duct *22b* are both two. The second secondary air duct 22 shown in FIG. 23 is formed as a second strong secondary air duct *22a*. A quantity of upper main air ducts 223 communicated with the second strong secondary air duct *22a* and a quantity of lower main air ducts 234 communicated with the second strong secondary air duct *22a* are both four. In this way, in the middle separator 20 in this embodiment, the quantities of upper main air ducts 233 and lower main air ducts 234 separately communicated with the first secondary air duct 21 and the second secondary air duct 22 close to the air exhaust side edge 204 are relatively large. The quantities of upper main air ducts 233 and lower main air ducts 234 separately communicated with the first secondary air duct 21 and the second secondary air duct 22 away from the air exhaust side edge 204 are relatively small. In this way, the cooling air in the upper main air ducts 233 and the lower main air ducts 234 are effectively supplemented. Refer to a schematic exploded view shown in FIG. 24 of a region of an air exhaust panel 37 according to this application. An air supply unit 50 is further disposed in the region of the air exhaust panel 37. The air supply unit 50 is connected to the air exhaust panel 37 in a fastened manner. The air supply unit 50 may be fastened to an inner side that is of the air exhaust panel 37 and that is close to the air intake board 31. In other words, the air supply unit 50 may be located inside the case 30. In this way, the case 30 may protect the air supply unit 50. It may be understood that, in some other embodiments, the air supply unit 50 may be alternatively located on a side that is of the air exhaust panel 37 and that is away from the air intake board 31. In addition, the air supply unit 50 may be disposed in a manner of directly facing an air exhaust window 371 of the air exhaust panel 37, to implement better air supply effect.

Figure 24:
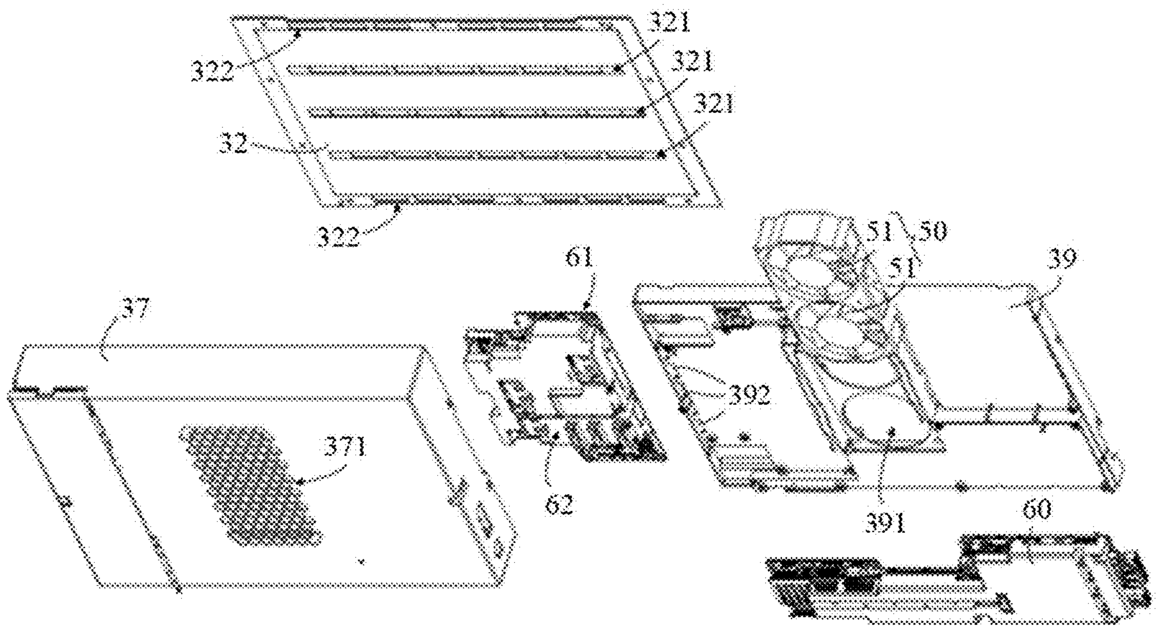
FIG. 24 is a schematic exploded view of a region of an air exhaust panel in the battery module according to FIG. 2.

In a schematic diagram of FIG. 24, the air supply unit 50 is fastened to a connection board 39. The air supply unit 50 is relatively fastened to the air exhaust panel 37 through fastening of the connection board 39 and the air exhaust panel 37. A connection hole 391 corresponding to the air supply unit 50 is disposed on the connection board 39. The air supply unit 50 may send air in the case 30 out of the air exhaust window 371 through the connection hole 391. Further, a control unit 60 may be further fastened to the connection board 39. The control unit 60 may be electrically connected to the air supply unit 50, and is configured to control heat dissipation power of the air supply unit 50. In addition, the control unit 60 may be alternatively used as a battery management system (BMS) of the battery module 100, and is configured to manage cooperation between the electrochemical cell units 15 in the battery module 100.

In some other embodiments, the control unit 60 may be alternatively used as an optimizer and/or a direct-current conversion apparatus of the battery module 100. When the control unit 60 is used as an optimizer of the battery module 100, the control unit 60 may switch the battery module 100 to a short-circuit state when a fault occurs in some or all of the electrochemical cell units 15 in the battery module 100, to prevent the battery module 100 from affecting overall work of the transportation means. When the control unit 60 is used as a direct-current conversion apparatus of the battery module 100, the control unit 60 is configured to implement a direct-current conversion function of the battery module 100.

Figure 25:
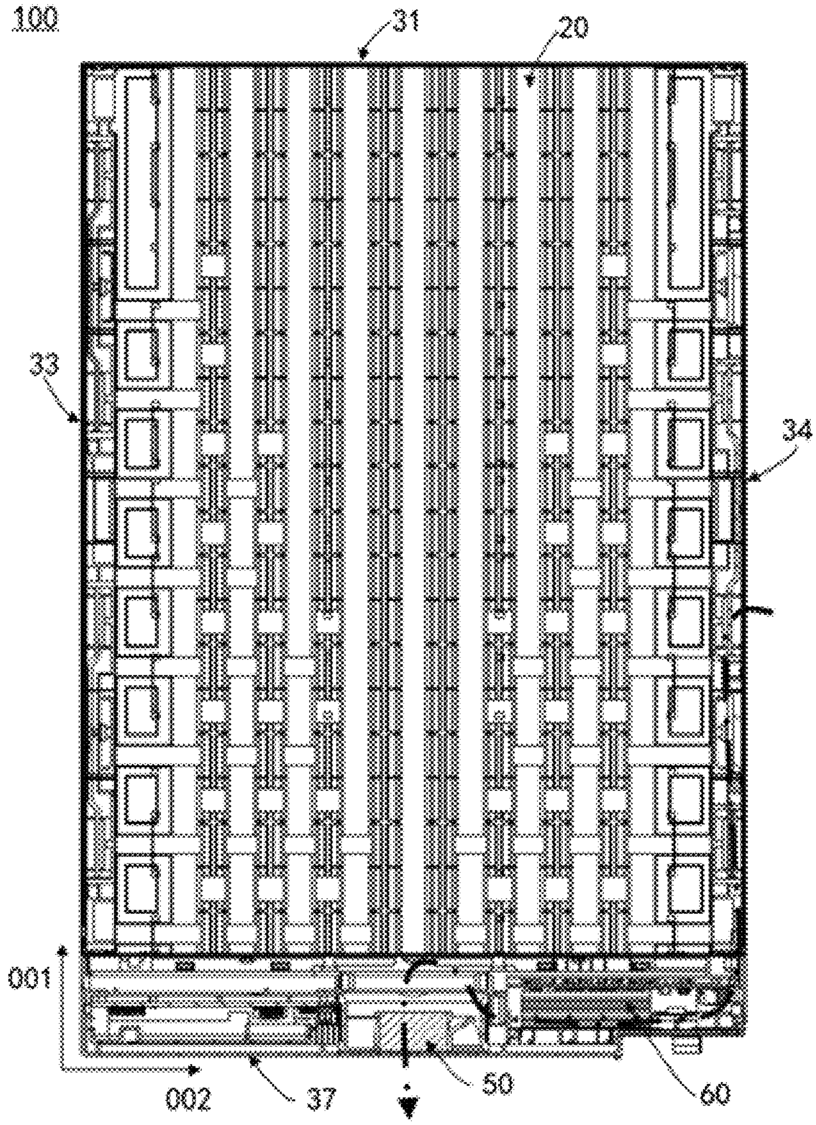
FIG. 25 is a schematic diagram of an air flow path of a main air duct in a middle separator in the battery module according to FIG. 2.

As shown in FIG. 24, the control unit 60 may include a cavity 62 and a control panel 61. In some embodiments, the control panel 61 may be alternatively implemented in a manner such as a control chip. The control panel 61 is accommodated in the cavity 62. The cavity 62 is configured to protect the control panel 61. An air inlet 621 (with reference to FIG. 26) and an air outlet 622 (with reference to FIG. 26) are further disposed on the cavity 62, to introduce the cooling air into the cavity 62, to cool the control panel 61. Specifically, the air inlet 621 may be communicated with the main air duct 23, or a first air guide groove, or a second air guide groove 423 (with reference to FIG. 38). The air outlet 622 is communicated with the air exhaust window 371 of the air exhaust panel 37. In this way, as shown in FIG. 25, when the cavity 62 is communicated with the second air guide groove 423, the cooling air in the second air guide groove 423 may further cool the control panel 61, and flow out from the air exhaust panel 37 through the air outlet 622, to implement heat dissipation for the control panel 61.

Figure 26:
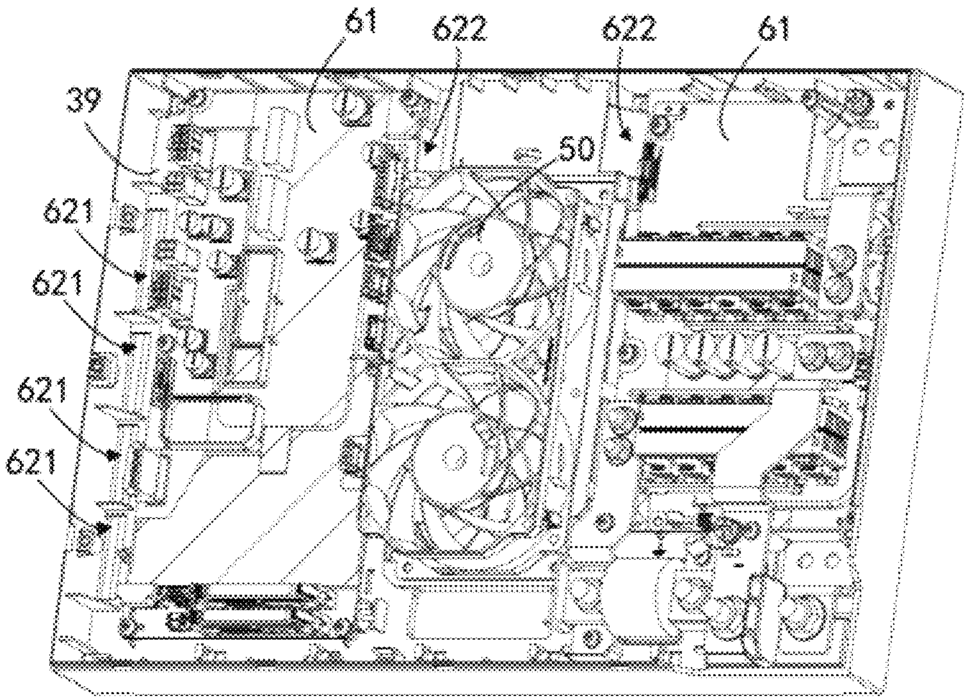
FIG. 26 is a schematic diagram of a structure of another embodiment of a region of an air exhaust panel in the battery module according to FIG. 2.
Figure 28:
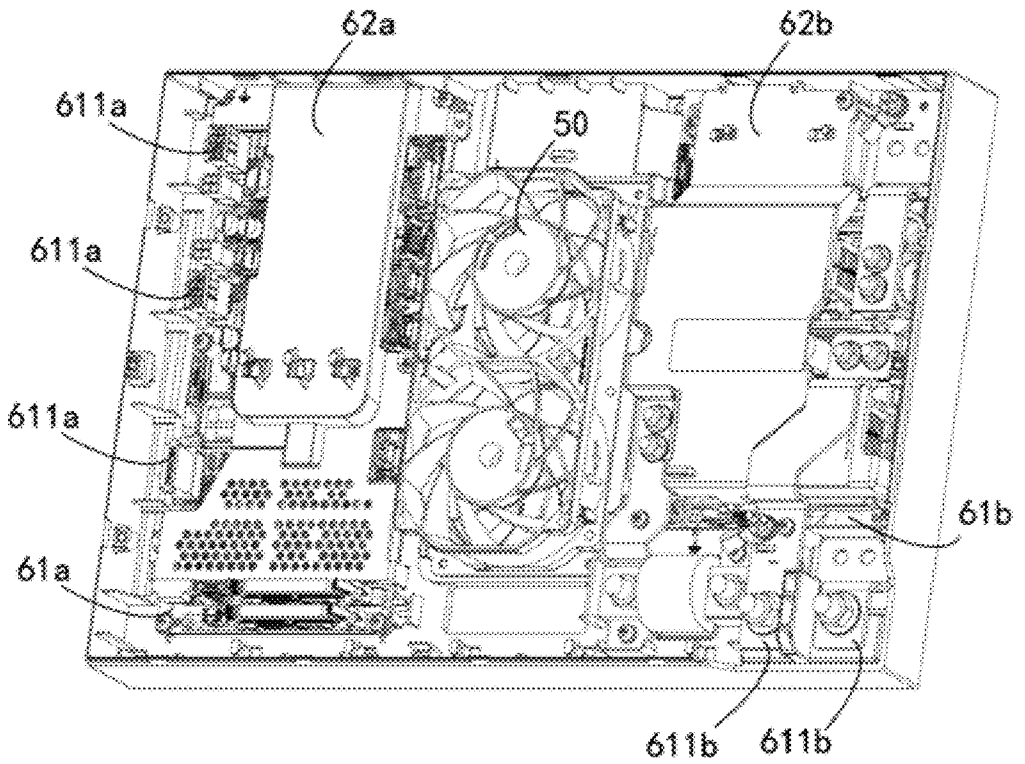
FIG. 28 is a schematic diagram of an internal structure of the region of the air exhaust panel in the battery module according to FIG. 27.

In some embodiments, as shown in FIG. 26, there are a plurality of control panels 61, and there are also a plurality of corresponding cavities 62 (as shown in FIG. 28). The plurality of cavities 62 may be separately communicated with the first air guide groove, the second air guide groove 423, and the main air duct 23, and separately receive the cooling air sent from the first air guide groove, the second air guide groove 423, and the main air duct 23. In addition, in the schematic diagram of FIG. 24, the cavity 62 is connected to the connection board 39 in a fastened manner. Therefore, the connection board 39 may be alternatively considered as a part of the cavity 62. Openings are disposed on the connection board 39 to form the air inlet 621 and the air outlet 622. In this way, the cooling air in the main air duct 23, the first air guide groove, or the second air guide groove 423 may also be introduced into the cavity 62, to implement a heat dissipation function for the control panel 61.

It may be understood that the plurality of control panels 61 of the control unit 60 may be separately configured to implement a function of the control unit 60. The function includes but is not limited to the foregoing battery management system, optimizer, and direct-current conversion apparatus. In some embodiments, two or more functions of the control unit 60 may be integrated on a same control panel 61, to implement comprehensive control of the battery module 100. In addition, the overall control unit 60 is located inside the case 30. Therefore, the case 30 may further provide reliable accommodation and protection for the control unit 60, and implement cooling for the control unit 60 by using a heat dissipation structure in the case 30.

In the embodiment of FIG. 26, there are two control panels 61. The two control panels 61 are both fastened to the connection board 39, and are respectively arranged on two sides of the air supply unit 50. In other words, for the battery module 100 in this application, a structure of the control unit 60 is not strictly limited. The control unit 60 may be integrated on a single board, and is disposed side by side with the air supply unit 50. The control unit 60 is configured to implement one or more control functions of the battery module 100. The control unit 60 may be alternatively disposed on a plurality of boards, and is specifically disposed on different control panels 61. The plurality of control panels 61 are disposed side by side with the air supply unit 50. The control unit 60 implements one or more control functions of the battery module 100 through cooperation of the control panels 61. It may be understood that, in the embodiment in FIG. 26, when the air supply unit 50 is located in a middle part of the connection board 39, the air supply unit 50 is also located in the middle relative to a location of each middle separator 20, so that an air flow in each middle separator 20 is more uniform thereby implementing better heat dissipation effect.

Figure 27:
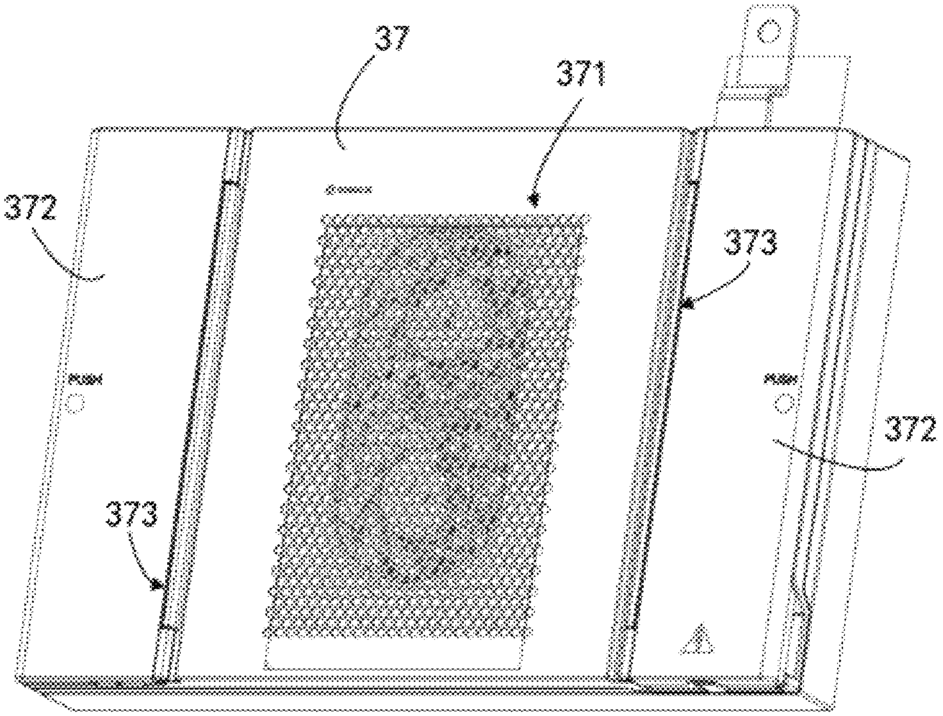
FIG. 27 is a schematic diagram of an appearance structure of the region of the air exhaust panel in the battery module according to FIG. 26.

FIG. 27 shows a structure of the air exhaust panel 37. The structure may correspond to an embodiment in which there are two control panels 61 shown in FIG. 26. In this structure, corresponding to a structure in which there are two control panels 61, and the two control panels 61 are respectively arranged on the two sides of the air supply unit 50, the air exhaust panel 37 is also provided with shielding boards 372 respectively on two sides of the air exhaust window 371. An area and a location of the shielding board 372 are approximately aligned with those of the control panel 61. In an embodiment, a hinge 373 is further disposed at the shielding board 372. The shielding board 372 is rotatably connected to a body of the air exhaust panel 37 through the hinge 373. When the control panel 61 on one side needs to be separately disassembled or adjusted, the control panel 61 and the cavity 62 may be exposed by lifting the shielding board 372 on the side. The entire air exhaust panel 37 does not need to be disassembled.

Specifically, with reference to FIG. 28, in this embodiment, the control panel 61 includes a first control panel 61*a* and a second control panel 61*b*. The first control panel 61*a* serves as a battery management system of the battery module 100, and is located on a side of the air supply unit 50. A first cover 62*a* is further disposed, as a part of the cavity 62, on a side that is of the first control panel 61*a* and that is away from the connection board 39. The first cover 62*a* is correspondingly disposed across an outer side of the first control panel 61*a*. A gap is formed between the first cover 62*a* and the first control panel 61*a* for air flow between the air inlet 621 and the air outlet 622 that are formed on the two sides. The first cover 62*a* further correspondingly exposes an interface structure 611*a* of the first control panel 61*a*. The second control panel 61*b* serves as an optimizer of the battery module 100, and is located on the other side of the air supply unit 50. A second cover 62*b* is disposed, as a part of the cavity 62, on a side that is of the second control panel 61*b* and that is away from the connection board 39. The second cover 62*b* is also correspondingly disposed across an outer side of the second control panel 61*b*. A gap is formed between the second cover 62*b* and the second control panel 61*b*. The second cover 62*b* also exposes a conducting interface 611*b* of the second control panel 61*b*.

Figure 29:
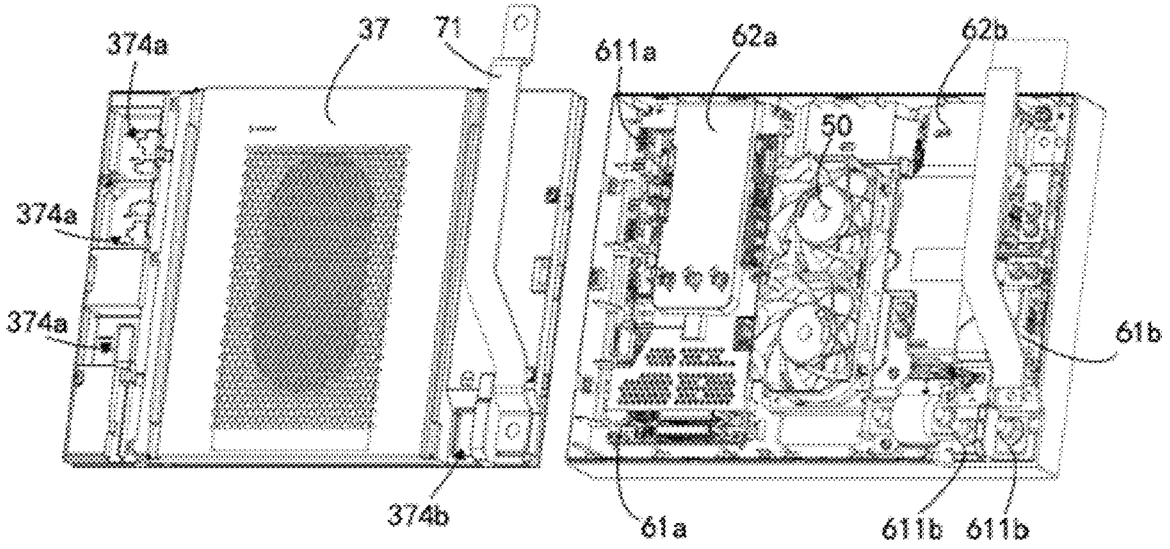
FIG. 29 is a schematic exploded view of a structure of the region of the air exhaust panel in the battery module according to FIG. 27.
Figure 30:
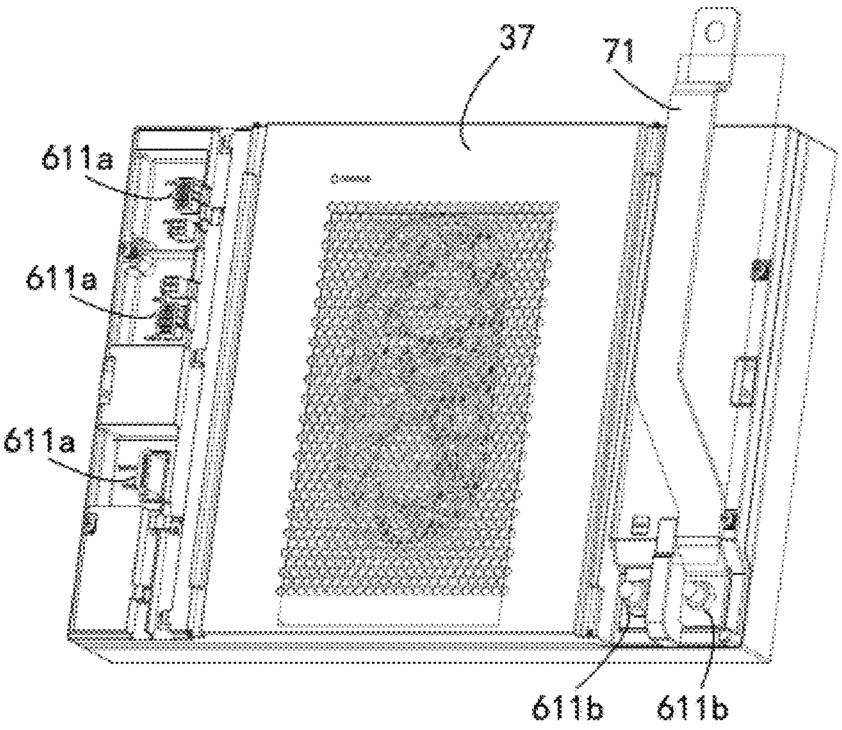
FIG. 30 is a schematic diagram of an internal structure of the region of the air exhaust panel in the battery module according to FIG. 27.

With reference to FIG. 29, corresponding to both the first control panel 61*a* and the second control panel 61*b*, a body structure of the air exhaust panel 37 is disposed. A first hollow hole 374*a* corresponding to the interface structure 611*a* of the first control panel 61*a*, and a second hollow hole 374*b* corresponding to the conducting interface 611*b* of the second control panel 61*b* are disposed on the body structure. The first hollow hole 374*a* is configured to correspondingly expose the interface structure 611*a*, so that the interface structure 611*a* can be exposed after the shielding board 372 is lifted (as shown in FIG. 30), to facilitate operations such as wiring performed on the first control panel 61*a*.

On a side of the second control panel 61*b*, a conducting wire 71 is further disposed in the battery module 100. After the second hollow hole 374*b* exposes the conducting interface 611*b*, the conducting interface 611*b* may be electrically connected to the conducting wire 71, and is connected to an external circuit through the conducting wire 71. Therefore, when the optimizer works, the battery module 100 can be switched to a short-circuit state through electrical connection to the external circuit.

It may be understood that, in the foregoing embodiment, a shape and a location of an external interface of the control panel 61 are determined based on different functions of the control panel 61. Therefore, when a function of the control panel 61 changes with a requirement, or an arrangement location of an external interface in the control panel 61 needs to be adjusted, a corresponding external interface of the control panel 61 (for example, the interface structure 611*a* and the conducting interface 611*b*) further needs to be adjusted correspondingly in a matching manner. A specific location of the external interface does not affect implementation of a specific function of the battery module 100 in this application.

In addition, the body structure of the air exhaust panel 37 covers a side that is of the first cover 62*a* and that is away from the first control panel 61*a* and a side that is of the second cover 62*b* and that is away from the second control panel 61*b*, and provides accommodation and protection for both the first control panel 61*a* and the second control panel 61*b*. Therefore, the body of the air exhaust panel 37 may be alternatively used as a part of the cavity 62, and is configured to guide air at the first control panel 61*a* and the second control panel 61*b* to flow towards the air supply unit 50. To be specific, the first cover 62*a* and the body of the air exhaust panel 37 may jointly form the cavity 62 corresponding to the first control panel 61*a*. The second cover 62*b* and the body of the air exhaust panel 37 jointly form the cavity 62 corresponding to the second control panel 61*b*.

In some embodiments, with reference back to FIG. 24, in the region of the air exhaust panel 37, the case 30 further includes an air exhaust board 32. The air exhaust board 32 is located between the middle separator 20 and the air exhaust panel 37. In other words, the air exhaust board 32 is located between the electrochemical cell assembly 10 and the air exhaust panel 37. The air exhaust board 32, the air intake board 31, the first side board 33, the second side board 34, the top assembly 35, and the bottom assembly 36 may form relatively closed space in an enclosing manner. The electrochemical cell assembly 10 and the middle separator 20 are accommodated in the relatively closed space, to implement sealing protection effect for the electrochemical cell assembly 10. In some embodiments, the air supply unit 50 is alternatively located between the air exhaust board 32 and the air exhaust panel 37. In other words, the connection board 39 is located between the air exhaust board 32 and the air exhaust panel 37. In this way, the air exhaust board 32 actually divides the interior of the case 30 into two parts of space that are opposite to each other. The electrochemical cell assembly 10 and the middle separator 20 are located in one part of space, and the connection board 39, the air supply unit 50, and the control unit 60 are located in the other part of space. It may be understood that, because the electrochemical cell assembly 10 generates a relatively large amount of heat, the air exhaust board 32 may be disposed so that assemblies such as the connection board 39, the air supply unit 50, and the control unit 60 are placed in the other space. In this way, it is ensured that the air supply unit 50 and the control unit 60 work normally in a relatively low temperature environment.

Figure 31:
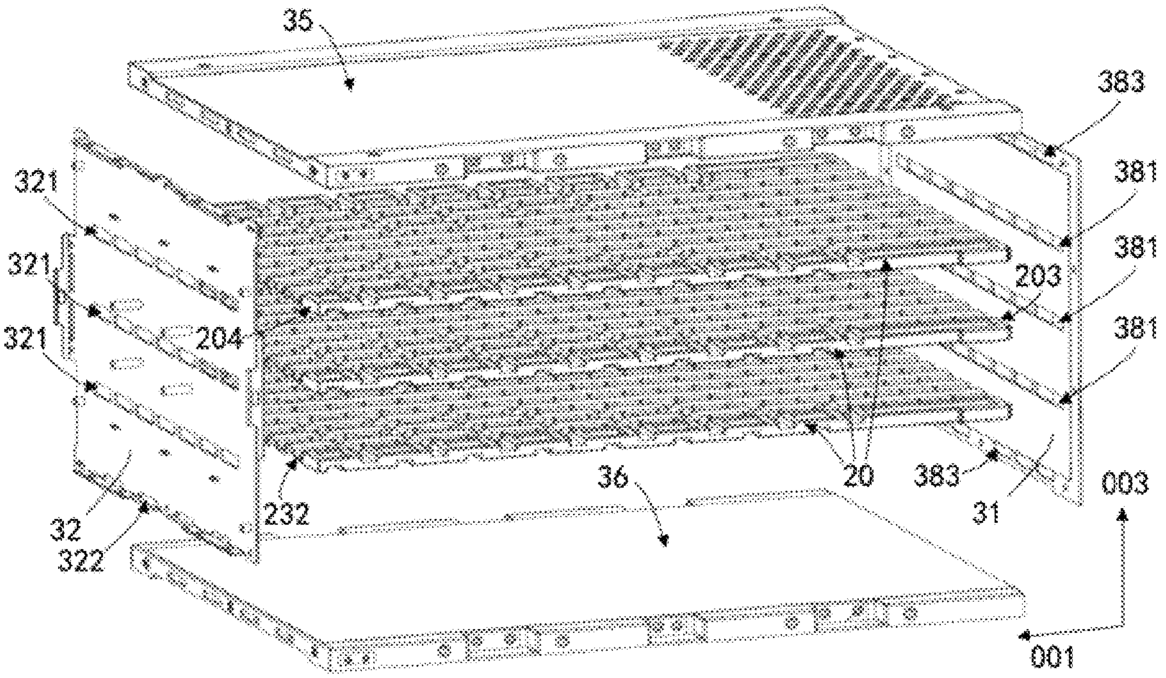
FIG. 31 is a schematic diagram of an air flow path of a main air duct in a middle separator in the battery module according to FIG. 2.

With reference to a schematic diagram of FIG. 31, in an embodiment of FIG. 31, a main air exhaust hole 321 is further disposed on the air exhaust board 32. Air in the enclosed space may flow to the air supply unit 50 through the main air exhaust hole 321, and flow out of the air exhaust window 371. In an embodiment, the main air exhaust hole 321 may be disposed at a position corresponding to the middle separator 20. Specifically, the main air exhaust hole 321 corresponding to the main air exhaust end 232 of the main air duct 23 is disposed. To be specific, in the battery module 100 provided in this application, there are three middle separators 20 disposed in the electrochemical cell assembly 10. The main air exhaust holes 321 on the air exhaust board 32 are also constructed into three rows. Each row of the main air exhaust holes 321 is disposed, corresponding to the air exhaust side edge 204 (specifically, the main air exhaust end 232 on the air exhaust side edge 204) of one middle separator 20. Therefore, the cooling air flowing out of the main air exhaust end 232 of the middle separator 20 can relatively smoothly flow out of the air exhaust window 371 from the main air exhaust holes 321.

Similarly, on one side of the air intake board 31, the main ventilation hole 381 may be disposed at a location corresponding to the middle separators 20. Specifically, the main ventilation hole 381 corresponding to the main air intake end 231 of the main air duct 23 is disposed. It can be learned from FIG. 31 that, corresponding to the embodiment in which three middle separators 20 are disposed in the battery module 100 in this application, the main ventilation holes 381 are also constructed into three rows. Each row of the main ventilation holes 381 is disposed corresponding to the air intake side edge 203 (specifically, the main air intake end 231 of the air intake side edge 203) of one middle separator 20. Therefore, external air can enter the main air ducts 23 relatively smoothly from the main air intake end 231 after entering the case 30 from the main ventilation holes 381, to implement heat dissipation effect.

Figure 32:
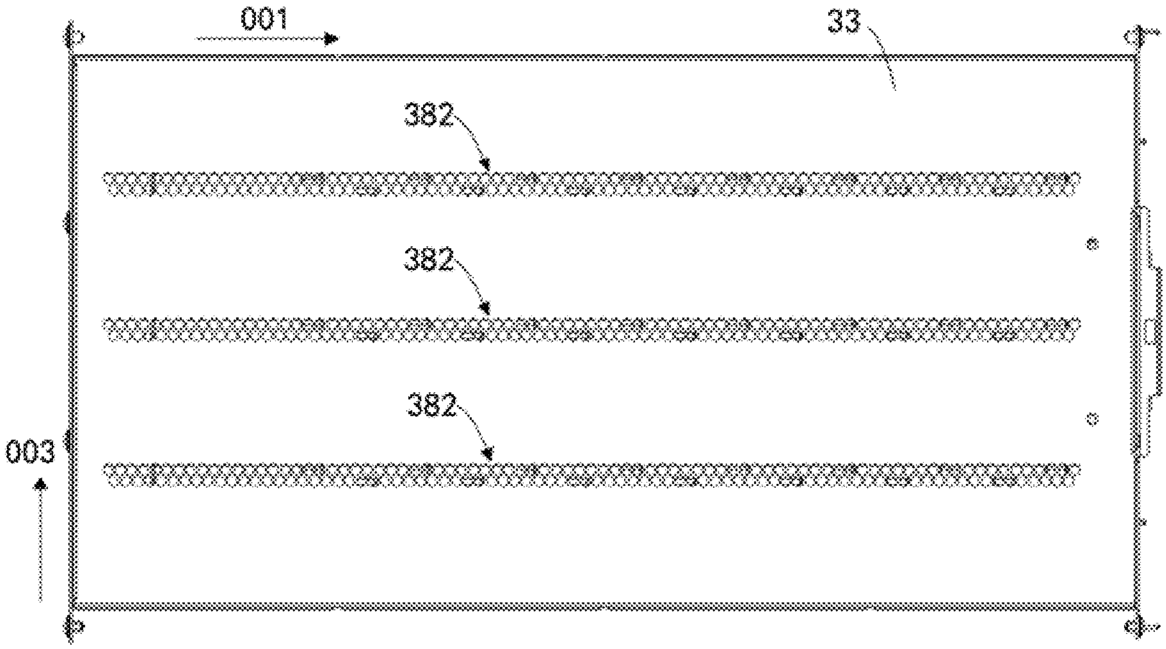
FIG. 32 is a schematic diagram of a planar structure of a first side board in the battery module according to FIG. 2.

Further, with reference to a schematic diagram in FIG. 32, in the battery module 100 in this application, the side ventilation holes 382 disposed on the first side board 33 and the second side board 34 (not shown in FIG. 32) may be alternatively disposed at locations corresponding to the middle separators 20. On the first side board 33 shown in FIG. 32, the side ventilation holes 382 are also constructed into three rows. The three rows of side ventilation holes 382 are respectively disposed corresponding to the first side edges 201 (specifically, the first air intake ends 211 of the first secondary air ducts 21) of the middle separators. In this way, after entering the case 30 from the first side board 33, external air can also relatively smoothly enter the first secondary air duct 21 from the first air intake end 211, or relatively smoothly enter the second secondary air duct 22 from the second air intake end 221, to implement heat dissipation effect.

In other words, the ventilation holes formed by both the main ventilation holes 381 and the side ventilation holes 382 may be disposed at locations corresponding to the middle separators 20. In this embodiment of this application, that the ventilation holes correspond to the middle separators 20 in location may be understood as that location dimensions of the ventilation holes along the third direction 003 correspond to the locations of the middle separators 20. In addition, for the air intake board 31, the location dimensions of the main ventilation holes 381 may be alternatively disposed corresponding to the middle separators 20 along the second direction 002. For the first side board 33 and the second side board 32, the location dimensions of the side ventilation holes 382 are disposed corresponding to the middle separators 20 along the first direction 001. Further, for an embodiment in which a first section 2011 and a second section 2021 are further respectively disposed on the first side board 31 and the second side board 32, the side ventilation holes 382 may be alternatively disposed at locations corresponding to the first section 2011 and the second section 2021. The first secondary air duct 21 or the second secondary air duct 22 is not disposed in a location outside the first section 2011 and the second section 2021 of the middle separator 20. Therefore, by disposing the side ventilation holes 382 corresponding to the first section 2011 and the second section 2021, air intake requirements of the first secondary air duct 21 and the second secondary air duct 22 may be met.

Refer back to the schematic diagram in FIG. 31. In the battery module 100 in this application, the top assembly 35 and the bottom assembly 36 are further respectively arranged on two opposite sides of the middle separator 20 along the third direction 003. Specifically, the top assembly 35 is located on a side that is of the first electrochemical cell layer 11 and that is away from the middle separator 20. The bottom assembly 36 is located on a side that is of the second electrochemical cell layer 12 and that is away from the middle separator 30. In addition, the top assembly 35 is connected between the air intake board 31 and the air exhaust board 32. The bottom assembly 36 is also connected between the air intake board 31 and the air exhaust board 32. In this way, in a direction perpendicular to the middle separator 20 (the third direction 003), the top assembly 35 and the bottom assembly 36 may further form reliable protection for the electrochemical cell assembly 10, to prevent water vapor, dust, and the like from entering an interior of the case 30 along the third direction 003.

Figure 33:
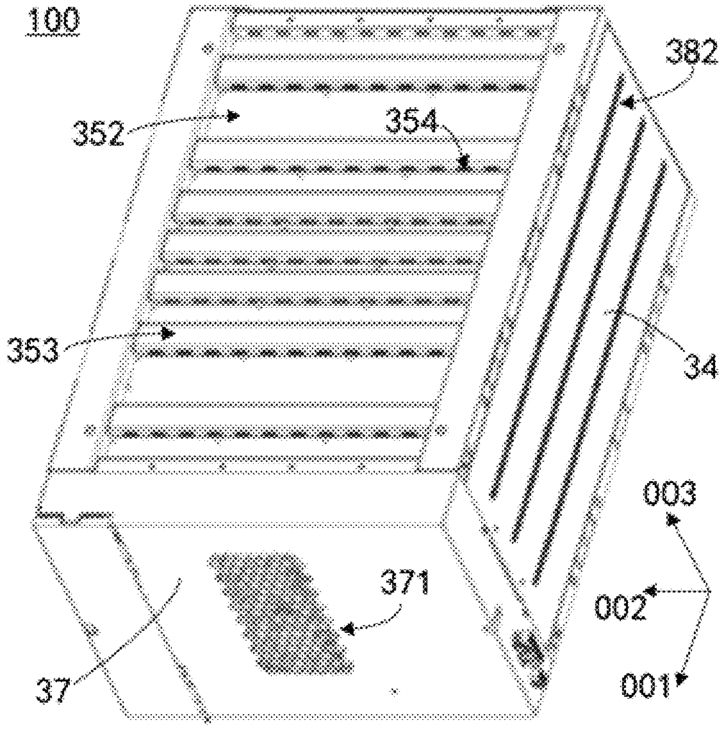
FIG. 33 is a schematic diagram of an internal structure of a top assembly in the battery module according to FIG. 1.
Figure 34:
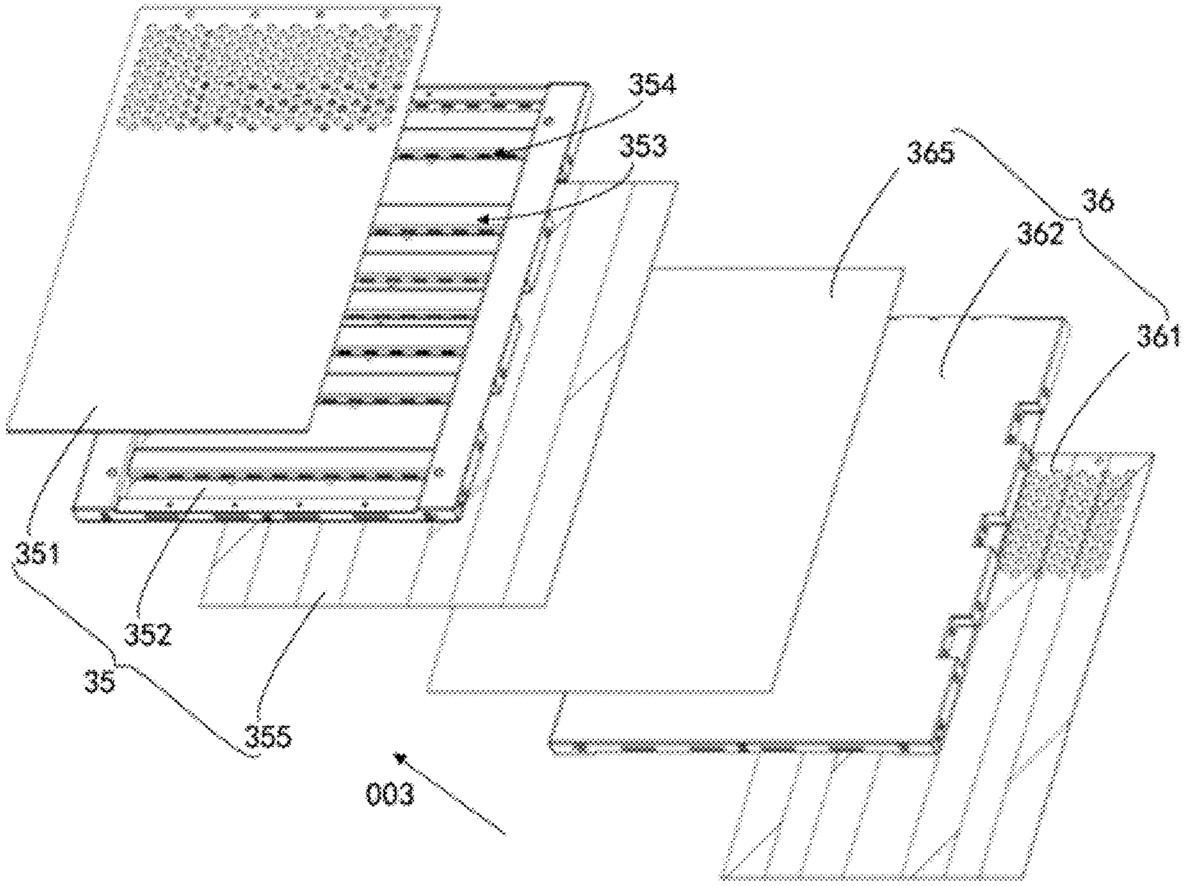
FIG. 34 is a schematic exploded view of a top assembly and a bottom assembly in the battery module according to FIG. 2.

Refer to a schematic diagram shown in FIG. 33 of an interior of the top assembly 35 in the battery module 100 according to this application, and a schematic exploded view shown in FIG. 34 of the top assembly 35 and the bottom assembly 36. In an embodiment, while the middle separator 20 dissipates heat for each electrochemical cell layer, the top assembly 35 and the bottom assembly 36 may also form a heat dissipation channel of cooling air, to implement a heat dissipation function for the electrochemical cell assembly 10. Specifically, the top assembly 35 includes atop panel 351. In the schematic diagram of FIG. 34, a plurality of through-hole structures are further disposed on the top panel 351. Alternatively, in some other embodiments, there are no through-hole structures on the top panel 351, and a complete planar shape is formed. On a side that is of the top panel 351 and that is close to the interior of the case 30, the top assembly 35 further includes a top support board 352 and a plurality of top support strips 353. The top support board 352 is spaced from and connected to the top panel 351 in a fastened manner. The plurality of top support strips 353 are spaced and disposed on the top support board 352 along the first direction 001. In some other embodiments, the plurality of top support strips 353 may be alternatively connected to the top panel 351 in a fastened manner.

A length direction of each top support strip 353 further extends along the second direction 002. A plurality of top air holes 354 are further disposed on each top support strip 353. In the schematic diagram shown in the figure, the plurality of top air holes 354 are also spaced along the second direction 002. In this way, a top air flow channel that penetrates the top assembly 35 is formed along the first direction 001. In an embodiment in which through-hole structures are disposed on the top panel 351, external air may enter the top air flow channel from the through-hole structures, and successively pass through each top air hole 354 on the top support board 352 to reach the air exhaust board 32.

It can be learned from FIG. 31 that secondary air exhaust holes 322 are further disposed on the air exhaust board 32. Air in the top air flow channel may be exhausted out of the case 30 by the air supply unit 50 through the secondary air exhaust holes 322. It may be understood that, in this embodiment, the top support board 352 needs to be disposed close to the electrochemical cell assembly 10, to transfer a temperature of the electrochemical cell assembly 10 to the top support board 352, and take heat away from the case 30 through the cooling air in the top air flow channel. It may be understood that secondary ventilation holes 383 may be further disposed on the air intake board 31. Locations of the secondary ventilation holes 383 correspond to a location of the top assembly 35. Specifically, the locations of the secondary ventilation holes 383 correspond to a location of the top air flow channel, so that the cooling air may alternatively enter the top air flow channel from a side of the air intake board 31.

Correspondingly, a bottom panel 361 and a bottom support board 362 are further disposed on the bottom assembly 36. The bottom panel 361 and the bottom support board 362 are spaced and fastened. A plurality of spaced bottom support strips (not shown in the figure) may be further disposed on the bottom panel 361 and/or the bottom support board 362 in a fastened manner. Bottom ventilation holes (not shown in the figure) are further disposed on each bottom support strip, to form a bottom air flow channel inside the bottom assembly 36. The bottom air flow channel also extends along the first direction 011, and is configured to implement a heat dissipation function for the electrochemical cell assembly 10. It may be understood that the secondary ventilation holes 383 of the air intake board 31 may be alternatively disposed corresponding to the bottom air flow channel. Similarly, the secondary air exhaust holes 322 of the air exhaust board 32 may be disposed corresponding to the bottom air flow channel. The cooling air may enter the bottom air flow channel from the secondary ventilation holes 383, and be exhausted out of the case 30 from the secondary air exhaust holes 322, to implement heat dissipation for the electrochemical cell assembly 10. In some embodiments, a plurality of through-hole structures may be alternatively disposed on the bottom panel 361, to assist in air intake of the bottom air flow channel. In the battery module 100 in this application, the middle separator 20 is configured to implement a function of heat dissipation for two opposite sides of two stacked electrochemical cell layers. However, in a stacking direction of each electrochemical cell layer, heat dissipation for two opposite planes of the electrochemical cell assembly 10 is implemented respectively through the top air flow channel and the bottom air flow channel. By disposing of the top air flow channel and the bottom air flow channel, a heat dissipation area of the electrochemical cell assembly 10 is increased, and the heat dissipation effect for the battery module 100 in this application may be further improved.

Alternatively, in one embodiment, the top support board 352 and the bottom support board 362 may be separately attached to the electrochemical cell assembly 10, to implement direct conduction of heat of the electrochemical cell assembly 10. However, in a schematic diagram of FIG. 34, a top insulation film 355 is further disposed on the top assembly 35. The top insulation film 355 is located between the top support board 352 and the electrochemical cell assembly 10, and is configured to prevent a current of the electrochemical cell assembly 10 from being conducted to the top assembly 35 to form a leakage current. A bottom insulation film 365 is further disposed on the bottom assembly 36. The bottom insulation film 365 is located between the bottom support board 362 and the electrochemical cell assembly 10, and is also configured to implement insulation effect for the bottom assembly 36. It may be understood that, for the air intake board 31, the air exhaust board 32, the first side board 33, and the second side board 34, a structure of an insulation film or an insulator may be alternatively disposed between each of the air intake board 31, the air exhaust board 32, the first side board 33, and the second side board 34 and the electrochemical cell assembly 10, to prevent electric leakage and ensure safety of the battery module 100 in this application.

Figure 35:
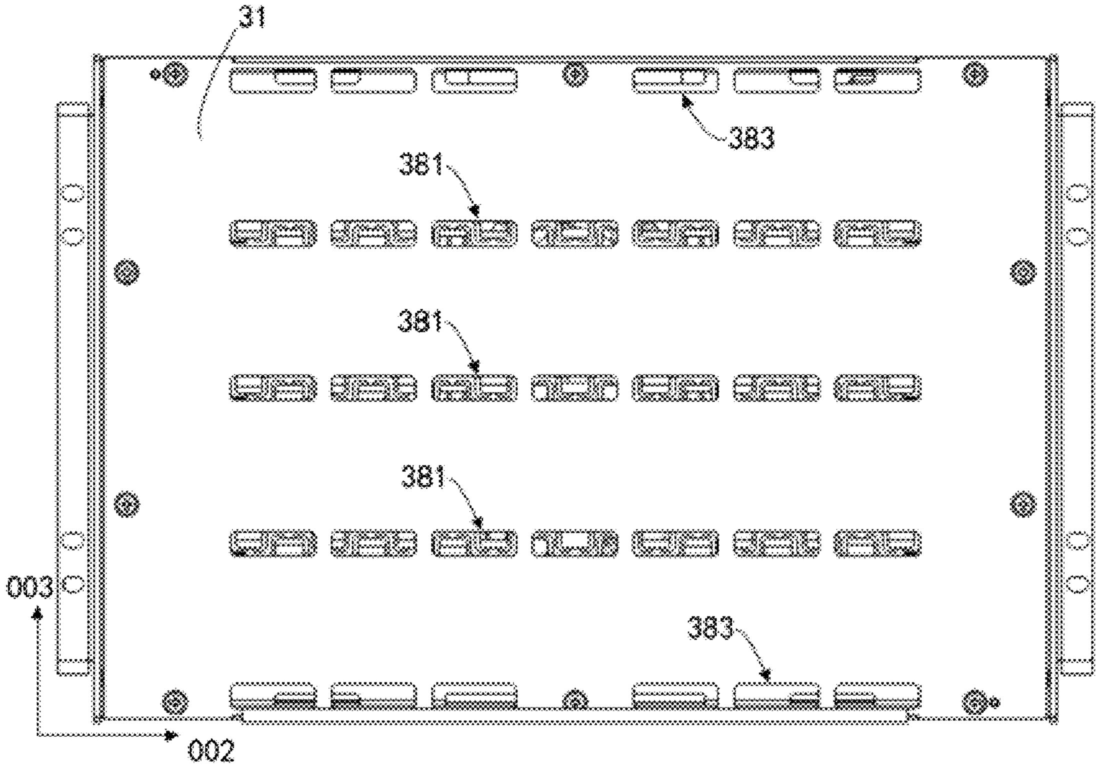
FIG. 35 is a schematic diagram of a structure of the battery module according to FIG. 2 in an observation direction of an air intake board.

Refer to a plan view shown in FIG. 35 of the air intake board 31. In an embodiment, a sum of areas of the secondary ventilation holes 383 is further set to be less than a sum of areas of the main ventilation holes 381. The sum of areas herein may be understood as a sum of areas of a single row of secondary ventilation holes 383 and a sum of areas of a single row of main ventilation holes 381. As mentioned above, the locations of the main ventilation holes 381 correspond to the locations of the middle separators 20. Therefore, the sum of the areas of the single row of main ventilation holes 381 may determine the flow of the cooling air entering the main air ducts 23 in the single middle separator 20. The secondary ventilation holes 383 may be disposed corresponding to the top assembly 35 or the bottom assembly 36. Therefore, the sum of the areas of the single row of secondary ventilation holes 383 may determine the flow of the cooling air in the top air flow channel or the bottom air flow channel.

The middle separator 20 needs to dissipate heat for two stacked electrochemical cell layers (for example, the first electrochemical cell layer 11 and the second electrochemical cell layer 12) at the same time, while the top air flow channel and the bottom air flow channel dissipate heat for only one electrochemical cell layer separately. For example, in this embodiment, the top air flow channel dissipates heat for the first electrochemical cell layer 11, and the bottom air flow channel dissipates heat for the fourth electrochemical cell layer 14. Therefore, when the sum of the areas of the secondary ventilation holes 383 is the same as the sum of the areas of the main ventilation holes 381, or the sum of the areas of the secondary ventilation holes 383 is greater than the sum of the areas of the main ventilation holes 381, the following circumstance is caused: Heat dissipation effects of two electrochemical cell layers close to the top assembly 35 and the bottom assembly 36 in the electrochemical cell assembly 10 are better, and heat dissipation effects of electrochemical cell layers in the middle of the electrochemical cell assembly 10 (the second electrochemical cell layer 12 and the third electrochemical cell layer 13 in this embodiment) are relatively poor. Therefore, it does not help to control the temperature difference between the electrochemical cell layers in the electrochemical cell assembly 10.

Through the foregoing disposition, namely, the sum of the areas of the secondary ventilation holes 383 is controlled to be less than the sum of the areas of the main ventilation holes 381, it may be ensured that the flow of the cooling air in the middle separator 20 is greater than the flow of the cooling air in the top air flow channel and the bottom air flow channel, thereby reducing the temperature difference between the electrochemical cell layers in the electrochemical cell assembly 10 and prolonging a service life of the battery module 100 in this application. Similarly, a sum of areas of the main air exhaust holes 321 in the air exhaust board 32 may be alternatively set to be greater than a sum of areas of the secondary air exhaust holes 322, and effect of controlling the flow of the cooling air in the middle separator 20 to be greater than the flow of the cooling air in the top air flow channel and the bottom air flow channel may also be achieved.

In an embodiment, a ratio of the sum of the areas of the single row of secondary ventilation holes 383 to the sum of the areas of the single row of main ventilation holes 381 is set to range from 40% to 80%, and is preferably 60%; and/or a ratio of the sum of the areas of the single row of secondary air exhaust holes 322 to the sum of the areas of the single row of main air exhaust holes 321 is set to range from 40% to 80%, and is preferably 60%. The temperature difference between the electrochemical cell layers in the battery module 100 may be smaller.

Figure 36:
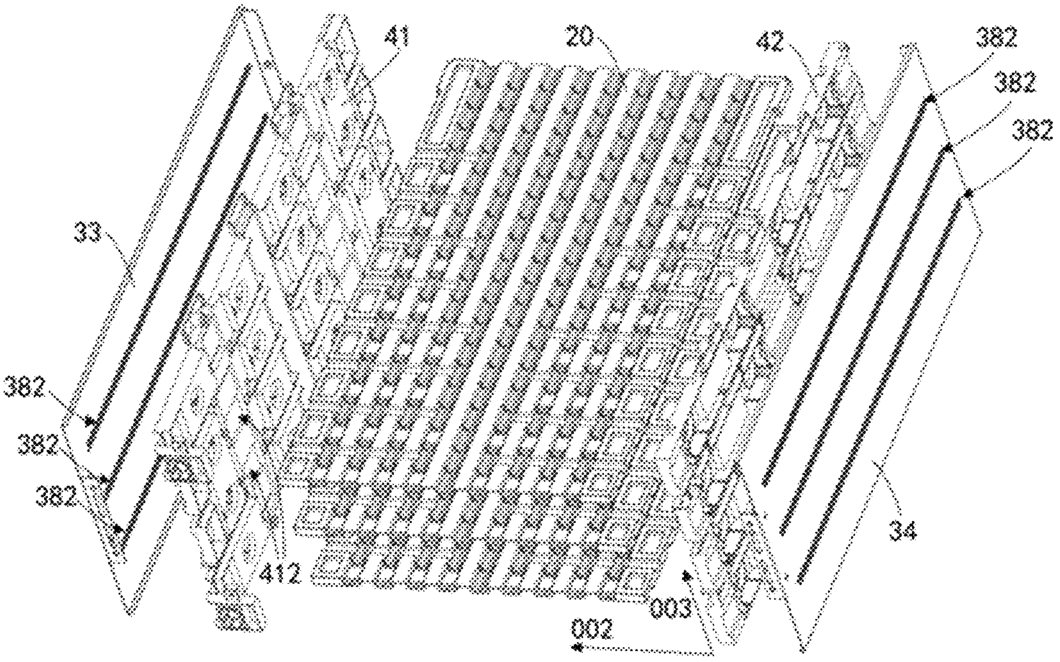
FIG. 36 is a schematic diagram of air flow paths of a first secondary air duct and a second secondary air duct in a middle separator in the battery module according to FIG. 2.

Refer to a schematic exploded view shown in FIG. 36 of the first side board 33, the second side board 34, the first insulation cover 41, and the second insulation cover 42. The first insulation cover 41 is located between the first side board 33 and the electrochemical cell assembly 10, so that first through holes 412 are further disposed on the first insulation cover 41. The first through holes 412 penetrate the first insulation cover 41 along the second direction 002, so that air outside the first side board 33 can pass through the first insulation cover 41 and enter the first secondary air duct 21. Second through holes 422 (refer to FIG. 37) are further disposed on the second insulation cover 42, and are configured to implement an effect that air outside the second side board 34 passes through the second insulation cover 42 and enters the second secondary air duct 22.

Figure 37:
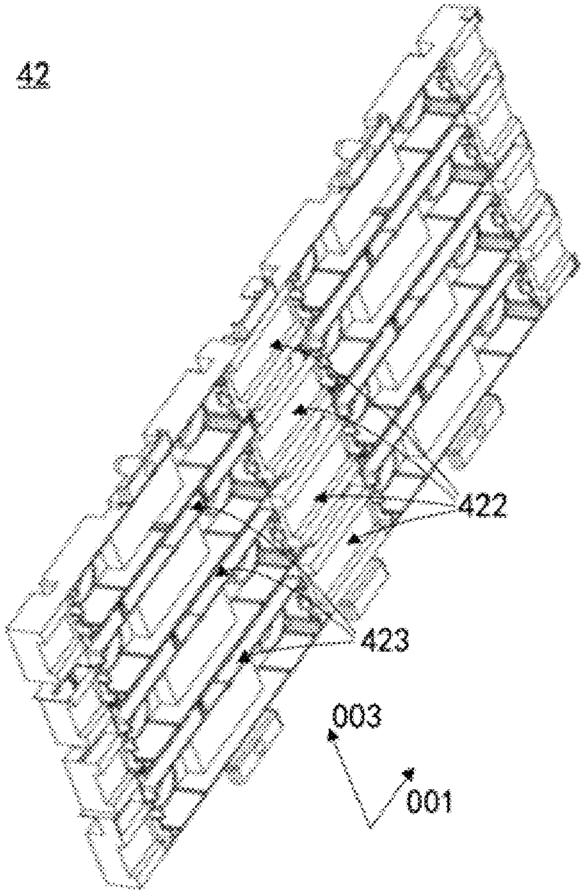
FIG. 37 is a schematic diagram of a structure of a second insulation cover in the battery module according to FIG. 36.
Figure 38:
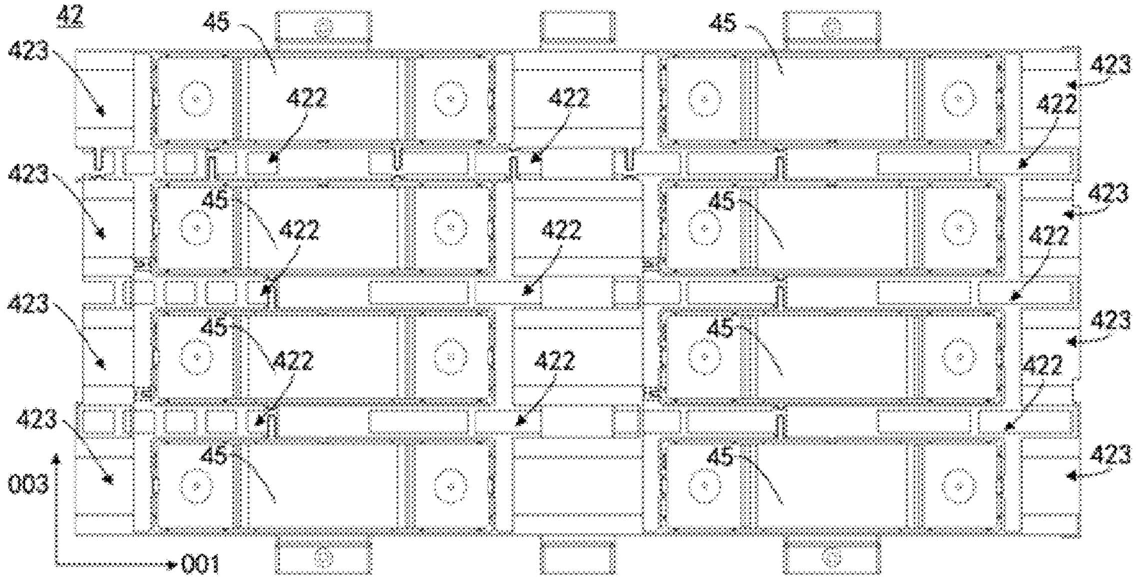
FIG. 38 is a schematic diagram of a planar structure of the second insulation cover according to FIG. 37.

Refer to schematic diagrams shown in FIG. 37 and FIG. 38 of the second insulation cover 42. The second through holes 422 are approximately strip-shaped. The strip-shaped second through holes 422 extend along the first direction 001. There are also three columns of second through holes 422. The three columns of second through holes 422 are spaced and arranged. Locations of each column of second through hole 422 correspond to the location of one middle separator 20. In other words, each column of second through hole 422 are disposed corresponding to a row of side ventilation holes 382 on the second side board 34 in location. Through such a disposition, an external air is facilitated to enter the second secondary air duct 22 successively through the side ventilation holes 382 and the second through holes 422.

Figure 39:
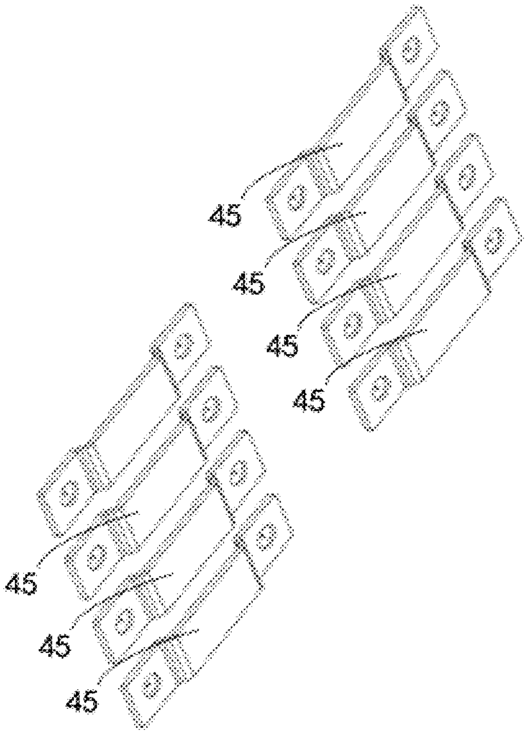
FIG. 39 is a schematic diagram of a plurality of busbars in the second insulation cover according to FIG. 37.

In an embodiment, in a schematic diagram of FIG. 38, a plurality of busbars 45 on the second insulation cover 42 are respectively disposed corresponding to the electrochemical cell units 15 in the electrochemical cell assembly 10 (as shown in FIG. 39), and are configured to conduct the electrochemical cell units 15. The second insulation cover 42 further includes a second outer surface 412 that is away from the electrochemical cell assembly 10. In other words, the second outer surface 412 is disposed facing the second side board 34. A plurality of second air guide grooves 423 are further disposed on the second outer surface 412. The plurality of second air guide grooves 423 are respectively communicated with the second through holes 422. In addition, the plurality of second air guide grooves 423 further separately extend along the first direction 001.

Figure 40:
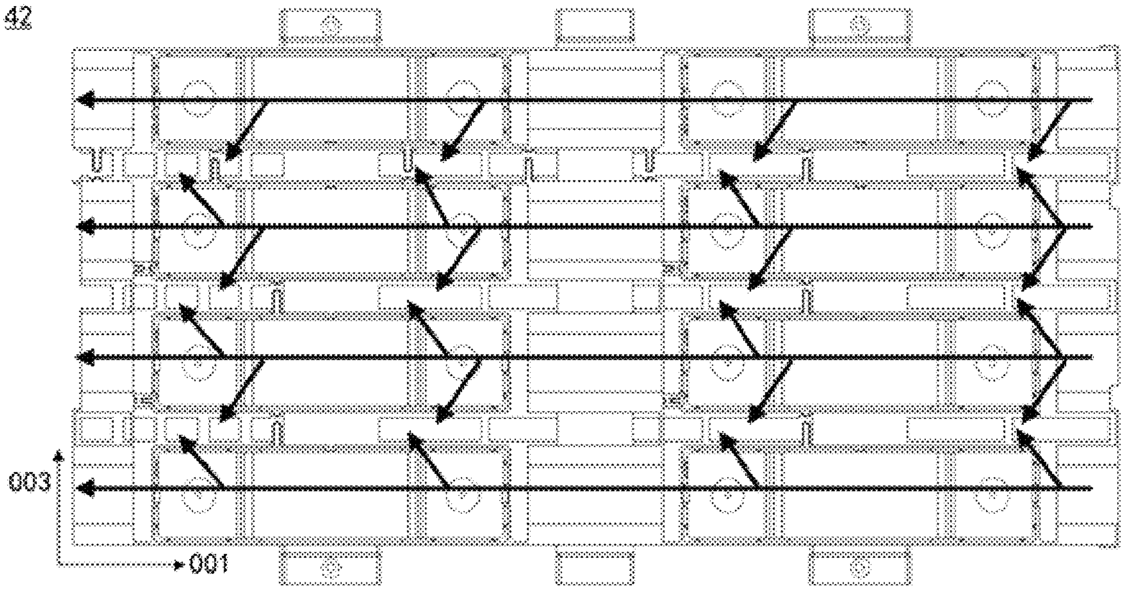
FIG. 40 is a schematic diagram of an air flow path in the second insulation cover according to FIG. 37.

Therefore, refer to a schematic diagram shown in FIG. 40 of an air flow path at the second insulation cover 42. One part of the cooling air that enters from the side ventilation holes 382 of the second side board 34 flows into the second secondary air duct 22 through the second through holes 422, to dissipate heat for the electrochemical cell assembly 10; and the other part of the air may flow along the plurality of second air guide grooves 423, and dissipate heat for each busbar 45 after flowing through the second outer surface 412. It may be understood that, because the busbars 45 are connected to the electrochemical cell assembly 10 in a fastened manner, the heat on the electrochemical cell assembly 10 is further conducted to the busbars 45. Heat dissipation for the busbars 45 may further reduce an overall temperature of the battery module 100 in this application.

Similarly, the first insulation cover 41 further includes a first outer surface (not shown in the figure) away from the electrochemical cell assembly 10. A plurality of first air guide grooves (not shown in the figure) may be alternatively disposed on the first outer surface. The plurality of first air guide grooves are respectively communicated with the first through holes 412. In addition, the plurality of first air guide grooves further separately extend along the first direction 001. Alternatively, for the cooling air that enters the case 30 from the side ventilation holes 382 on the first side board 33, one part may flow into the first secondary air duct 21 to dissipate heat for the electrochemical cell assembly 10; and the other part may flow along the plurality of first air guide grooves to dissipate heat for the busbars 45 at the first insulation cover 41.

It should be pointed out that a plurality of air guide holes 392 further need to be disposed on the connection board 39. Each air guide hole 392 is communicated to one first air guide groove or second air guide groove 423, so that cooling air in the first air guide groove and the second air guide groove 423 can flow out of the case 30 through the air exhaust window 371.

Figure 41:
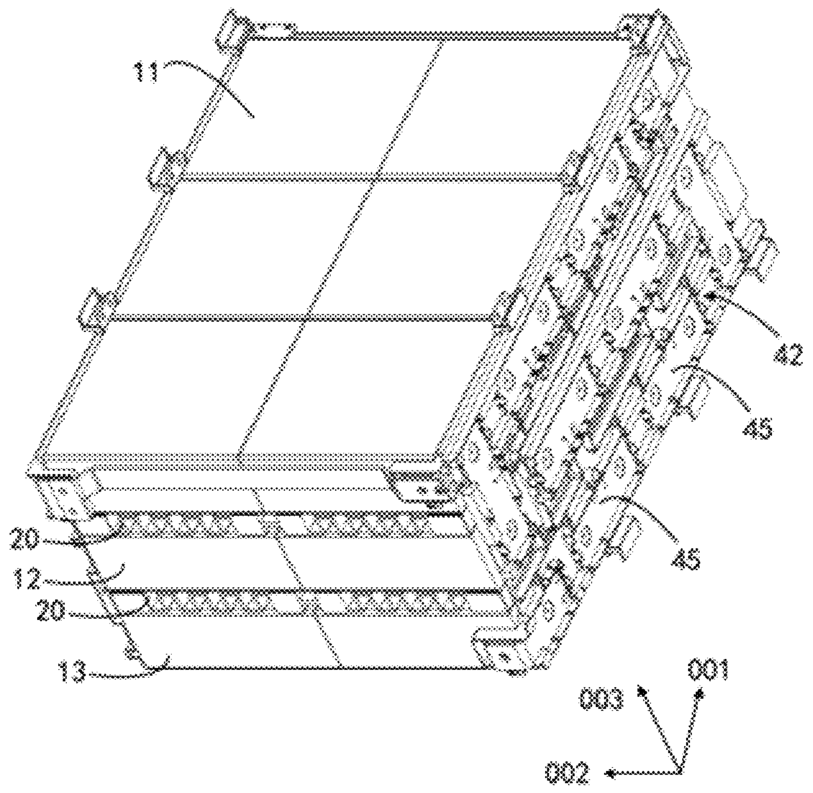
FIG. 41 is a schematic diagram of a structure of another embodiment of an electrochemical cell assembly in the battery module according to FIG. 2.
Figure 42:
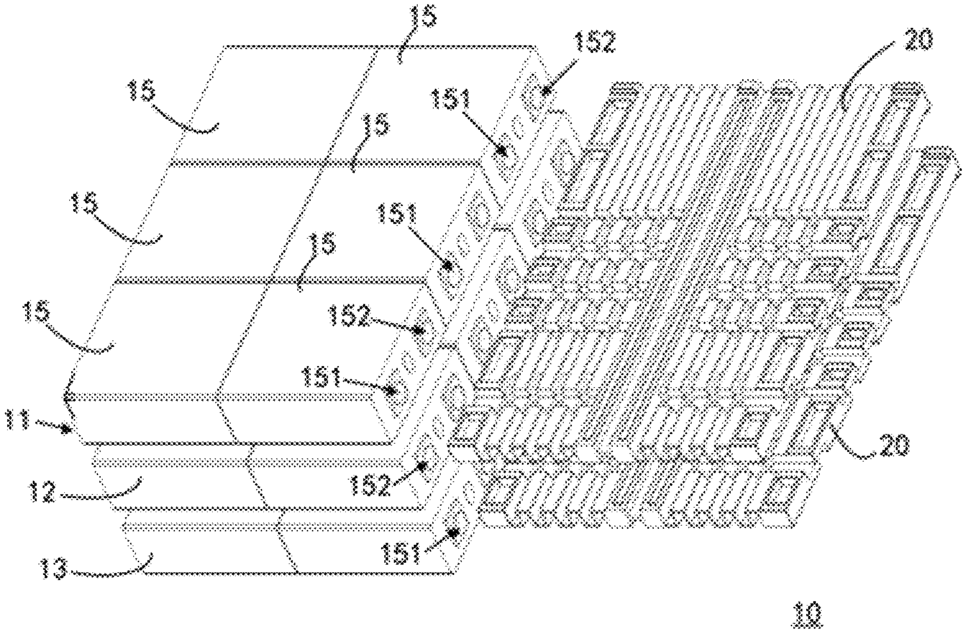
FIG. 42 is a schematic exploded view of a middle separator and the electrochemical cell assembly in the battery module according to FIG. 41.

For an embodiment, refer to FIG. 41. The electrochemical cell assembly 10 includes three electrochemical cell layers (shown as a first electrochemical cell layer 11, a second electrochemical cell layer 12, and a third electrochemical cell layer 13 in the figure) and two middle separators 20. Further, with reference to FIG. 42, each electrochemical cell layer includes six electrochemical cell units 15. The six electrochemical cell units 15 are arranged in a manner of three rows and two columns. In addition, in the second direction 002, two adjacent electrochemical cell units 15 are disposed opposite to each other. Both a positive electrode 151 and a negative electrode 152 of each electrochemical cell unit 15 are exposed on an outer surface that is of the electrochemical cell unit 15 and that is away from another electrochemical cell unit 15. In the first direction 001, positive electrodes 151 and negative electrodes 152 of two adjacent electrochemical cell units 15 are adjacently arranged. However, between two adjacent electrochemical cell layers, namely, between two adjacent electrochemical cell units 15 that are stacked along the third direction 003, the positive electrode 151 and the negative electrode 152 of the two adjacent electrochemical cell units 15 are opposite to each other.

Figure 43:
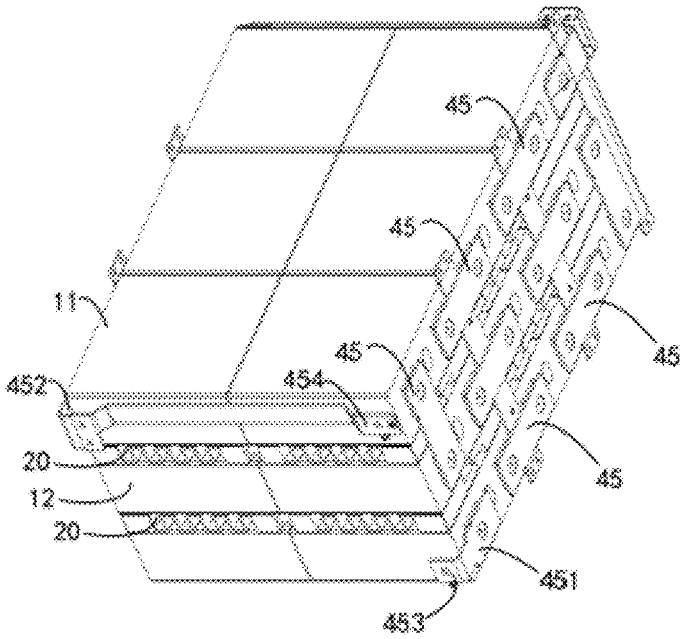
FIG. 43 is a schematic diagram of an internal structure of the electrochemical cell assembly in the battery module according to FIG. 41.

For details, refer to FIG. 43. After structures of the first insulation cover 41 and the second insulation cover 42 are hidden, it can be learned that plurality of busbars 45 are connected between the electrochemical cell units 15 and are configured to connect the electrochemical cell units 15 on a same side in series as one. The busbar 45 arranged along the first direction 001 in the length direction is connected between two adjacent electrochemical cell units 15 in a same electrochemical cell layer. The busbar 45 arranged along the third direction 003 in the length direction is connected between an upper electrochemical cell unit 15 and a lower electrochemical cell unit 15 in different electrochemical cell layers. The figure shows only arrangement of the electrochemical cell units 15 and arrangement of the busbars 45 on one side of the electrochemical cell assembly 10. On the other side not shown in the figure, the electrochemical cell units 15 also form a series circuit through the busbars 45.

Further, a short busbar 451 and a long busbar 452 are further disposed for the busbars 45. The short busbar 451 and the long busbar 452 are respectively located at a head end and a tail end of the series circuit on one side. The short busbar 451 includes a first power connection pin 453. The long busbar 452 includes a second power connection pin 454. The first power connection pin 453 and the second power connection pin 454 are bent respectively corresponding to the short busbar 451 and the long busbar 452, and are located on one side of each electrochemical cell layer along the first direction 001. In other words, in the schematic diagram of FIG. 43, the busbars 45 on the two sides each include a short busbar 451, and each includes a long busbar 452. One pair of first power connection pin 453 and second power connection pin 454 is located on a side that is of the electrochemical cell assembly 10 and that is close to the air exhaust panel 37. The other pair of first power connection pin 453 and second power connection pin 454 is located on a side that is of the electrochemical cell assembly 10 and that is close to the air intake board 31. The first power connection pin 453 and the second power connection pin 454 that are matched in pairs are further spaced and disposed along the third direction 003.

It may be understood that, the short busbar 451 and the long busbar 452 are respectively the head end and the tail end of the series circuit on one side, so that after the first power connection pin 453 and the second power connection pin 454 that are in pairs are connected, the electrochemical cell units 15 in the electrochemical cell assembly 10 are also connected in series. Further, the first power connection pin 453 and the second power connection pin 454 that are close to the air exhaust panel 37 may be further connected to the second control panel **61*b* shown in FIG. 29, or connected to the conducting wire 71 shown in FIG. 29, so that the electrochemical cell assembly 10** is electrically connected to an external circuit.

Figure 44:
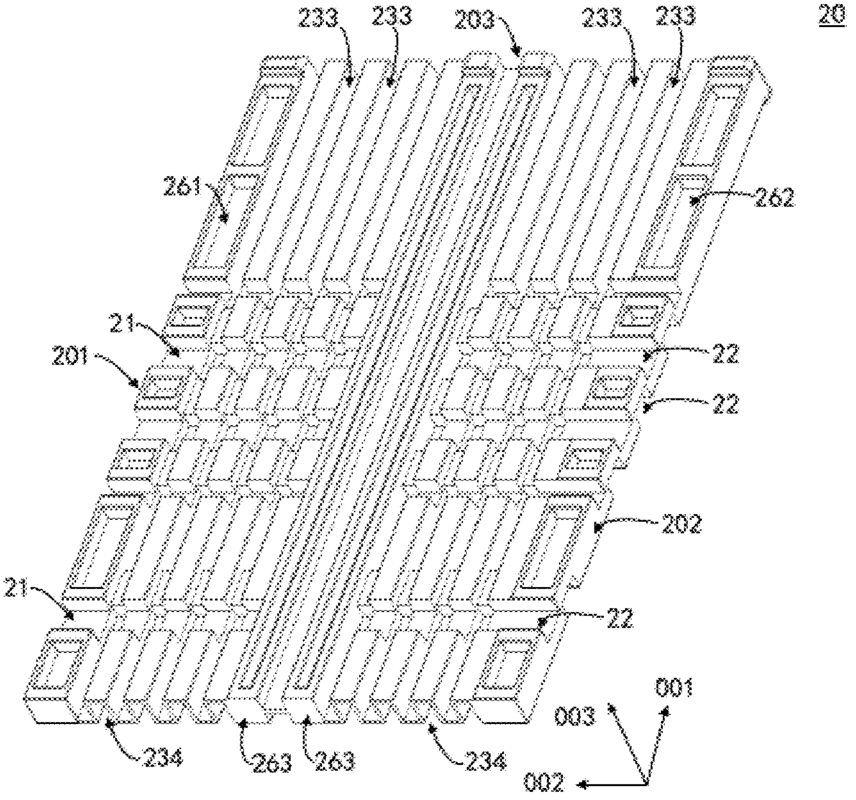
FIG. 44 is a schematic diagram of a structure of a middle separator in the electrochemical cell assembly according to FIG. 41.
Figure 45:
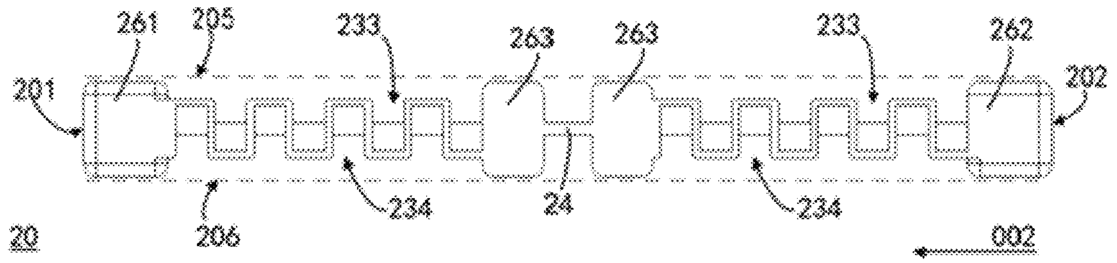
FIG. 45 is a schematic diagram of a structure in a front view direction of a middle separator in the electrochemical cell assembly according to FIG. 41.

Refer to FIG. 44. A structure of a middle separator 20 in this embodiment is similar to that of the middle separator 20 shown in FIG. 4. The middle separator 20 also includes a plurality of main air ducts 23. The plurality of main air ducts 23 are formed by using a structure of alternating an upper main air duct 233 and a lower main air duct 234. Further, first secondary air ducts 21 and second secondary air ducts 22 are further disposed on the middle separator 20 in this embodiment. The first secondary air ducts 21 and second secondary air ducts 22 extend from two opposite sides to the middle of the middle separator 20 and communicate a plurality of main air ducts 23. Further, refer to FIG. 44 and FIG. 45 together. The middle separator 20 further includes a first support strip 261, a second support strip 262, and two third support strips 263. The first support strip 261 is located on the first side edge 201. The second support strip 262 is located on the second side edge 202. The two third support strips 263 are located between the first side edge 201 and the second side edge 202. Specifically, the two third support strips 263 are located at a middle part of the middle separator 20 along the second direction 002. The first support strip 261, the second support strip 262, and the third support strips 263 all extend along the first direction 001. In addition, the first support strip 261, the second support strip 262, and the third support strips 263 are jointly configured to form a first plane 205 and a second plane 206 of the middle separator 20. The first support strip 261, the second support strip 262, and the third support strips 263 are jointly configured to be attached to and support the electrochemical cell layers located on upper and lower sides of the middle separator 20. The third support strip 263 close to the first side edge 201 cooperates with the first support strip 261 to support the electrochemical cell units 15 on one side. The third support strip 263 close to the second side edge 202 cooperates with the second support strip 262 to support the electrochemical cell units 15 on the other side.

Figure 46:
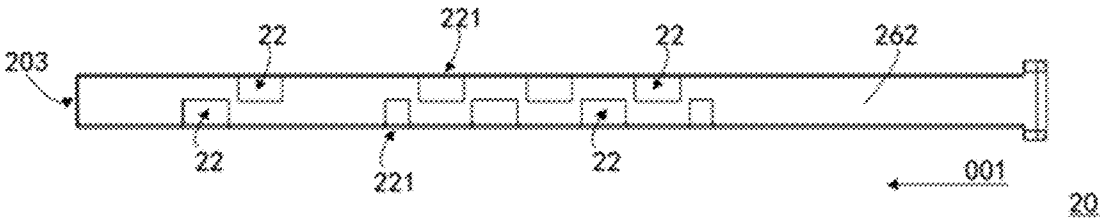
FIG. 46 is a schematic diagram of a structure in a side view direction of a middle separator in the electrochemical cell assembly according to FIG. 41.

Further, the two third support strips 263 are spaced and disposed. A structure of a base board 24 is further disposed between the two third support strips 263, to form an upper main air duct 233 and a lower main air duct 234 in the middle separator 20. In a schematic diagram of FIG. 46, a plurality of notches are further disposed on the second support strip 262 to form second air intake ends 221 of the second secondary air ducts 22. It may be understood that a plurality of notches may be further disposed on the first support strip 261 to form first air intake ends 211 of the first secondary air ducts 21.

Through structures of the first support strip 261, the second support strip 262, and the third support strips 263, a fitting surface between the middle separator 20 and the electrochemical cell units 15 is raised, and a gap between the main air duct 23 and the electrochemical cell units may allow more cooling air to flow through. In addition, requirements on overall dimensions of the upper main air ducts 233 and the lower main air ducts 234 are further reduced, so that the electrochemical cell units 15 may be more stably attached to the middle separator 20.

Figure 47:
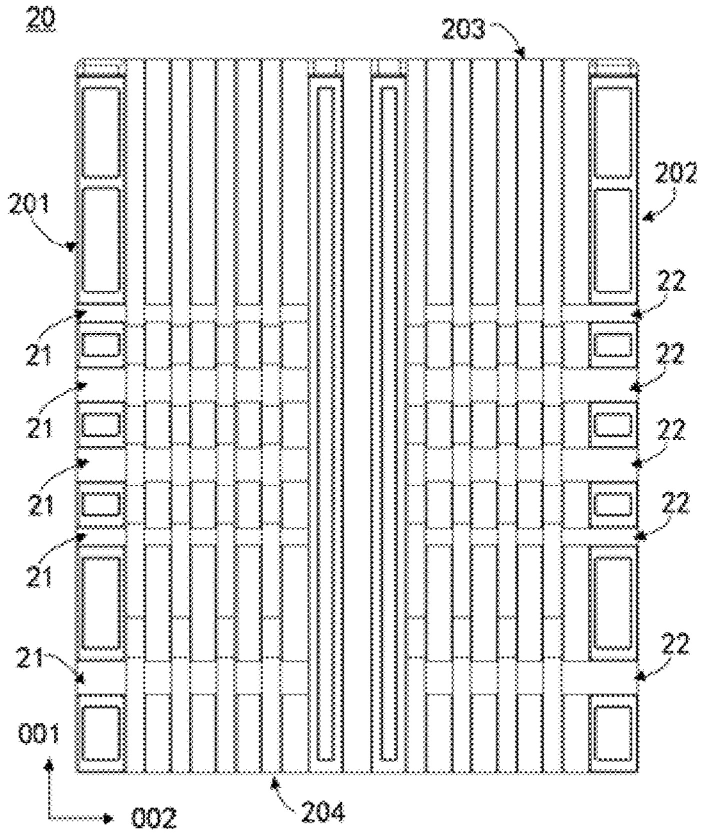
FIG. 47 is a schematic diagram of a structure in a top view direction of a middle separator in the electrochemical cell assembly according to FIG. 41.

In addition, a quantity of main air ducts 23 communicated by each first secondary air duct 21 is the same as a quantity of main air ducts 23 communicated by the second secondary air duct 22 in this embodiment. However, arrangement distances between the plurality of first secondary air ducts 21 are different, and arrangement distances between the plurality of second secondary air ducts 22 are different. In a schematic diagram of FIG. 47, a distance between the first secondary air ducts 21 located close to the air exhaust side edge 204 of the middle separator 20 is greater than a distance between the first secondary air ducts 21 located far away from the air exhaust side edge 204. In other words, for the distance between the first secondary air ducts 21, the first secondary air ducts 21 are relatively sparse at a location close to the air exhaust side edge 204, and are relatively dense at a location far away from the air exhaust side edge 204. Correspondingly, an arrangement manner of the second secondary air ducts 22 is also similar to an arrangement manner of the first secondary air ducts 21. A relative distance between the second secondary air duct 22 close to the air exhaust side edge 204 is relatively long, and a relative distance between the second secondary air ducts 22 far away from the air exhaust side edge 204 is relatively short.

Compared with the structure shown in FIG. 3 of the electrochemical cell assembly 10, a quantity of electrochemical cell layers of an electrochemical cell assembly 10 in this embodiment is reduced, and an overall thickness of the electrochemical cell assembly 10 is reduced. In this case, for the electrochemical cell units 15 close to the air exhaust side edge 204, because of auxiliary heat dissipation effect of the first secondary air ducts 21 and the second secondary air ducts 22, a flow rate of cooling air in the first secondary air ducts 21 and the second secondary air ducts 22 is relatively high, and the heat dissipation effect is relatively improved. However, for the two electrochemical cell units 15 located in the middle of the electrochemical cell layer along the first direction 001, a width of the electrochemical cell units 15 in the second direction 002 increases, the flow rate of the cooling air in the first secondary air ducts 21 and the second secondary air ducts 22 in a corresponding area are relatively low, and heat dissipation effect for the two electrochemical cell units 15 is poorer than that for the electrochemical cell units 15 at the locations close to the air exhaust side edge 204. Therefore, the arrangement distance between the first secondary air ducts 21 and the arrangement distance between the second secondary air ducts 22 in the corresponding area are reduced. This may introduce more cooling air to the electrochemical cell units 15 in the middle of the electrochemical cell layer, improve the heat dissipation effect for the electrochemical cell units 15 in the middle, and enable the heat dissipation effects of the electrochemical cell units 15 in the electrochemical cell layer to tend to be consistent.

Figure 48:
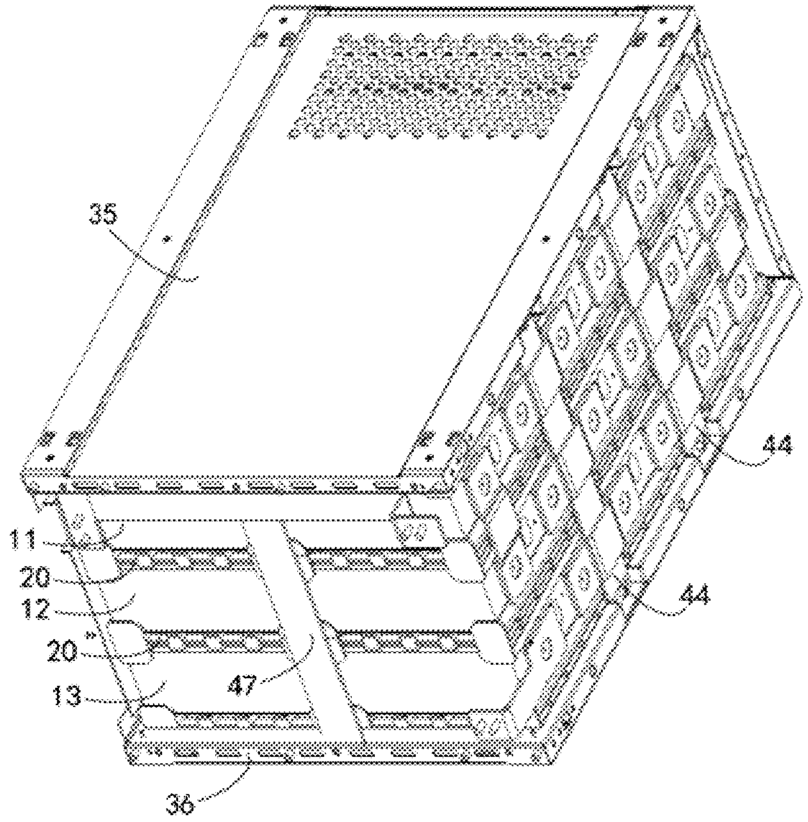
FIG. 48 is a schematic diagram of a structure of another embodiment of an electrochemical cell assembly in the battery module according to FIG. 2.

For an embodiment, refer to FIG. 48. An end support frame 47 is further disposed on the battery module 100. The end support frame 47 is located at an outer surface that is of the electrochemical cell assembly 10 and that is close to the air exhaust panel 37 and/or close to the air intake board 31. The end support frame 47 is connected between the top assembly 35 and the bottom assembly 36 together with the first support frame 43 and the second support frame 44, and is configured to tighten the electrochemical cell assembly 10. Due to an arrangement manner that there are two columns of electrochemical cell units 15 in the electrochemical cell layer, a size of the electrochemical cell layer in the second direction 002 is increased. After the end support frame 47 is disposed, overall structural stability of the battery module 100 may be enhanced. It may be understood that the end support frame 47 may be disposed corresponding to a middle section of the middle separator 20. In other words, the end support frame 47 may be disposed corresponding to an area of the third support strips 263, to avoid that the end support frame 47 shields the main air ducts 23 that flow through the electrochemical cell units 15 and affects the heat dissipation effect.

Figure 49:
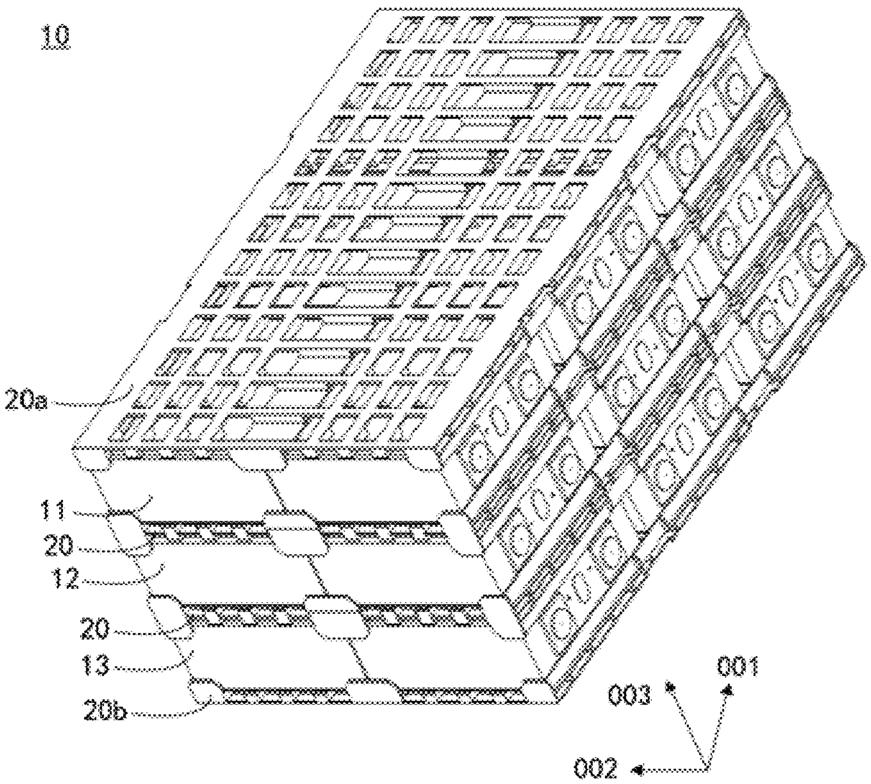
FIG. 49 is a schematic diagram of a structure of the electrochemical cell assembly in the battery module according to FIG. 48.
Figure 50:
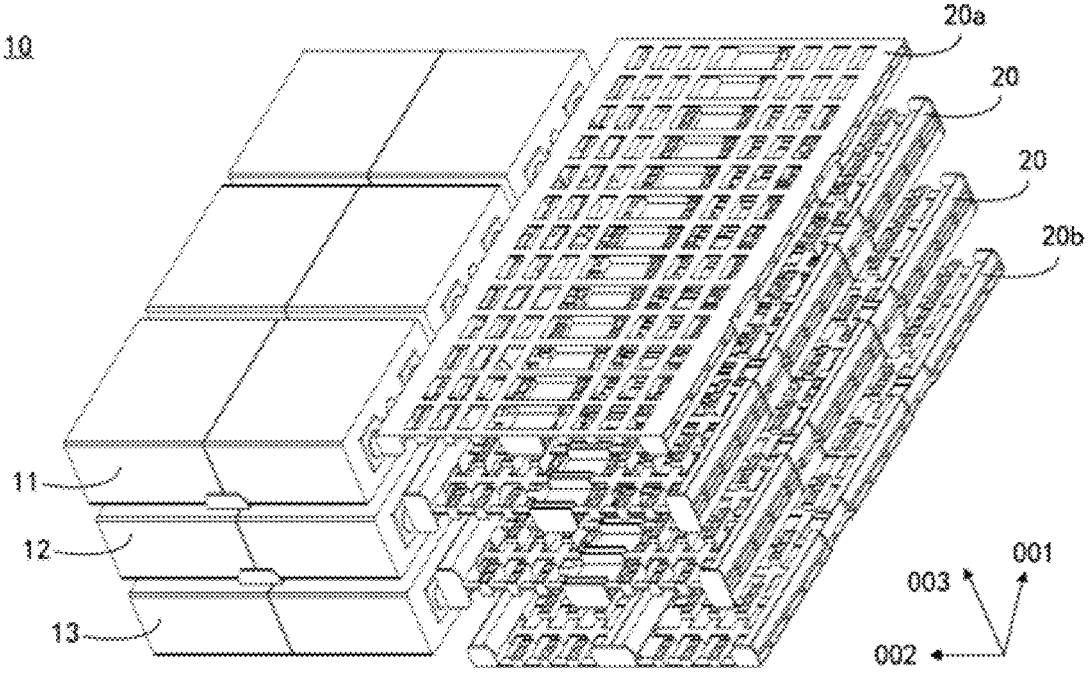
FIG. 50 is a schematic exploded view of a structure of the electrochemical cell assembly in the battery module according to FIG. 49.

Refer to FIG. 49 and FIG. 50 together. In an electrochemical cell assembly 10 in this embodiment, an arrangement manner of the electrochemical cell units 15 is the same as an arrangement manner of the electrochemical cell units 15 in FIG. 42. The electrochemical cell units 15 are both arranged in a manner of three rows and two columns. Similarly, two middle separators 20 are disposed between the three rows of electrochemical cell layers. Further, the electrochemical cell assembly 10 in this embodiment further includes an upper separator **20*a* and a lower separator 20*b*. The upper separator 20*a* and the lower separator 20*b* are respectively arranged on two sides of the electrochemical cell layers along the third direction 003. To be specific, the upper separator 20*a* is located between the electrochemical cell layers and the top assembly 35, and a gap for ventilation and heat dissipation is formed between the top assembly 35 and the electrochemical cell layers; and the lower separator 20*b* is located between the electrochemical cell layers and the bottom assembly 36, and a gap for ventilation and heat dissipation is also formed between the bottom assembly 36** and the electrochemical cell layers.

Figure 51:
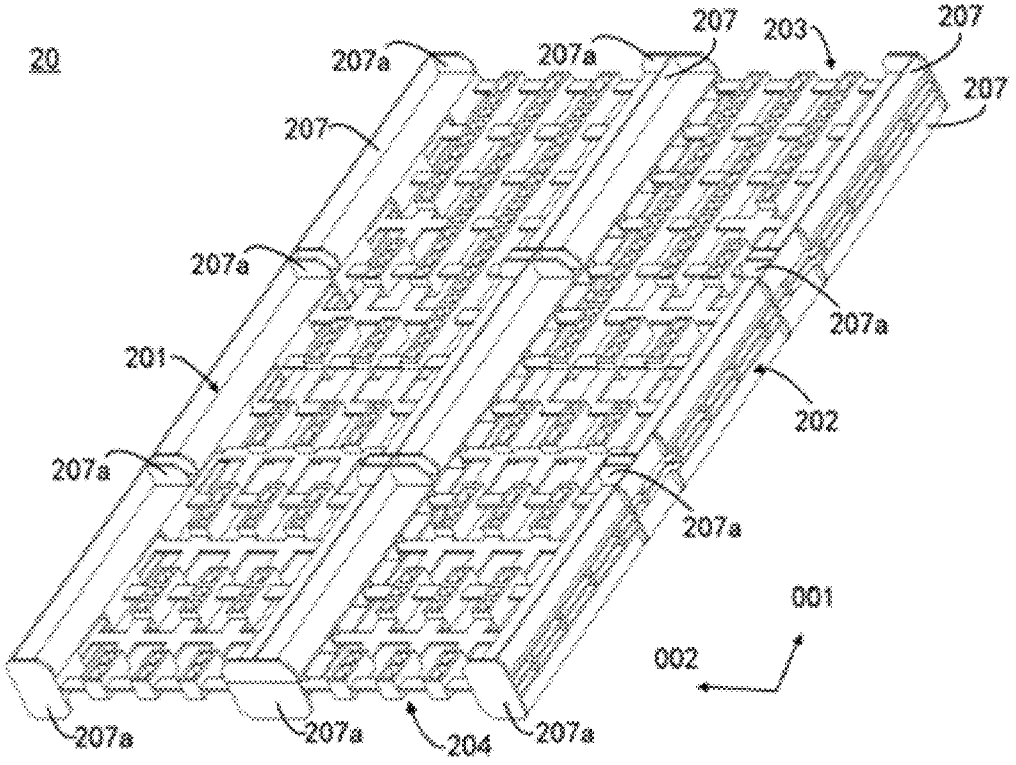
FIG. 51 is a schematic diagram of a structure of a middle separator in the electrochemical cell assembly according to FIG. 49.

Specifically, refer to FIG. 51. A structure of a middle separator 20 in this embodiment is similar to that of the middle separator 20 in FIG. 17. Limiting boards 207 respectively extend towards two opposite directions at edge locations of the middle separator 20, and are configured to limit each electrochemical cell layer. Further, at locations of the first side edge 201 and the second side edge 202, a plurality of limiting sub-boards **207*a* further extend, and are configured to limit the electrochemical cell units 15 in each electrochemical cell layer. In a middle location of the middle separator 20 along the second direction 002, a structure of a limiting board 207 is additionally disposed. The limiting board 207 is configured to limit a relative location between two rows of electrochemical cell units 15. Further, at the limiting board 207 located in the middle of the middle separator 20, a plurality of limiting sub-boards 207*a* are further spaced and arranged along the first direction 001. In addition, the limiting sub-boards 207*a* are disposed in pairs. Each pair of limiting sub-boards 207*a* are respectively located on two opposite sides of the limiting board 207. The limiting sub-boards 207*a* located in the middle of the middle separator 20 cooperates with the limiting sub-boards 207*a* located on the first side edge 201 and the second side edge 202, and are configured to separately limit a relative location between the two electrochemical cell units 15 that are arranged side by side along the second direction 002**.

For the upper separator **20*a*, a general structure of the upper separator 20*a* is the same as that of the middle separator 20 shown in FIG. 51. The only difference lies in that: Limiting boards 207 at the upper separator 20*a* extend towards only one side along the third direction 003, and limiting sub-boards 207*a* also extend only along a same direction. This is because the upper separator 20*a* only cooperates with the electrochemical cell layers on one side. Therefore, the limiting boards 207 and the limiting sub-board 207***a* only need to extend towards the side to implement a limiting function of the upper separator 20*a* for each electrochemical cell unit 15 in the electrochemical cell layers. Alternatively, it may be understood that, the upper separator 20*a* only needs to be constructed as a half of the middle separator 20, to form a positioning effect on the electrochemical cell layers and provide an effect that the main air ducts 23, the first secondary air ducts 21, and the second secondary air ducts 22 dissipate heat for the electrochemical cell layers. It may be understood that a structure of the lower separator 20*b* is approximately the same as that of the upper separator 20*a*. Extension directions of limiting boards 207 and limiting sub-boards 207*a* on the lower separator 20*b* are respectively opposite to the extension directions of the limiting boards 207 and the limiting sub-boards 207*a* on the upper separator 20*a*. Therefore, the lower separator 20*b* also achieves a positioning and heat dissipation effect similar to that of the upper separator 20*a*.

Figure 52:
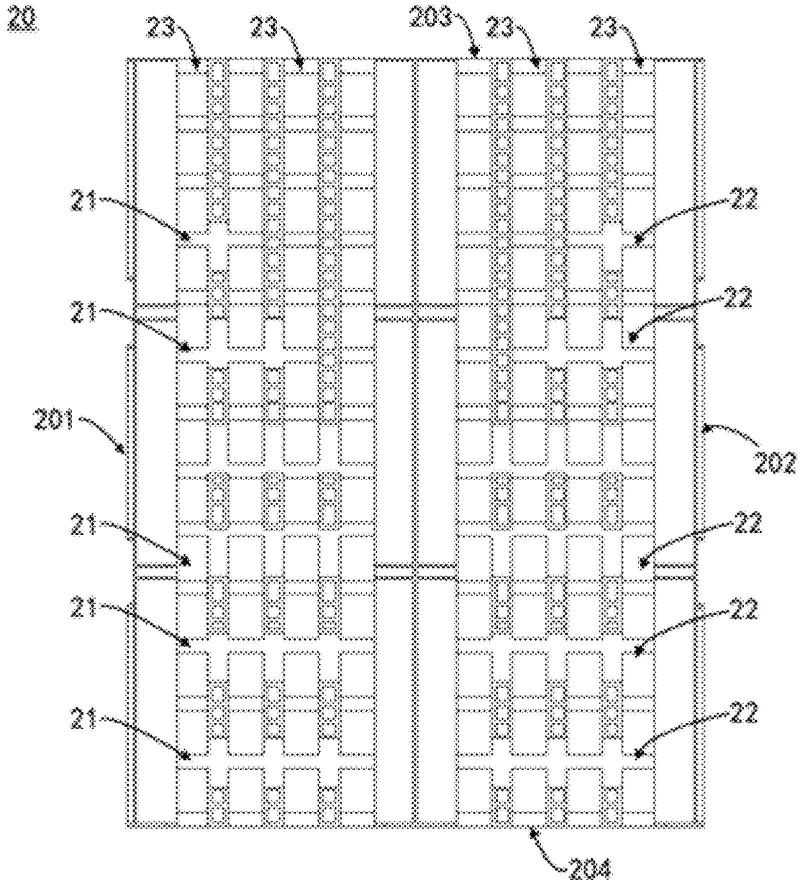
FIG. 52 is a schematic diagram of a structure in a top view direction of a middle separator in the electrochemical cell assembly according to FIG. 49.

For an embodiment, refer to FIG. 52. In this embodiment, first secondary air ducts 21 and second secondary air ducts 22 of a middle separator 20 are disposed in a manner of strong and weak secondary air ducts. To be specific, quantities of main air ducts 23 communicated by each of the first secondary air duct 21 and the second secondary air duct 22 that are close to the air exhaust side edge 204 are greater than quantities of main air ducts 23 communicated by each of the first secondary air duct 21 and the second secondary air duct 22 that are far away from the air exhaust side edge 204. In the electrochemical cell assembly 10 in this embodiment, the structures of the upper separator 20*a* and the lower separator 20*b* are additionally arranged, so that the heat dissipation effect is relatively improved for the electrochemical cell units 15 located in the middle along the first direction 001. The first secondary air duct 21 and the second secondary air duct 22 are disposed in a manner of strong and weak secondary air ducts. This may alternatively ensure that the temperature of each electrochemical cell unit 15 in the electrochemical cell assembly 10 is relatively balanced.

For an embodiment, refer back to FIG. 24. In the embodiment shown in FIG. 24, the air supply unit 50 is implemented by using fans 51. There are two fans 51. The two fans 51 are arranged side by side along the third direction 003. The control unit 60 may be electrically connected to the two fans 51, and drive the two fans 51 to rotate, to send out the cooling air in the case 30 from the air exhaust window 371. Specifically, the control panel 61 in the control unit 60 is electrically connected to the two fans 51. In some other embodiments, a quantity of fans 51 may be set randomly based on a heat dissipation requirement. In other words, there may be only one fan 51, or there may be a plurality of fans 51. When there are a plurality of fans 51, the plurality of fans 51 may be arranged along the third direction 003. Alternatively, the plurality of fans 51 may be disposed in any arrangement manner, to meet heat dissipation requirements of different electrochemical cell assemblies 10. It may be understood that, in some other embodiments, the air supply unit 50 may be alternatively implemented by using a blower, an air extraction apparatus, air exhaust apparatus, or the like.

In an embodiment, a temperature sensor (not shown in the figure) may be further disposed in the battery module 100 in this application. The temperature sensor may be disposed corresponding to the electrochemical cell assembly 10, and is electrically connected to the control panel 61. The temperature sensor is configured to monitor a temperature of the electrochemical cell assembly 10 in real time. After receiving temperature data sensed by the temperature sensor, the control panel 61 may control a rotation speed or power of the fans 51, to adjust a heat dissipation effect in real time. It may be understood that, in some embodiments, there may be alternatively a plurality of temperature sensors. The plurality of temperature sensors are disposed at different locations of the electrochemical cell assembly 10, to respectively monitor real-time temperatures of different parts of the electrochemical cell assembly 10. For example, there may be four temperature sensors. The four temperature sensors are respectively disposed corresponding to the first electrochemical cell layer 11, the second electrochemical cell layer 12, the third electrochemical cell layer 13, and the fourth electrochemical cell layer 14, to respectively monitor temperatures of different electrochemical cell layers.

Heat dissipation measures of the electrochemical cell layers are different, so that temperatures of the different electrochemical cell layers may also be different. In a process of monitoring each electrochemical cell layer, the control panel 61 may correspondingly adjust heat dissipation effect for the different electrochemical cell layers by controlling rotation speeds or power of the different fans 51, to achieve effect of balancing the temperatures between the different electrochemical cell layers and reducing an internal temperature difference of the electrochemical cell assembly 10. It may be understood that, a difference of working efficiency is formed under control of the control panel 61 in implementations of the two fans in this embodiment. The two fans may be considered as the third fan and the fourth fan mentioned above.

Figure 53:
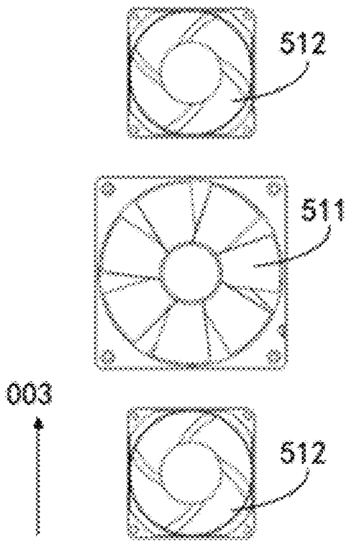
FIG. 53 is a schematic diagram of fan arrangement in an air supply unit according to FIG. 24.

Refer to an arrangement manner shown in FIG. 53 of the fans 51 in the air supply unit 50. The fan 51 includes a first fan 511 and two second fans 512. The first fan 511 and the two second fans 512 are arranged side by side along the third direction 003, and the first fan 511 is located between the two second fans 512. That exhaust power of the first fan 511 is greater than exhaust power of the second fan 512 may be specifically that: A fan blade of the first fan 511 is larger than a fan blade of the second fan 512 in area, and/or a rotation speed of the first fan 511 is higher than a rotation speed of the second fan 512. Therefore, when the air supply unit 50 works, cooling air output by the first fan 511 is more than cooling air output by the second fan 512.

Figure 54:
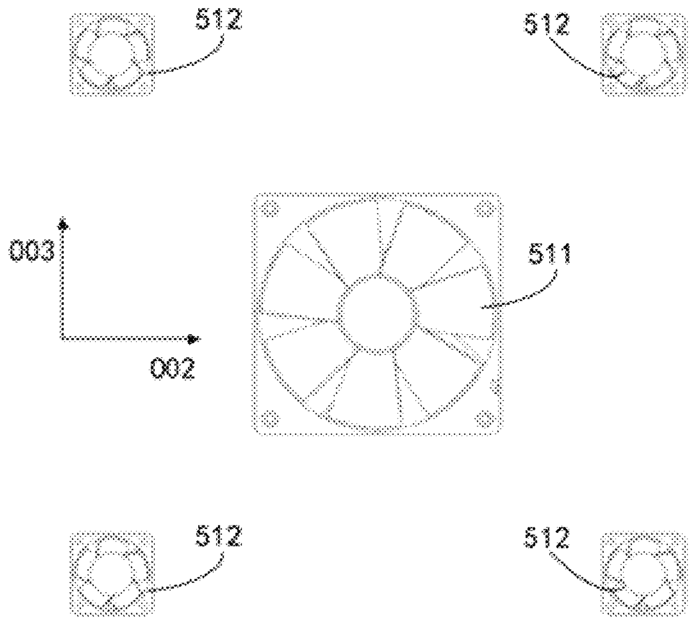
FIG. 54 is a schematic diagram of another implementation of fan arrangement in an air supply unit according to FIG. 24.

However, in a schematic diagram of FIG. 54, there are four second fans 512. Two second fans 512 are arranged side by side along the second direction 002 and located between the first fan 511 and the top assembly 35. Two second fans 512 are arranged side by side along the second direction 002 and located between the first fan 511 and the bottom assembly 36.

As mentioned above, for the electrochemical cell assembly 10 disposed in a stacked manner, heat dissipation effect for an electrochemical cell layer close to a central part of the stacking is poorer than that of an electrochemical cell layer close to two sides of the stacking. Therefore, the first fan 511 with higher air exhaust power is disposed at a location corresponding to the electrochemical cell layer at the central part of the stacking, and the second fans 512 with lower air exhaust power are disposed at locations corresponding to the electrochemical cell layers at the two sides of the stacking. Therefore, a flow rate of cooling air in a middle separator 20 located between the electrochemical cell layers at the central part of the stacking may be higher. Correspondingly, a flow rate of cooling air in a middle separator 20 located between the electrochemical cell layers at the two sides of the stacking, and/or cooling air in the top air flow channel and a bottom air flow channel is lower. In this way, heat dissipation effect can be adjusted for electrochemical cell layers in different parts, and temperature consistency between the electrochemical cell layers in the electrochemical cell assembly 10 can be improved.

The foregoing descriptions are merely specific embodiments of this application, but are not intended to limit the protection scope of this application. Any variation or replacement, for example, reduction or addition of a mechanical part, and a change of a shape of a mechanical part, readily figured out by a person skilled in the art within the technical scope disclosed in this application shall fall within the protection scope of this application. When no conflict occurs, embodiments of this application and the features in the embodiments may be mutually combined. Therefore, the protection scope of this application shall be subject to the protection scope of the claims.

What is claimed is:

1. A battery module, comprising, a first electrochemical cell layer;

a second electrochemical cell layer;

a middle separator located between the first electrochemical cell layer and the second electrochemical cell layer, wherein the first electrochemical cell layer, the middle separator, and the second electrochemical cell layer are stacked and fastened in a case, wherein the middle separator comprises a first side edge and a second side edge, wherein both the first side edge and the second side edge extend along a first direction, wherein a main air duct, a first secondary air duct, and a second secondary air duct are disposed in the middle separator, wherein the main air duct penetrates the middle separator along the first direction, wherein the first secondary air duct is communicated with the main air duct, wherein an end of the first secondary air duct extends to the first side edge, wherein the second secondary air duct is communicated with the main air duct, and wherein an end of the second secondary air duct extends to the second side edge; and a first ventilation hole and a second ventilation hole disposed on the case, wherein the first ventilation hole and the second ventilation hole are respectively located on two sides of the middle separator and are arranged in the first direction, and wherein an air supply unit is connected to the case in a fastened manner and configured to exhaust air in the middle separator out of the case through the first ventilation hole.

2. The battery module according to claim 1, wherein the case comprises an air intake board, an air exhaust panel, a first side board, and a second side board, wherein the air intake board and the air exhaust panel are respectively arranged on the two sides of the middle separator along the first direction, and the first ventilation hole is located on the air exhaust panel; and wherein both the first side board and the second side board are connected between the air intake board and the air exhaust panel, the first side board is located on a side of the first side edge and away from the main air duct, and the second side board is located on a side of the second side edge and away from the main air duct.

3. The battery module according to claim 2, wherein the main air duct is comprised in a plurality of main air ducts arranged in the middle separator along a second direction perpendicular to the first direction.

4. The battery module according to claim 1, wherein the first secondary air duct is comprised in a plurality of first secondary air ducts spaced along the first direction; and wherein the second secondary air duct is comprised in a plurality of second secondary air ducts spaced along the first direction.

5. The battery module according to claim 3, wherein the first secondary air duct comprises a first strong secondary air duct and a first weak secondary air duct, wherein the first strong secondary air duct is located between the first weak secondary air duct and the air exhaust panel, and wherein a quantity of a subset of the plurality of main air ducts communicated with the first strong secondary air duct is greater than or equal to a quantity of a subset of the plurality of main air ducts communicated with the first weak secondary air duct; and wherein the second secondary air duct comprises a second strong secondary air duct and a second weak secondary air duct, wherein the second strong secondary air duct is located between the second weak secondary air duct and the air exhaust panel, and wherein a quantity of a subset of the plurality of main air ducts communicated with the second strong secondary air duct is greater than or equal to a quantity of a subset of the plurality of main air ducts communicated with the second weak secondary air duct.

6. The battery module according to claim 1, wherein the main air duct comprises an upper main air duct and a lower main air duct, wherein an opening facing the first electrochemical cell layer is disposed on the upper main air duct, wherein an opening facing the second electrochemical cell layer is disposed on the lower main air duct, and wherein lower main air duct is disposed between two upper main air ducts.

7. The battery module according to claim 2, wherein the first secondary air duct has a first air intake end and a first air exhaust end that are opposite to each other, wherein the first air intake end is communicated with the first side edge, wherein the first air exhaust end is communicated with the main air duct, and wherein a projection of the first air exhaust end on the first side edge is located between the first air intake end and the air exhaust panel; and wherein the second secondary air duct has a second air intake end and a second air exhaust end that are opposite to each other, wherein the second air intake end is communicated with the second side edge, wherein the second air exhaust end is communicated with the main air duct, and wherein a projection of the second air exhaust end on the second side edge is located between the second air intake end and the air exhaust panel.

8. The battery module according to claim 2, wherein a third ventilation hole is disposed on each of the first side board and the second side board.

9. The battery module according to claim 8, wherein the case comprises an air exhaust board located between the middle separator and the air exhaust panel, and wherein a main air exhaust hole is disposed on the air exhaust board.

10. The battery module according to claim 9, wherein the air supply unit is disposed in the case and located between the air exhaust board and the air exhaust panel.

11. The battery module according to claim 10, wherein the case comprises a top assembly and a bottom assembly, the top assembly being located on a side of the first electrochemical cell layer and away from the middle separator, the bottom assembly being located on a side of the second electrochemical cell layer and away from the middle separator, and wherein the top assembly and the bottom assembly are separately connected between the air intake board and the air exhaust board.

12. The battery module according to claim 11, wherein a top air flow channel is disposed in the top assembly, wherein a bottom air flow channel is disposed in the bottom assembly, wherein both the top air flow channel and the bottom air flow channel extend along the first direction, wherein secondary ventilation holes corresponding to the top air flow channel and the bottom air flow channel are further disposed on the air intake board, and wherein secondary air exhaust holes corresponding to the top air flow channel and the bottom air flow channel are further disposed on the air exhaust board.

13. The battery module according to claim 12, wherein the battery module comprises a plurality of second ventilation holes, wherein the second ventilation hole is included in the plurality of second ventilation holes, wherein at least one of a sum of areas of the secondary ventilation holes is less than a sum of areas of the plurality of second ventilation holes, or a sum of areas of the secondary air exhaust holes is less than a sum of areas of the main air exhaust holes.

14. The battery module according to claim 13, wherein the battery module further comprises a first insulation cover and a second insulation cover, wherein the first insulation cover is located between the middle separator and the first side board, wherein a first through hole corresponding to the first secondary air duct is further disposed on the first insulation cover;

wherein the second insulation cover is located between the middle separator and the second side board, and wherein a second through hole corresponding to the second secondary air duct is further disposed on the second insulation cover.

15. The battery module according to claim 14, wherein the first insulation cover comprises a first outer surface facing the first side board, wherein a first air guide groove is disposed at the first outer surface, wherein an end of the first air guide groove is communicated with the first through hole, and wherein the other end of the first air guide groove is communicated with the air exhaust board;

wherein the second insulation cover comprises a second outer surface facing the second side board, wherein a second air guide groove is disposed at the second outer surface, wherein a first end of the second air guide groove is communicated with the second through hole, and wherein a second end of the second air guide groove is communicated with the air exhaust board; and wherein air guide holes respectively corresponding to the first air guide groove and the second air guide groove are further disposed on the air exhaust board.

16. The battery module according to claim 15, wherein the battery module further comprises a cavity and a control panel, wherein the control panel is accommodated in the cavity, wherein an air inlet and an air outlet are further disposed on the cavity, wherein the air inlet is communicated with the main air duct, the first air guide groove, or the second air guide groove, and wherein the air outlet is communicated with an air exhaust window of the air exhaust panel.

17. The battery module according to claim 16, wherein the control panel is used as at least one of a battery management system, an optimizer, or a direct-current conversion apparatus of the battery module.

18. The battery module according to claim 17, wherein the air supply unit comprises a first fan and at least two second fans, wherein the first fan is located between two of the at least second fans in a stacking direction of the first electrochemical cell layer and the second electrochemical cell layer, and wherein, when the air supply unit works, air exhaust power of the first fan is greater than air exhaust power of the second fan.

19. The battery module according to claim 1, wherein a first temperature sensor and a second temperature sensor are further disposed on the battery module, wherein the first temperature sensor is configured to monitor a temperature of the first electrochemical cell layer, and wherein the second temperature sensor is configured to monitor a temperature of the second electrochemical cell layer.

20. A transportation apparatus, comprising a vehicle frame, a power apparatus, a transmission apparatus, and a battery module, wherein the battery module is accommodated in the vehicle frame, and provides electric energy needed by the power apparatus to work, the battery module comprising:

a first electrochemical cell layer;

a second electrochemical cell layer;

a middle separator located between the first electrochemical cell layer and the second electrochemical cell layer, wherein the first electrochemical cell layer, the middle separator, and the second electrochemical cell layer are stacked and fastened in a case, wherein the middle separator comprises a first side edge and a second side edge, wherein both the first side edge and the second side edge extend along a first direction, wherein a main air duct, a first secondary air duct, and a second secondary air duct are disposed in the middle separator, wherein the main air duct penetrates the middle separator along the first direction, wherein the first secondary air duct is communicated with the main air duct, wherein an end of the first secondary air duct extends to the first side edge, wherein the second secondary air duct is communicated with the main air duct, and wherein an end of the second secondary air duct extends to the second side edge; and a first ventilation hole and a second ventilation hole disposed on the case, wherein the first ventilation hole and the second ventilation hole are respectively located on two sides of the middle separator and are arranged in the first direction, and wherein an air supply unit is connected to the case in a fastened manner and configured to exhaust air in the middle separator out of the case through the first ventilation hole.

* * * * *